(12) United States Patent
Miller et al.

(10) Patent No.: US 12,486,817 B2
(45) Date of Patent: Dec. 2, 2025

(54) GAS TURBINE ENGINE WITH THIRD STREAM

(71) Applicant: General Electric Company, Schenectady, NY (US)

(72) Inventors: Brandon Wayne Miller, Middletown, OH (US); Randy M. Vondrell, Newport, KY (US); David Marion Ostdiek, Liberty Township, OH (US); Craig Williams Higgins, Liberty Township, OH (US); Alexander Kimberley Simpson, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 16 days.

(21) Appl. No.: 18/770,902

(22) Filed: Jul. 12, 2024

(65) Prior Publication Data

US 2025/0347259 A1 Nov. 13, 2025

Related U.S. Application Data

(63) Continuation-in-part of application No. 18/675,270, filed on May 28, 2024, which is a continuation of
(Continued)

(51) Int. Cl.
*F02C 3/06* (2006.01)
*F02K 3/065* (2006.01)

(52) U.S. Cl.
CPC ................ *F02K 3/065* (2013.01); *F02C 3/06* (2013.01)

(58) Field of Classification Search
CPC . F02K 3/02; F02K 3/025; F02K 3/065; F02C 3/06; F02C 3/107; F02C 7/36
See application file for complete search history.

(56) References Cited

U.S. PATENT DOCUMENTS 2,999,630 A 9/1961 Warren et al.
3,528,250 A 9/1970 Johnson
(Continued)

FOREIGN PATENT DOCUMENTS

CN 1204005 A 1/1999
CN 101657607 A 2/2010
(Continued)

OTHER PUBLICATIONS

Crigler, Application of Theodorsen's Theory to Propeller Design, NACA (National Advisory Committee for Aeronautics) Report 924, 1948, pp. 83-99.
(Continued)

*Primary Examiner* — Steven M Sutherland
(74) *Attorney, Agent, or Firm* — Dority & Manning, P.A.

(57) ABSTRACT

A gas turbine engine is provided. The gas turbine engine includes a turbomachine defining an engine inlet to an inlet duct, a fan duct inlet to a fan duct, and a core inlet to a core duct; a primary fan driven by the turbomachine; and a secondary fan located downstream of the primary fan within the inlet duct. The gas turbine engine defines a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

19 Claims, 35 Drawing Sheets

Related U.S. Application Data application No. 17/879,384, filed on Aug. 2, 2022, now Pat. No. 12,031,504.

(56) References Cited

U.S. PATENT DOCUMENTS

| | | |
|---|---|---|
| 3,540,682 A | 11/1970 | Dibble et al. |
| 3,542,152 A | 11/1970 | Adamson et al. |
| 3,750,402 A | 8/1973 | Vdoviak et al. |
| 4,010,608 A | 3/1977 | Simmons |
| 4,043,121 A | 8/1977 | Thomas et al. |
| 4,446,696 A | 5/1984 | Sargisson et al. |
| 4,486,146 A | 12/1984 | Campion |
| 4,569,199 A | 2/1986 | Klees et al. |
| 4,607,657 A | 8/1986 | Hirschkron |
| 4,784,575 A | 11/1988 | Nelson et al. |
| 4,860,537 A | 8/1989 | Taylor |
| 4,892,269 A | 1/1990 | Greco et al. |
| 4,907,946 A | 3/1990 | Ciokajlo et al. |
| 4,916,894 A | 4/1990 | Adamson et al. |
| 4,976,102 A | 12/1990 | Taylor |
| 5,054,998 A | 10/1991 | Davenport |
| 5,190,441 A | 3/1993 | Murphy et al. |
| 5,197,855 A | 3/1993 | Magliozzi et al. |
| 5,259,187 A | 11/1993 | Dunbar et al. |
| 5,261,227 A | 11/1993 | Giffin, III |
| 5,345,760 A | 9/1994 | Giffin, III |
| 5,457,346 A | 10/1995 | Blumberg et al. |
| 5,950,308 A | 9/1999 | Koff et al. |
| 6,339,927 B1 | 1/2002 | DiPietro, Jr. |
| 6,547,518 B1 | 4/2003 | Czachor et al. |
| 6,763,654 B2 | 7/2004 | Orlando et al. |
| 6,792,758 B2 | 9/2004 | Dowman |
| 7,559,191 B2 | 7/2009 | Parks |
| 7,658,063 B1 | 2/2010 | Matheny |
| 7,762,766 B2 | 7/2010 | Shteyman et al. |
| 8,256,202 B1 | 9/2012 | Paulino |
| 8,276,392 B2 | 10/2012 | van der Woude |
| 8,382,430 B2 | 2/2013 | Parry et al. |
| 8,459,035 B2 | 6/2013 | Smith et al. |
| 8,689,538 B2 | 4/2014 | Sankrithi et al. |
| 8,762,766 B2 | 6/2014 | Ferguson et al. |
| 8,876,465 B2 | 11/2014 | Stretton |
| 8,910,465 B2 | 12/2014 | Snyder |
| 8,943,796 B2 | 2/2015 | McCaffrey |
| 8,967,967 B2 | 3/2015 | Stretton et al. |
| 9,017,028 B2 | 4/2015 | Fabre |
| 9,045,996 B2 | 6/2015 | Anghel et al. |
| 9,057,328 B2 | 6/2015 | Kupratis |
| 9,096,312 B2 | 8/2015 | Moxon |
| 9,097,134 B2 | 8/2015 | Ferch et al. |
| 9,534,538 B1 | 1/2017 | Cerny |
| 9,677,501 B2 | 6/2017 | Pierluissi et al. |
| 9,759,160 B2 | 9/2017 | Sankrithi et al. |
| 9,845,768 B2 | 12/2017 | Pesyna et al. |
| 9,982,555 B2 | 5/2018 | Thet et al. |
| 9,995,314 B2 | 6/2018 | Miller et al. |
| 10,077,660 B2 | 9/2018 | Hoefer et al. |
| 10,090,676 B2 | 10/2018 | Knowles et al. |
| 10,126,062 B2 | 11/2018 | Cerny et al. |
| 10,184,400 B2 | 1/2019 | Cerny et al. |
| 10,202,865 B2 | 2/2019 | Breeze-Stringfellow et al. |
| 10,253,648 B2 | 4/2019 | Bentley et al. |
| 10,260,419 B2 | 4/2019 | Cerny et al. |
| 10,263,550 B2 | 4/2019 | Thet et al. |
| 10,344,674 B2 | 7/2019 | Cerny et al. |
| 10,364,750 B2 | 7/2019 | Rambo |
| 10,443,436 B2 | 10/2019 | Miller et al. |
| 10,487,739 B2 | 11/2019 | Miller et al. |
| 10,644,630 B2 | 5/2020 | Smith et al. |
| 10,787,996 B2 | 9/2020 | Kupratis et al. |
| 2004/0197187 A1 | 10/2004 | Usab et al. |
| 2004/0234372 A1 | 11/2004 | Shahpar |
| 2005/0109012 A1 | 5/2005 | Johnson |
| 2005/0241292 A1 | 11/2005 | Taylor et al. |
| 2007/0186535 A1 | 8/2007 | Powell et al. |
| 2007/0251212 A1 | 11/2007 | Tester |
| 2009/0078819 A1 | 3/2009 | Guering et al. |
| 2009/0090096 A1 | 4/2009 | Sheridan |
| 2010/0014977 A1 | 1/2010 | Shattuck |
| 2010/0111674 A1 | 5/2010 | Sparks |
| 2010/0251726 A1 | 10/2010 | Jones et al. |
| 2010/0326050 A1 | 12/2010 | Schilling et al. |
| 2010/0329856 A1 | 12/2010 | Hofer et al. |
| 2011/0150659 A1 | 6/2011 | Micheli et al. |
| 2011/0192166 A1 | 8/2011 | Mulcaire |
| 2012/0177493 A1 | 7/2012 | Fabre |
| 2013/0098050 A1 | 4/2013 | Kupratis |
| 2013/0104521 A1 | 5/2013 | Kupratis |
| 2013/0104522 A1 | 5/2013 | Kupratis |
| 2013/0104560 A1 | 5/2013 | Kupratis |
| 2014/0133982 A1 | 5/2014 | Dejeu et al. |
| 2014/0345253 A1 | 11/2014 | Dawson et al. |
| 2014/0345254 A1 | 11/2014 | Dawson et al. |
| 2015/0003993 A1 | 1/2015 | Kim et al. |
| 2015/0098813 A1 | 4/2015 | Jarrett, Jr |
| 2015/0121893 A1 | 5/2015 | Kupratis |
| 2015/0284070 A1 | 10/2015 | Breeze-Stringfellow et al. |
| 2015/0291276 A1 | 10/2015 | Zatorski et al. |
| 2016/0010487 A1 | 1/2016 | Breeze-Stringfellow et al. |
| 2016/0053692 A1 | 2/2016 | Izquierdo |
| 2016/0090863 A1 | 3/2016 | Diaz et al. |
| 2016/0160647 A1 | 6/2016 | Hofer et al. |
| 2016/0230658 A1 | 8/2016 | Hanlon et al. |
| 2016/0298550 A1 | 10/2016 | Kupratis et al. |
| 2016/0333734 A1 | 11/2016 | Bowden et al. |
| 2016/0347463 A1 | 12/2016 | Negulescu |
| 2017/0051678 A1 | 2/2017 | Becker, Jr. |
| 2017/0051680 A1 | 2/2017 | Becker, Jr. et al. |
| 2017/0102006 A1 | 4/2017 | Miller et al. |
| 2017/0114721 A1 | 4/2017 | Miller et al. |
| 2017/0167382 A1 | 6/2017 | Miller et al. |
| 2017/0184027 A1 | 6/2017 | Moniz et al. |
| 2017/0198719 A1 | 7/2017 | Cerny et al. |
| 2018/0065727 A1 | 3/2018 | Gruber et al. |
| 2018/0118364 A1 | 5/2018 | Golshany et al. |
| 2018/0215475 A1 | 8/2018 | Hurt et al. |
| 2018/0283795 A1 | 10/2018 | Cerny et al. |
| 2019/0136710 A1 | 5/2019 | Breeze-Stringfellow et al. |
| 2019/0153952 A1 | 5/2019 | Niergarth et al. |
| 2019/0153953 A1 | 5/2019 | Niergarth et al. |
| 2019/0218971 A1 | 7/2019 | Niergarth et al. |
| 2019/0249599 A1 | 8/2019 | Sen et al. |
| 2019/0257247 A1 | 8/2019 | Pal et al. |
| 2019/0360401 A1 | 11/2019 | Rambo et al. |
| 2020/0025109 A1 | 1/2020 | Stieger et al. |
| 2020/0095939 A1 | 3/2020 | Epstein |
| 2020/0116104 A1 | 4/2020 | Levisse et al. |
| 2020/0332718 A1 | 10/2020 | Rambo |
| 2021/0108573 A1 | 4/2021 | Sibbach et al. |
| 2021/0108595 A1 | 4/2021 | Khalid et al. |
| 2021/0108597 A1 | 4/2021 | Ostdiek et al. |
| 2022/0042463 A1 | 2/2022 | Molesini et al. |
| 2022/0056811 A1 | 2/2022 | Molesini et al. |

FOREIGN PATENT DOCUMENTS

| | | |
|---|---|---|
| DE | 1081277 B | 5/1960 |
| EP | 0385913 A1 | 9/1990 |
| EP | 0887259 A2 | 12/1998 |
| EP | 1493900 A2 | 1/2005 |
| EP | 1988274 A2 | 11/2008 |
| EP | 2540989 A2 | 1/2013 |
| EP | 2562082 A2 | 2/2013 |
| EP | 3093443 A1 | 11/2016 |
| GB | 2100799 A | 1/1983 |
| GB | 2196390 A | 4/1988 |
| GB | 2461811 A | 1/2010 |
| JP | H0370698 A | 3/1991 |
| JP | 2006123880 A | 5/2006 |
| JP | 2009508748 A | 3/2009 |
| JP | 2011527263 A | 10/2011 |
| KR | 101179277 B1 | 9/2012 |
| WO | WO2004/033295 A1 | 4/2004 |
| WO | WO2005/111413 A1 | 11/2005 |

(56) References Cited

FOREIGN PATENT DOCUMENTS

| WO | WO2011/020458 A2 | 2/2011 |
|---|---|---|
| WO | WO2011/094477 A2 | 8/2011 |
| WO | WO2011/107320 A1 | 9/2011 |
| WO | WO2014/143248 A1 | 9/2014 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

| R1/R3 | TPAR | CBR | RqRPrim.-FAN | RqRSec.-FAN |
|---|---|---|---|---|
| 1.489 | 4.7 | 1.41 | 0.25 | 0.60 |
| 1.581 | 4.9 | 1.01 | 0.25 | 0.60 |
| 1.663 | 5.1 | 0.65 | 0.25 | 0.60 |
| 1.758 | 5.2 | 0.35 | 0.25 | 0.60 |
| 1.420 | 7.6 | 2.31 | 0.25 | 0.60 |
| 1.508 | 7.8 | 1.63 | 0.25 | 0.60 |
| 1.587 | 8.0 | 1.04 | 0.25 | 0.60 |
| 1.677 | 8.1 | 0.56 | 0.25 | 0.60 |
| 1.930 | 8.2 | 0.11 | 0.25 | 0.60 |
| 1.330 | 12.2 | 3.82 | 0.25 | 0.60 |
| 1.412 | 12.4 | 2.66 | 0.25 | 0.60 |
| 1.486 | 12.6 | 1.68 | 0.25 | 0.60 |
| 1.581 | 12.7 | 0.99 | 0.30 | 0.60 |
| 1.610 | 12.7 | 0.99 | 0.35 | 0.60 |
| 1.610 | 12.7 | 0.99 | 0.35 | 0.60 |
| 1.812 | 12.7 | 0.99 | 0.25 | 0.55 |
| 1.839 | 12.7 | 0.99 | 0.30 | 0.55 |
| 1.873 | 12.7 | 0.99 | 0.35 | 0.55 |
| 1.873 | 12.7 | 0.99 | 0.35 | 0.55 |
| 1.223 | 12.7 | 0.99 | 0.25 | 0.65 |
| 1.242 | 12.7 | 0.99 | 0.30 | 0.65 |
| 1.264 | 12.7 | 0.99 | 0.35 | 0.65 |
| 1.264 | 12.7 | 0.99 | 0.35 | 0.65 |
| 1.570 | 12.7 | 0.91 | 0.25 | 0.60 |
| 1.628 | 12.7 | 0.71 | 0.30 | 0.60 |
| 1.658 | 12.7 | 0.71 | 0.35 | 0.60 |
| 1.658 | 12.7 | 0.71 | 0.35 | 0.60 |
| 1.876 | 12.7 | 0.71 | 0.25 | 0.55 |
| 1.904 | 12.7 | 0.71 | 0.30 | 0.55 |
| 1.939 | 12.7 | 0.71 | 0.35 | 0.55 |
| 1.939 | 12.7 | 0.71 | 0.35 | 0.55 |
| 1.242 | 12.7 | 0.71 | 0.25 | 0.65 |
| 1.260 | 12.7 | 0.71 | 0.30 | 0.65 |
| 1.283 | 12.7 | 0.71 | 0.35 | 0.65 |
| 1.283 | 12.7 | 0.71 | 0.35 | 0.65 |
| 1.702 | 12.8 | 0.42 | 0.30 | 0.60 |
| 1.733 | 12.8 | 0.42 | 0.35 | 0.60 |
| 1.733 | 12.8 | 0.42 | 0.35 | 0.60 |
| 1.973 | 12.8 | 0.42 | 0.25 | 0.55 |
| 2.003 | 12.8 | 0.42 | 0.30 | 0.55 |
| 2.039 | 12.8 | 0.42 | 0.35 | 0.55 |
| 2.039 | 12.8 | 0.42 | 0.35 | 0.55 |
| 1.278 | 12.8 | 0.42 | 0.25 | 0.65 |
| 1.298 | 12.8 | 0.42 | 0.30 | 0.65 |

FIG. 4A

| R1/R3 | TPAR | CBR | RqRPrim.-FAN | RqRSec.-FAN |
|---|---|---|---|---|
| 1.321 | 12.8 | 0.42 | 0.35 | 0.65 |
| 1.321 | 12.8 | 0.42 | 0.35 | 0.65 |
| 1.812 | 12.8 | 0.17 | 0.25 | 0.60 |
| 1.839 | 12.8 | 0.17 | 0.30 | 0.60 |
| 1.873 | 12.8 | 0.17 | 0.35 | 0.60 |
| 1.873 | 12.8 | 0.17 | 0.35 | 0.60 |
| 2.144 | 12.8 | 0.17 | 0.25 | 0.55 |
| 2.176 | 12.8 | 0.17 | 0.30 | 0.55 |
| 2.216 | 12.8 | 0.17 | 0.35 | 0.55 |
| 2.216 | 12.8 | 0.17 | 0.35 | 0.55 |
| 1.362 | 12.8 | 0.17 | 0.25 | 0.65 |
| 1.383 | 12.8 | 0.17 | 0.30 | 0.65 |
| 1.408 | 12.8 | 0.17 | 0.35 | 0.65 |
| 1.408 | 12.8 | 0.17 | 0.35 | 0.65 |
| 2.492 | 13.2 | 2.84 | 0.25 | 0.60 |
| 2.295 | 13.3 | 2.99 | 0.25 | 0.60 |
| 2.010 | 13.5 | 3.26 | 0.25 | 0.60 |
| 1.788 | 13.7 | 3.55 | 0.25 | 0.60 |
| 2.671 | 13.8 | 2.11 | 0.30 | 0.60 |
| 2.720 | 13.8 | 2.11 | 0.35 | 0.60 |
| 2.720 | 13.8 | 2.11 | 0.35 | 0.60 |
| 2.969 | 13.8 | 2.11 | 0.25 | 0.55 |
| 3.013 | 13.8 | 2.11 | 0.30 | 0.55 |
| 3.068 | 13.8 | 2.11 | 0.35 | 0.55 |
| 3.068 | 13.8 | 2.11 | 0.35 | 0.55 |
| 2.209 | 13.8 | 2.11 | 0.25 | 0.65 |
| 2.242 | 13.8 | 2.11 | 0.30 | 0.65 |
| 2.283 | 13.8 | 2.11 | 0.35 | 0.65 |
| 2.283 | 13.8 | 2.11 | 0.35 | 0.65 |
| 2.647 | 13.9 | 2.03 | 0.25 | 0.60 |
| 2.780 | 14.2 | 1.54 | 0.30 | 0.60 |
| 2.831 | 14.2 | 1.54 | 0.35 | 0.60 |
| 2.831 | 14.2 | 1.54 | 0.35 | 0.60 |
| 3.129 | 14.2 | 1.54 | 0.25 | 0.55 |
| 3.176 | 14.2 | 1.54 | 0.30 | 0.55 |
| 3.234 | 14.2 | 1.54 | 0.35 | 0.55 |
| 3.234 | 14.2 | 1.54 | 0.35 | 0.55 |
| 2.239 | 14.2 | 1.54 | 0.25 | 0.65 |
| 2.273 | 14.2 | 1.54 | 0.30 | 0.65 |
| 2.314 | 14.2 | 1.54 | 0.35 | 0.65 |
| 2.314 | 14.2 | 1.54 | 0.35 | 0.65 |
| 2.783 | 14.4 | 1.32 | 0.25 | 0.60 |
| 2.920 | 14.6 | 0.93 | 0.30 | 0.60 |
| 2.973 | 14.6 | 0.93 | 0.35 | 0.60 |

FIG. 4B

| R1/R3 | TPAR | CBR | RqRPrim.-FAN | RqRSec.-FAN |
|---|---|---|---|---|
| 2.973 | 14.6 | 0.93 | 0.35 | 0.60 |
| 3.334 | 14.6 | 0.93 | 0.25 | 0.55 |
| 3.384 | 14.6 | 0.93 | 0.30 | 0.55 |
| 3.446 | 14.6 | 0.93 | 0.35 | 0.55 |
| 3.446 | 14.6 | 0.93 | 0.35 | 0.55 |
| 2.277 | 14.6 | 0.93 | 0.25 | 0.65 |
| 2.311 | 14.6 | 0.93 | 0.30 | 0.65 |
| 2.354 | 14.6 | 0.93 | 0.35 | 0.65 |
| 2.354 | 14.6 | 0.93 | 0.35 | 0.65 |
| 2.942 | 14.8 | 0.72 | 0.25 | 0.60 |
| 3.376 | 15.1 | 0.14 | 0.25 | 0.60 |
| 3.427 | 15.1 | 0.14 | 0.30 | 0.60 |
| 3.490 | 15.1 | 0.14 | 0.35 | 0.60 |
| 3.490 | 15.1 | 0.14 | 0.35 | 0.60 |
| 3.994 | 15.1 | 0.14 | 0.25 | 0.55 |
| 4.054 | 15.1 | 0.14 | 0.30 | 0.55 |
| 4.129 | 15.1 | 0.14 | 0.35 | 0.55 |
| 4.129 | 15.1 | 0.14 | 0.35 | 0.55 |
| 2.540 | 15.1 | 0.14 | 0.25 | 0.65 |
| 2.625 | 15.1 | 0.14 | 0.35 | 0.65 |
| 1.271 | 15.5 | 4.98 | 0.25 | 0.60 |
| 1.348 | 15.7 | 3.46 | 0.25 | 0.60 |
| 1.419 | 15.8 | 2.18 | 0.25 | 0.60 |
| 1.499 | 15.9 | 1.17 | 0.25 | 0.60 |
| 1.735 | 16.0 | 0.21 | 0.25 | 0.60 |
| 2.703 | 16.6 | 3.32 | 0.25 | 0.60 |
| 2.476 | 16.7 | 3.51 | 0.25 | 0.60 |
| 2.146 | 16.9 | 3.86 | 0.25 | 0.60 |
| 2.833 | 17.0 | 2.84 | 0.30 | 0.60 |
| 2.885 | 17.0 | 2.84 | 0.35 | 0.60 |
| 2.885 | 17.0 | 2.84 | 0.35 | 0.60 |
| 3.126 | 17.0 | 2.84 | 0.25 | 0.55 |
| 3.173 | 17.0 | 2.84 | 0.30 | 0.55 |
| 3.232 | 17.0 | 2.84 | 0.35 | 0.55 |
| 3.232 | 17.0 | 2.84 | 0.35 | 0.55 |
| 2.373 | 17.0 | 2.84 | 0.25 | 0.65 |
| 2.408 | 17.0 | 2.84 | 0.30 | 0.65 |
| 2.453 | 17.0 | 2.84 | 0.35 | 0.65 |
| 2.453 | 17.0 | 2.84 | 0.35 | 0.65 |
| 1.888 | 17.2 | 4.23 | 0.25 | 0.60 |
| 2.869 | 17.3 | 2.38 | 0.25 | 0.60 |
| 3.318 | 17.6 | 2.08 | 0.25 | 0.55 |
| 3.368 | 17.6 | 2.08 | 0.30 | 0.55 |
| 3.430 | 17.6 | 2.08 | 0.35 | 0.55 |

FIG. 4C

| R1/R3 | TPAR | CBR | RqRPrim.-FAN | RqRSec.-FAN |
|---|---|---|---|---|
| 3.430 | 17.6 | 2.08 | 0.35 | 0.55 |
| 2.415 | 17.6 | 2.08 | 0.25 | 0.65 |
| 2.452 | 17.6 | 2.08 | 0.30 | 0.65 |
| 2.497 | 17.6 | 2.08 | 0.35 | 0.65 |
| 2.497 | 17.6 | 2.08 | 0.35 | 0.65 |
| 3.019 | 17.9 | 1.54 | 0.25 | 0.60 |
| 3.123 | 18.1 | 1.26 | 0.30 | 0.60 |
| 3.181 | 18.1 | 1.26 | 0.35 | 0.60 |
| 3.181 | 18.1 | 1.26 | 0.35 | 0.60 |
| 3.554 | 18.1 | 1.26 | 0.25 | 0.55 |
| 3.607 | 18.1 | 1.26 | 0.30 | 0.55 |
| 3.673 | 18.1 | 1.26 | 0.35 | 0.55 |
| 3.673 | 18.1 | 1.26 | 0.35 | 0.55 |
| 2.457 | 18.1 | 1.26 | 0.25 | 0.65 |
| 2.494 | 18.1 | 1.26 | 0.30 | 0.65 |
| 2.540 | 18.1 | 1.26 | 0.35 | 0.65 |
| 2.540 | 18.1 | 1.26 | 0.35 | 0.65 |
| 3.190 | 18.4 | 0.84 | 0.25 | 0.60 |
| 3.376 | 18.6 | 0.52 | 0.30 | 0.60 |
| 3.962 | 18.6 | 0.52 | 0.30 | 0.55 |
| 4.034 | 18.6 | 0.52 | 0.35 | 0.55 |
| 4.034 | 18.6 | 0.52 | 0.35 | 0.55 |
| 2.555 | 18.6 | 0.52 | 0.25 | 0.65 |
| 2.593 | 18.6 | 0.52 | 0.30 | 0.65 |
| 2.641 | 18.6 | 0.52 | 0.35 | 0.65 |
| 2.641 | 18.6 | 0.52 | 0.35 | 0.65 |
| 3.579 | 18.8 | 0.26 | 0.30 | 0.60 |
| 3.645 | 18.8 | 0.26 | 0.35 | 0.60 |
| 3.645 | 18.8 | 0.26 | 0.35 | 0.60 |
| 4.162 | 18.8 | 0.26 | 0.25 | 0.55 |
| 4.225 | 18.8 | 0.26 | 0.30 | 0.55 |
| 4.302 | 18.8 | 0.26 | 0.35 | 0.55 |
| 4.302 | 18.8 | 0.26 | 0.35 | 0.55 |
| 2.668 | 18.8 | 0.26 | 0.25 | 0.65 |
| 2.708 | 18.8 | 0.26 | 0.30 | 0.65 |
| 2.757 | 18.8 | 0.26 | 0.35 | 0.65 |
| 2.757 | 18.8 | 0.26 | 0.35 | 0.65 |
| 3.683 | 18.8 | 0.16 | 0.25 | 0.60 |
| 3.797 | 18.8 | 0.13 | 0.30 | 0.60 |
| 3.867 | 18.8 | 0.13 | 0.35 | 0.60 |
| 3.867 | 18.8 | 0.13 | 0.35 | 0.60 |
| 4.578 | 18.8 | 0.13 | 0.35 | 0.55 |
| 4.578 | 18.8 | 0.13 | 0.35 | 0.55 |
| 2.807 | 18.8 | 0.13 | 0.25 | 0.65 |

FIG. 4D

| R1/R3 | TPAR | CBR | RqRPrim.-FAN | RqRSec.-FAN |
|---|---|---|---|---|
| 2.849 | 18.8 | 0.13 | 0.30 | 0.65 |
| 2.902 | 18.8 | 0.13 | 0.35 | 0.65 |
| 2.902 | 18.8 | 0.13 | 0.35 | 0.65 |
| 3.018 | 21.8 | 3.94 | 0.25 | 0.60 |
| 2.746 | 21.9 | 4.17 | 0.25 | 0.60 |
| 2.349 | 22.1 | 4.63 | 0.25 | 0.60 |
| 2.039 | 22.4 | 5.12 | 0.25 | 0.60 |
| 3.205 | 22.6 | 2.80 | 0.25 | 0.60 |
| 3.372 | 23.3 | 1.80 | 0.25 | 0.60 |
| 3.563 | 23.9 | 0.99 | 0.25 | 0.60 |
| 4.108 | 24.4 | 0.19 | 0.25 | 0.60 |
| 3.773 | 26.1 | 4.35 | 0.25 | 0.60 |
| 2.965 | 26.2 | 4.63 | 0.25 | 0.60 |
| 2.515 | 26.4 | 5.16 | 0.25 | 0.60 |
| 2.162 | 26.7 | 5.75 | 0.25 | 0.60 |
| 3.473 | 27.0 | 3.10 | 0.25 | 0.60 |
| 3.656 | 27.8 | 1.99 | 0.25 | 0.60 |
| 3.867 | 28.4 | 1.07 | 0.25 | 0.60 |
| 4.428 | 28.9 | 0.22 | 0.25 | 0.60 |
| 2.674 | 30.5 | 5.59 | 0.25 | 0.60 |
| 2.281 | 30.8 | 6.27 | 0.25 | 0.60 |
| 3.732 | 31.2 | 3.32 | 0.25 | 0.60 |
| 3.927 | 32.0 | 2.13 | 0.25 | 0.60 |
| 4.150 | 32.7 | 1.16 | 0.25 | 0.60 |
| 4.788 | 33.3 | 0.22 | 0.25 | 0.60 |
| 3.799 | 35.1 | 5.03 | 0.25 | 0.60 |
| 3.420 | 35.2 | 5.35 | 0.25 | 0.60 |
| 2.862 | 35.4 | 6.02 | 0.25 | 0.60 |
| 3.959 | 35.5 | 4.41 | 0.30 | 0.60 |
| 4.032 | 35.5 | 4.41 | 0.35 | 0.60 |
| 4.032 | 35.5 | 4.41 | 0.35 | 0.60 |
| 4.362 | 35.5 | 4.41 | 0.25 | 0.55 |
| 4.427 | 35.5 | 4.41 | 0.30 | 0.55 |
| 4.508 | 35.5 | 4.41 | 0.35 | 0.55 |
| 4.508 | 35.5 | 4.41 | 0.35 | 0.55 |
| 3.327 | 35.5 | 4.41 | 0.25 | 0.65 |
| 3.377 | 35.5 | 4.41 | 0.30 | 0.65 |
| 3.439 | 35.5 | 4.41 | 0.35 | 0.65 |
| 3.439 | 35.5 | 4.41 | 0.35 | 0.65 |
| 2.422 | 35.7 | 6.79 | 0.25 | 0.60 |
| 4.035 | 36.2 | 3.55 | 0.25 | 0.60 |
| 4.682 | 36.5 | 3.02 | 0.25 | 0.55 |
| 4.752 | 36.5 | 3.02 | 0.30 | 0.55 |
| 4.839 | 36.5 | 3.02 | 0.35 | 0.55 |

FIG. 4E

| R1/R3 | TPAR | CBR | RqRPrim.-FAN | RqRSec.-FAN |
|---|---|---|---|---|
| 4.839 | 36.5 | 3.02 | 0.35 | 0.55 |
| 3.400 | 36.5 | 3.02 | 0.25 | 0.65 |
| 3.451 | 36.5 | 3.02 | 0.30 | 0.65 |
| 3.514 | 36.5 | 3.02 | 0.35 | 0.65 |
| 3.514 | 36.5 | 3.02 | 0.35 | 0.65 |
| 4.245 | 37.0 | 2.27 | 0.25 | 0.60 |
| 4.464 | 37.5 | 1.55 | 0.30 | 0.60 |
| 4.546 | 37.5 | 1.55 | 0.35 | 0.60 |
| 4.546 | 37.5 | 1.55 | 0.35 | 0.60 |
| 5.101 | 37.5 | 1.55 | 0.25 | 0.55 |
| 5.177 | 37.5 | 1.55 | 0.30 | 0.55 |
| 5.272 | 37.5 | 1.55 | 0.35 | 0.55 |
| 5.272 | 37.5 | 1.55 | 0.35 | 0.55 |
| 3.477 | 37.5 | 1.55 | 0.25 | 0.65 |
| 3.529 | 37.5 | 1.55 | 0.30 | 0.65 |
| 3.594 | 37.5 | 1.55 | 0.35 | 0.65 |
| 3.594 | 37.5 | 1.55 | 0.35 | 0.65 |
| 4.487 | 37.7 | 1.23 | 0.25 | 0.60 |
| 5.162 | 38.3 | 0.24 | 0.25 | 0.60 |
| 6.208 | 38.4 | 0.20 | 0.25 | 0.55 |
| 6.301 | 38.4 | 0.20 | 0.30 | 0.55 |
| 6.417 | 38.4 | 0.20 | 0.35 | 0.55 |
| 6.417 | 38.4 | 0.20 | 0.35 | 0.55 |
| 3.936 | 38.4 | 0.20 | 0.25 | 0.65 |
| 3.995 | 38.4 | 0.20 | 0.30 | 0.65 |
| 4.069 | 38.4 | 0.20 | 0.35 | 0.65 |
| 4.069 | 38.4 | 0.20 | 0.35 | 0.65 |
| 4.185 | 41.8 | 5.36 | 0.25 | 0.60 |
| 3.754 | 41.9 | 5.73 | 0.25 | 0.60 |
| 3.118 | 42.1 | 6.48 | 0.25 | 0.60 |
| 2.616 | 42.5 | 7.36 | 0.25 | 0.60 |
| 4.446 | 42.9 | 3.77 | 0.25 | 0.60 |
| 4.677 | 43.8 | 2.41 | 0.25 | 0.60 |
| 4.943 | 44.5 | 1.30 | 0.25 | 0.60 |
| 5.664 | 45.2 | 0.26 | 0.25 | 0.60 |
| 4.577 | 48.6 | 5.59 | 0.25 | 0.60 |
| 4.092 | 48.7 | 5.99 | 0.25 | 0.60 |
| 3.378 | 48.9 | 6.81 | 0.25 | 0.60 |
| 2.814 | 49.3 | 7.77 | 0.25 | 0.60 |
| 4.859 | 49.7 | 3.92 | 0.25 | 0.60 |
| 5.112 | 50.7 | 2.50 | 0.25 | 0.60 |
| 5.158 | 56.5 | 6.05 | 0.35 | 0.60 |
| 5.158 | 56.5 | 6.05 | 0.35 | 0.60 |
| 5.528 | 56.5 | 6.05 | 0.25 | 0.55 |

FIG. 4F

| R1/R3 | TPAR | CBR | RqRPrim.-FAN | RqRSec.-FAN |
|---|---|---|---|---|
| 5.611 | 56.5 | 6.05 | 0.30 | 0.55 |
| 5.713 | 56.5 | 6.05 | 0.35 | 0.55 |
| 5.713 | 56.5 | 6.05 | 0.35 | 0.55 |
| 4.331 | 56.5 | 6.05 | 0.25 | 0.65 |
| 4.396 | 56.5 | 6.05 | 0.30 | 0.65 |
| 4.477 | 56.5 | 6.05 | 0.35 | 0.65 |
| 4.477 | 56.5 | 6.05 | 0.35 | 0.65 |
| 5.048 | 56.7 | 5.75 | 0.25 | 0.60 |
| 4.502 | 56.8 | 6.17 | 0.25 | 0.60 |
| 3.696 | 57.1 | 7.05 | 0.25 | 0.60 |
| 3.057 | 57.5 | 8.10 | 0.25 | 0.60 |
| 5.359 | 57.9 | 4.02 | 0.25 | 0.60 |
| 5.524 | 58.2 | 3.56 | 0.30 | 0.60 |
| 5.626 | 58.2 | 3.56 | 0.35 | 0.60 |
| 5.626 | 58.2 | 3.56 | 0.35 | 0.60 |
| 6.179 | 58.2 | 3.56 | 0.25 | 0.55 |
| 6.272 | 58.2 | 3.56 | 0.30 | 0.55 |
| 6.387 | 58.2 | 3.56 | 0.35 | 0.55 |
| 6.387 | 58.2 | 3.56 | 0.35 | 0.55 |
| 4.659 | 58.2 | 3.56 | 0.35 | 0.65 |
| 4.659 | 58.2 | 3.56 | 0.35 | 0.65 |
| 5.638 | 58.8 | 2.56 | 0.25 | 0.60 |
| 5.907 | 59.3 | 1.81 | 0.30 | 0.60 |
| 6.015 | 59.3 | 1.81 | 0.35 | 0.60 |
| 6.015 | 59.3 | 1.81 | 0.35 | 0.60 |
| 6.743 | 59.3 | 1.81 | 0.25 | 0.55 |
| 6.844 | 59.3 | 1.81 | 0.30 | 0.55 |
| 6.970 | 59.3 | 1.81 | 0.35 | 0.55 |
| 6.970 | 59.3 | 1.81 | 0.35 | 0.55 |
| 4.611 | 59.3 | 1.81 | 0.25 | 0.65 |
| 4.680 | 59.3 | 1.81 | 0.30 | 0.65 |
| 4.766 | 59.3 | 1.81 | 0.35 | 0.65 |
| 4.766 | 59.3 | 1.81 | 0.35 | 0.65 |
| 5.959 | 59.6 | 1.38 | 0.25 | 0.60 |
| 6.766 | 60.2 | 0.37 | 0.30 | 0.60 |
| 6.890 | 60.2 | 0.37 | 0.35 | 0.60 |
| 6.890 | 60.2 | 0.37 | 0.35 | 0.60 |
| 7.874 | 60.2 | 0.37 | 0.25 | 0.55 |
| 7.993 | 60.2 | 0.37 | 0.30 | 0.55 |
| 8.139 | 60.2 | 0.37 | 0.35 | 0.55 |
| 8.139 | 60.2 | 0.37 | 0.35 | 0.55 |
| 5.201 | 60.2 | 0.37 | 0.35 | 0.65 |
| 6.863 | 60.2 | 0.26 | 0.25 | 0.60 |
| 5.856 | 70.3 | 5.79 | 0.25 | 0.60 |

FIG. 4G

| R1/R3 | TPAR | CBR | RqRPrim.-FAN | RqRSec.-FAN |
|---|---|---|---|---|
| 5.205 | 70.4 | 6.24 | 0.25 | 0.60 |
| 4.245 | 70.7 | 7.16 | 0.25 | 0.60 |
| 3.483 | 71.2 | 8.29 | 0.25 | 0.60 |
| 6.217 | 71.4 | 4.04 | 0.25 | 0.60 |
| 6.541 | 72.3 | 2.55 | 0.25 | 0.60 |
| 6.913 | 73.0 | 1.38 | 0.25 | 0.60 |
| 7.962 | 73.7 | 0.26 | 0.25 | 0.60 |

FIG. 4H

GAS TURBINE ENGINE WITH THIRD STREAM

CROSS-REFERENCE TO RELATED APPLICATIONS

This application is a continuation-in-part application of U.S. application Ser. No. 18/675,270, filed May 28, 2024, which is a continuation application of U.S. application Ser. No. 17/879,384 filed Aug. 2, 2022. Each of these applications is hereby incorporated by reference in their entirety.

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 4A through 4H are tables depicting numerical values showing the relationships between various parameters in accordance with various example embodiments of the present disclosure.

DETAILED DESCRIPTION

Figure 1:
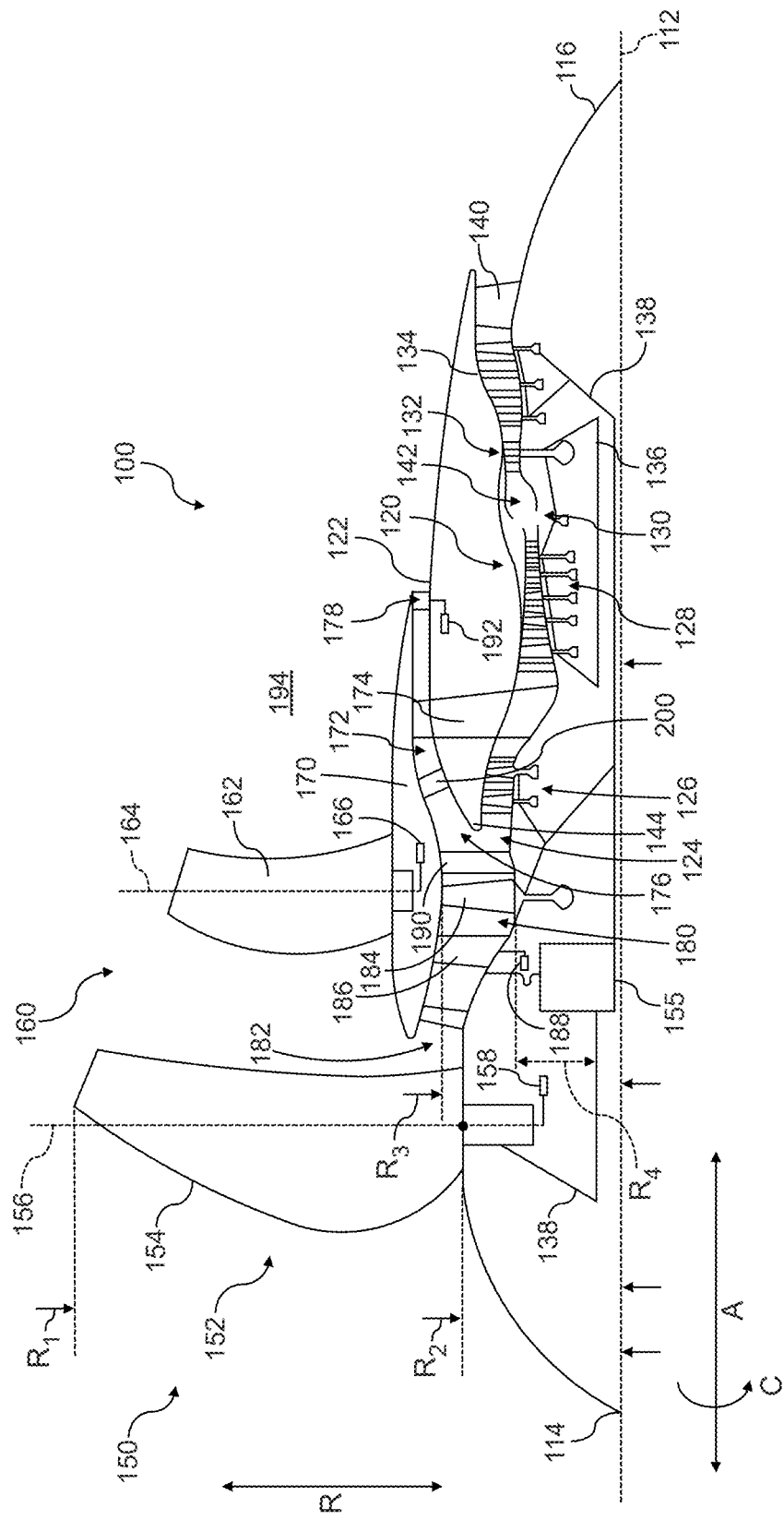
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

Generally, a turbofan engine includes a fan to provide a desired amount of thrust without overloading the fan blades (i.e., without increasing a disk loading of the fan blades of the fan beyond a certain threshold), and therefore to maintain a desired overall propulsive efficiency for the turbofan engine. Conventional turbofan engine design practice has been to provide an outer nacelle surrounding the fan to provide relatively efficient thrust for the turbofan engine. Such a configuration may generally limit a permissible size of the fan (i.e., a diameter of the fan). However, the inventors of the present disclosure have found that turbofan engine design is now driving the diameter of the fan higher to provide as much thrust for the turbofan engine as possible from the fan to improve an overall propulsive efficiency of the turbofan engine.

By increasing the fan diameter, an installation of the turbofan engine becomes more difficult. In addition, if an outer nacelle is maintained, the outer nacelle may become weight prohibitive with some larger diameter fans. Further, as the need for turbofan engines to provide more thrust continues, the thermal demands on the turbofan engines correspondingly increases.

The inventors of the present disclosure found that for a three stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiently for the gas turbine engine, or unexpectedly may in fact increase the overall propulsive efficiency of the gas turbine engine.

The inventors proceeded in the manner of designing a gas turbine engine with given primary fan characteristics, secondary fan characteristics, and turbomachine characteristics; checking the propulsive efficiency of the designed gas turbine engine; redesigning the gas turbine engine with varying primary fan, secondary fan, and turbomachine characteristics; rechecking the propulsive efficiency of the redesigned gas turbine engine; etc. during the design of several different types of gas turbine engines, including the gas turbine engines described below with reference to FIGS. 1 and 6 through 10. During the course of this practice of studying/evaluating various primary fan characteristics, secondary fan characteristics, and turbomachine characteristics considered feasible for best satisfying mission requirements, it was discovered that certain relationships exist between a ratio of an airflow through the bypass passage and the third stream to an airflow through a core duct (referred to hereinbelow as a thrust to power airflow ratio), as well as between a ratio of an airflow through the third steam to the airflow through the core duct (referred to hereinbelow as a core bypass ratio). In particular, the inventors of the present disclosure have found that these ratios can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius $R_1$ along the radial direction R from the longitudinal axis 112 to the tip, and a hub radius (or inner radius) $R_2$ along the radial direction R from the longitudinal axis 112 to the base of each fan blade 154 (i.e., from the longitudinal axis 112 to a radial location where each fan blade 154 meets a front hub of the gas turbine engine 100 at a leading edge of the respective fan blade 154). As will be appreciated, a distance from the base of each fan blade 154 to a tip of the respective fan blade 154 is referred to as a span of the respective fan blade 154. Further, the fan 152, or rather each fan blade 154 of the fan 152, defines a fan radius ratio, RqR, equal to $R_1$ divided by $R_2$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the ducted fan 184 (i.e., a location where the respective fan blades of the ducted fan 184 meet an inner flowpath liner at a leading edge of the respective fan blades of the ducted fan 184). As will be appreciated, a distance from the base of each fan blade of the ducted fan 184 to a tip of the respective fan blade is referred to as a span of the respective fan blade. Further, the ducted fan 184, or rather each fan blade of the ducted fan 184, defines a fan radius ratio, RqR, equal to $R_3$ divided by $R_4$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
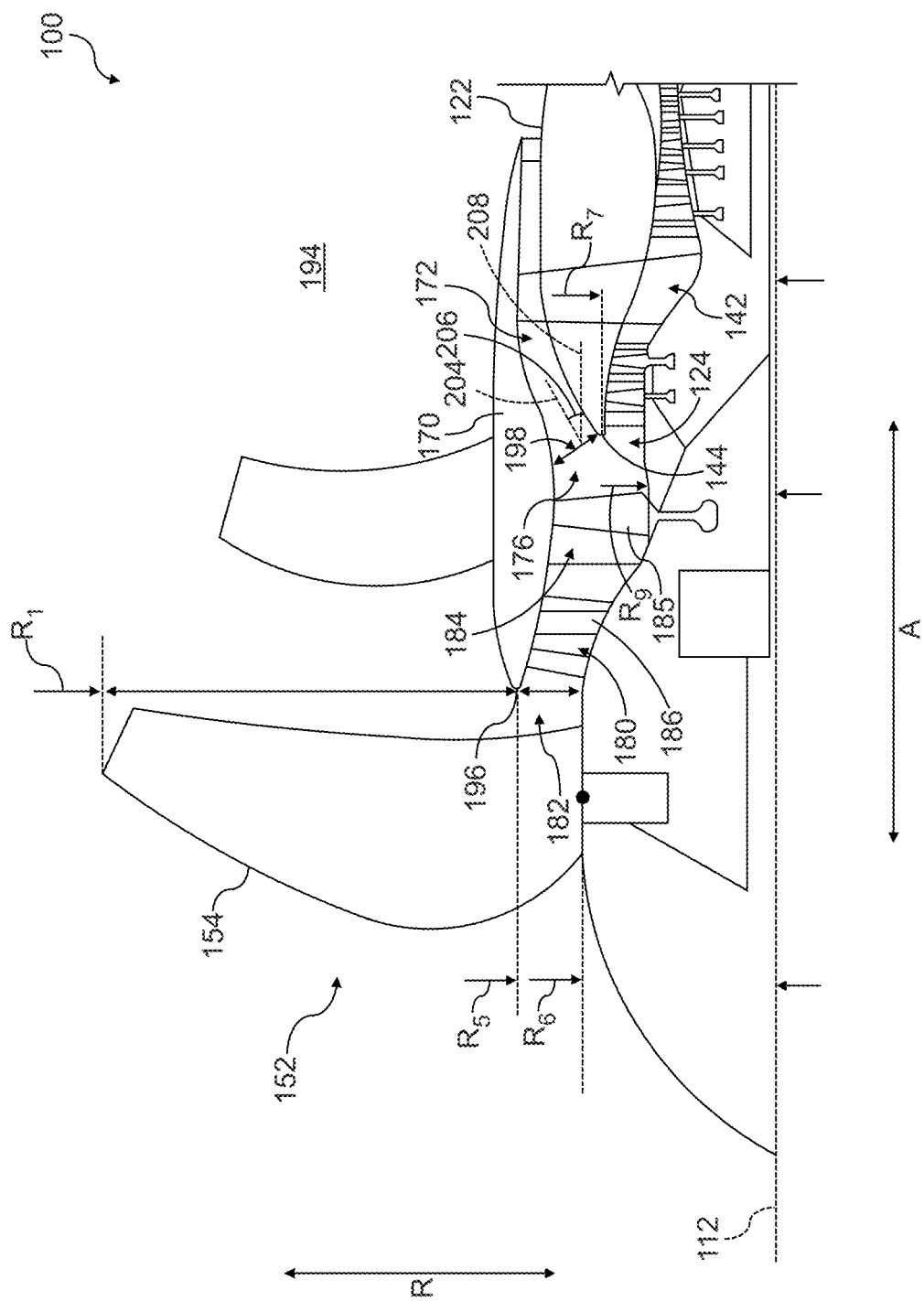
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above includes a primary fan, or rather fan 152 having fan blades 154, and a secondary fan, or rather ducted fan 184 having fan blades 185. Airflow from the fan 152 is split between a bypass passage 194 and the inlet duct 180 by an inlet splitter 196. Airflow from the ducted fan 184 is split between the fan duct 172 and the core duct 142 by the leading edge 144 (sometimes also referred to as a fan duct splitter).

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula:

$$\pi R_1^2 - \pi R_5^2.$$

The primary fan inner fan area, $A_{P\_In}$, refers to an area defined by an annulus representing a portion of the fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula:

$$\pi R_5^2 - \pi R_6^2.$$

The secondary fan outer fan area, $A_{S\_Out}$, refers to an area representing a portion of an airflow from the ducted fan 184 that is provided to the fan duct 172. In particular, the leading edge 144 defines a leading edge radius, $R_7$, and the gas turbine engine 100 defines an effective fan duct inlet outer radius, $R_8$ (see FIG. 3). The leading edge radius, $R_7$, is defined along the radial direction R from the longitudinal axis 112 to the leading edge 144.

Figure 3:
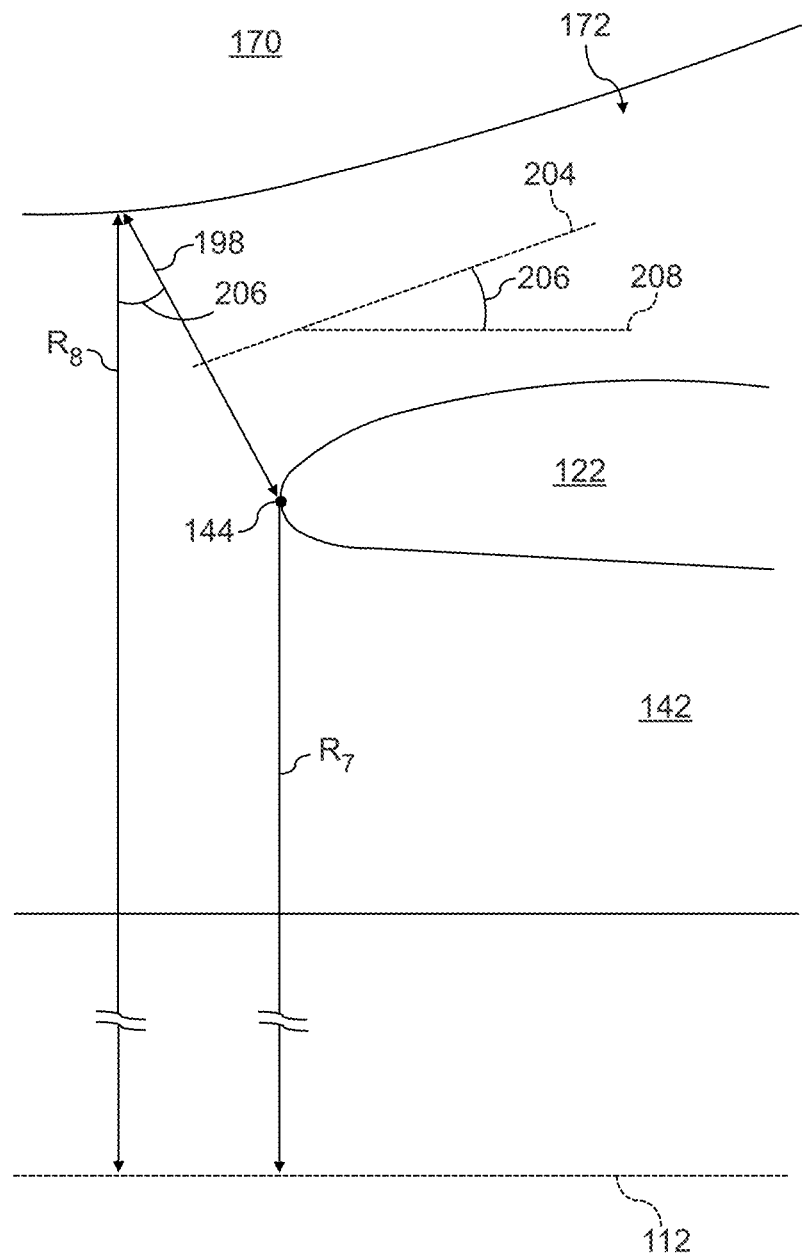
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_8$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi(R_8^2 - R_7^2)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula:

$$\pi R_7^2 - \pi R_9^2.$$

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. In particular, it will be appreciated that the exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage 194 of the engine 100 and through the fan duct 172 to an airflow through the core duct 142. Further, the core bypass ratio is a ratio of an airflow through the fan duct 172 to the airflow through the core duct 142. These ratios are calculated while the engine 100 is operating at a rated speed during standard day operating conditions, and the amounts of airflow used to calculate these ratios are each expressed as a mass flowrate in the same units (mass per unit time).

More specifically, the amount of the airflow through the bypass passage 194 is determined using a fan pressure ratio for the fan 152 while operating at the rated speed during standard day operating conditions, and the primary fan outer fan area, $A_{P\_Out}$. The amount of airflow through the inlet duct 180 is determined using a fan pressure ratio for the fan 152 while operating at a rated speed during standard day operating conditions, and the primary fan inner fan area, $A_{P\_In}$. The amount of airflow through the fan duct 172 and the amount of airflow through the core duct 142 is determined based on the amount of airflow through the inlet duct 180 and the secondary fan outer fan area, $A_{S\_Out}$, and the secondary fan inner fan area, $A_{S\_In}$.

As alluded to earlier, the inventors discovered, unexpectedly during the course of gas turbine engine design—i.e., designing gas turbine engines (e.g., both ducted and unducted turbofan engines and turboprop engines) having a variety of different primary fan and secondary fan characteristics—and evaluating an overall propulsive efficiency, significant relationships exist in a ratio of an airflow through a bypass passage and through a third stream to an airflow through a core duct (referred to herein as a thrust to power airflow ratio), as well as in a ratio of an airflow through the third steam to the airflow through the core duct (referred to herein as a core bypass ratio). These relationships can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$TPAR = (A_B + A_{3S})/A_C \quad (1)$$

$$CBR = A_{3S}/A_C \quad (2)$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and $A_C$ is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |

TABLE 1-continued

| Symbol | Description | Ranges appropriate for using Expression (1) |
| --- | --- | --- |
| CBR | Core Bypass Ratio | 0.1 to 10, such as 0.3 to 5 (see also, TABLE 2, below) |

Referring now to FIGS. 4A through 4H and 5A through 5D, the relationships between the various parameters of Expressions (1) and (2) of exemplary gas turbine engines are illustrated in accordance with one or more exemplary embodiments of the present disclosure. In particular, FIGS. 4A through 4H provide a table including numerical values corresponding to several of the plotted gas turbine engines in FIGS. 5A through 5D. FIGS. 5A through 5D are plots of gas turbine engines in accordance with one or more exemplary embodiments of the present disclosure, showing the TPAR (Y-Axis) and the CBR (X-axis). FIGS. 5A through 5D highlight preferred subranges, including subranges for unducted engines, ducted engines, and turboprop engines, as discussed hereinbelow.

Figure 5A:
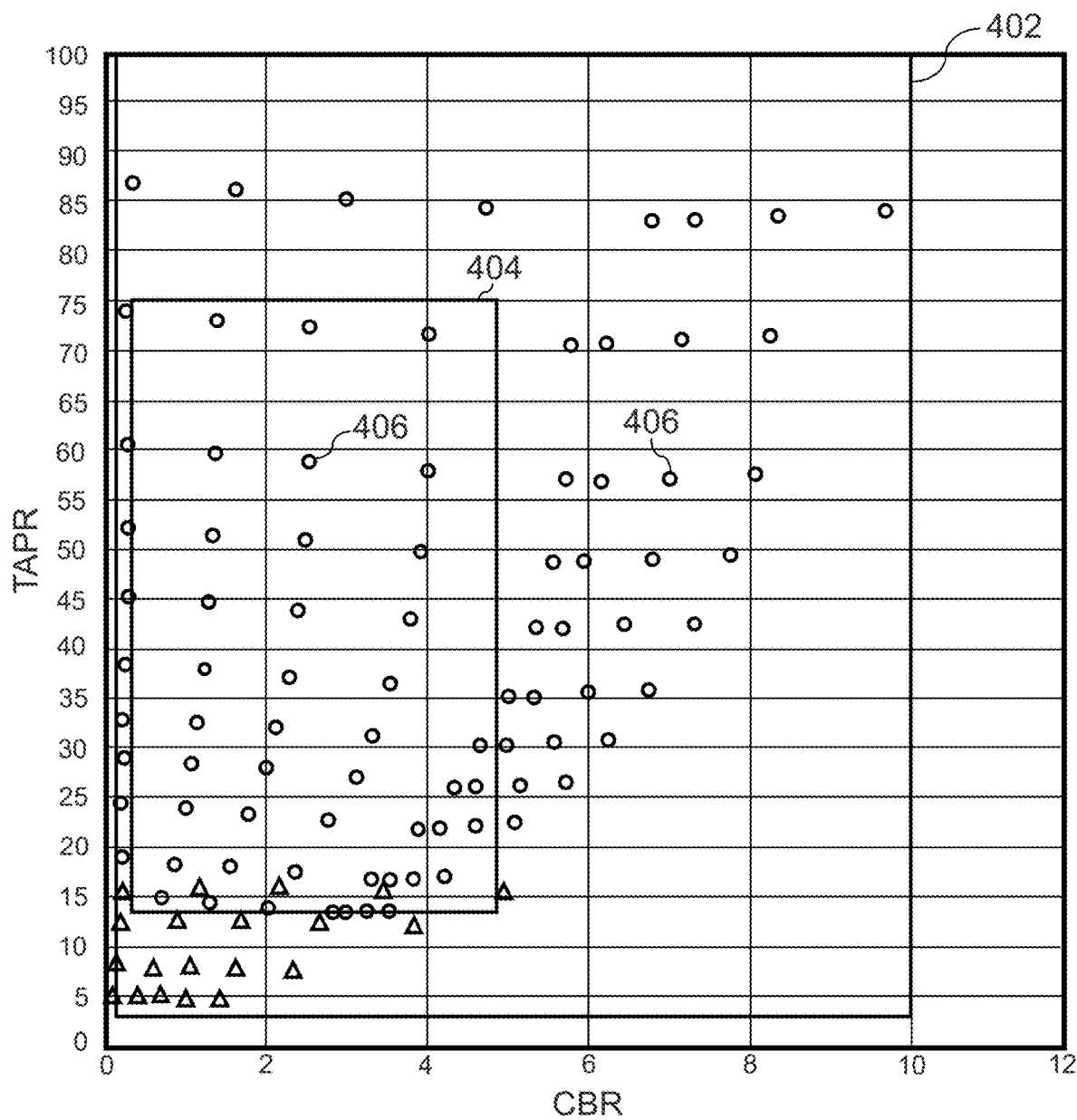
FIGS. 5A through 5D are graphs depicting a range of thrust to power airflow ratios and core bypass ratios in accordance with various example embodiments of the present disclosure.

Referring particularly to FIG. 5A, a first range 402 and a second range 404 are provided, and exemplary embodiments 406 are plotted. The exemplary embodiments 406 include a variety of gas turbine engine types in accordance with aspects of the present disclosure, including unducted turbofan engines, ducted turbofan engines, and turboprop engines. The first range 402 corresponds to a TPAR between 3.5 and 100 and a CBR between 0.1 and 10. The first range 402 captures the benefits of the present disclosure across the variety of engine types. The second range 404 corresponds to a TPAR between 14 and 75 and a CBR between 0.3 and 5. The second range 404 may provide more desirable TPAR and CBR relationships across the variety of engine types to achieve propulsive efficiency, while still providing packaging and weight benefits, thermal benefits, etc.

Figure 5B:
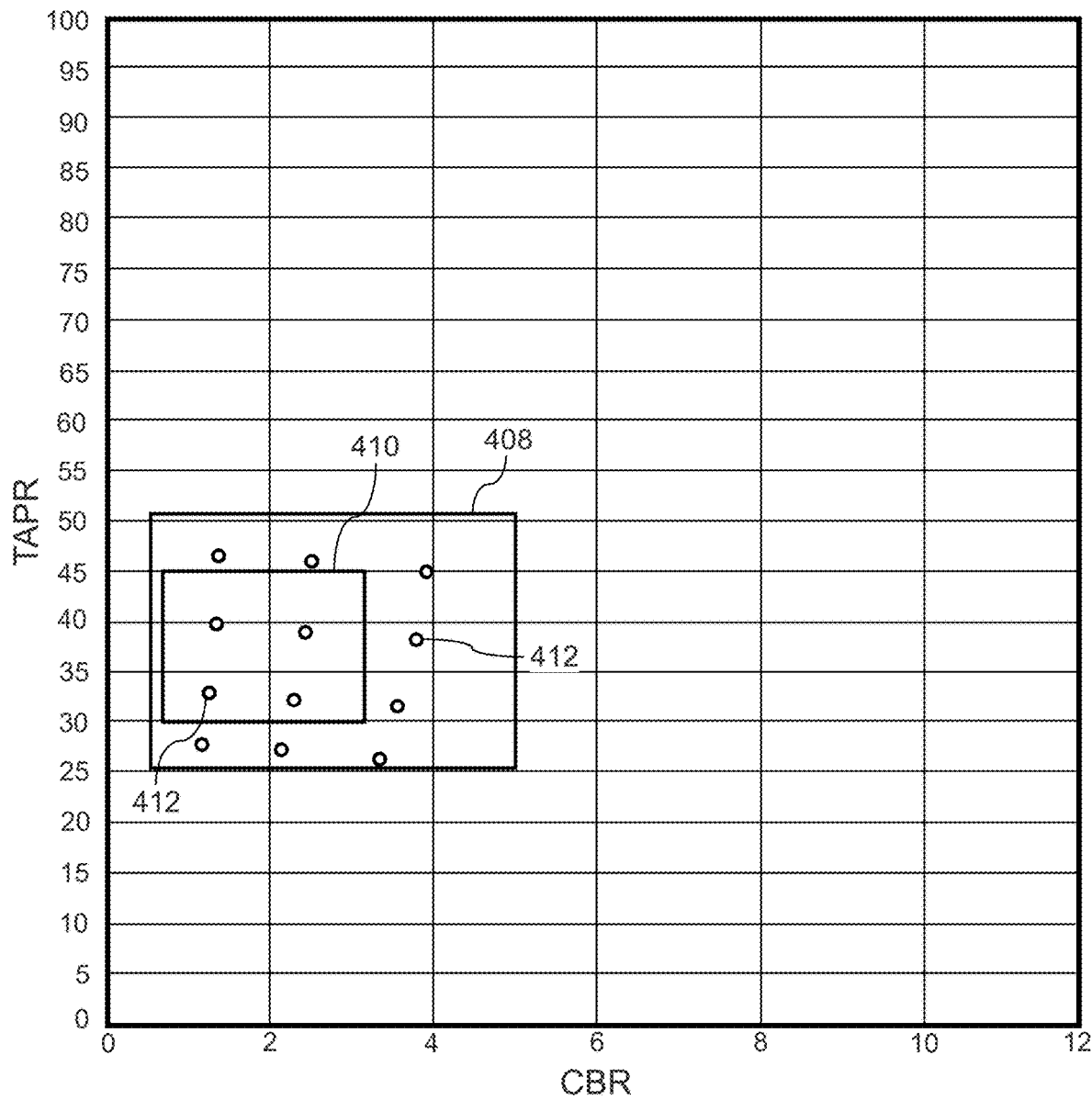

Referring particularly to FIG. 5B, a third range 408 and a fourth range 410 are provided, and exemplary embodiments 412 are plotted. The exemplary embodiments 412 include a variety of unducted gas turbine engines in accordance with aspects of the present disclosure. In particular, the exemplary embodiments 412 include a variety of gas turbine engines having an unducted primary fan, similar to the exemplary embodiments described herein with reference to FIGS. 1 and 10. The third range 408 corresponds to a TPAR between 30 and 56 and a CBR between 0.3 and 5. The third range 408 captures the benefits of the present disclosure for unducted gas turbine engines. The fourth range 410 corresponds to a TPAR between 35 and 50 and a CBR between 0.5 and 3. The fourth range 410 may provide more desirable TPAR and CBR relationships for the unducted gas turbine engines to achieve propulsive efficiency, while still providing packaging and weight benefits, thermal benefits, etc.

As will be appreciated, the unducted gas turbine engines may have, on the whole, a higher TPAR as compared to the ducted gas turbine engines (see FIG. 5C), enabled by a lack of an outer nacelle or other casing surrounding a primary fan. The range of CBR values in the fourth range 410 isn't as large as the range of CBR values in the third range 408, as in the embodiments with a higher TPAR, the CBR needs to be lower to provide a necessary amount of airflow to a core of the engine without exceeding temperature thresholds or requiring an undesired reduction in a size of the primary fan.

The inventors of the present disclosure have found that the TPAR values and CBR values in the third and fourth ranges 408, 410 shown may provide a desirable propulsive benefit, while still enabling operation of the core in a reasonable manner, and balancing installation and thermal load considerations.

Figure 5C:
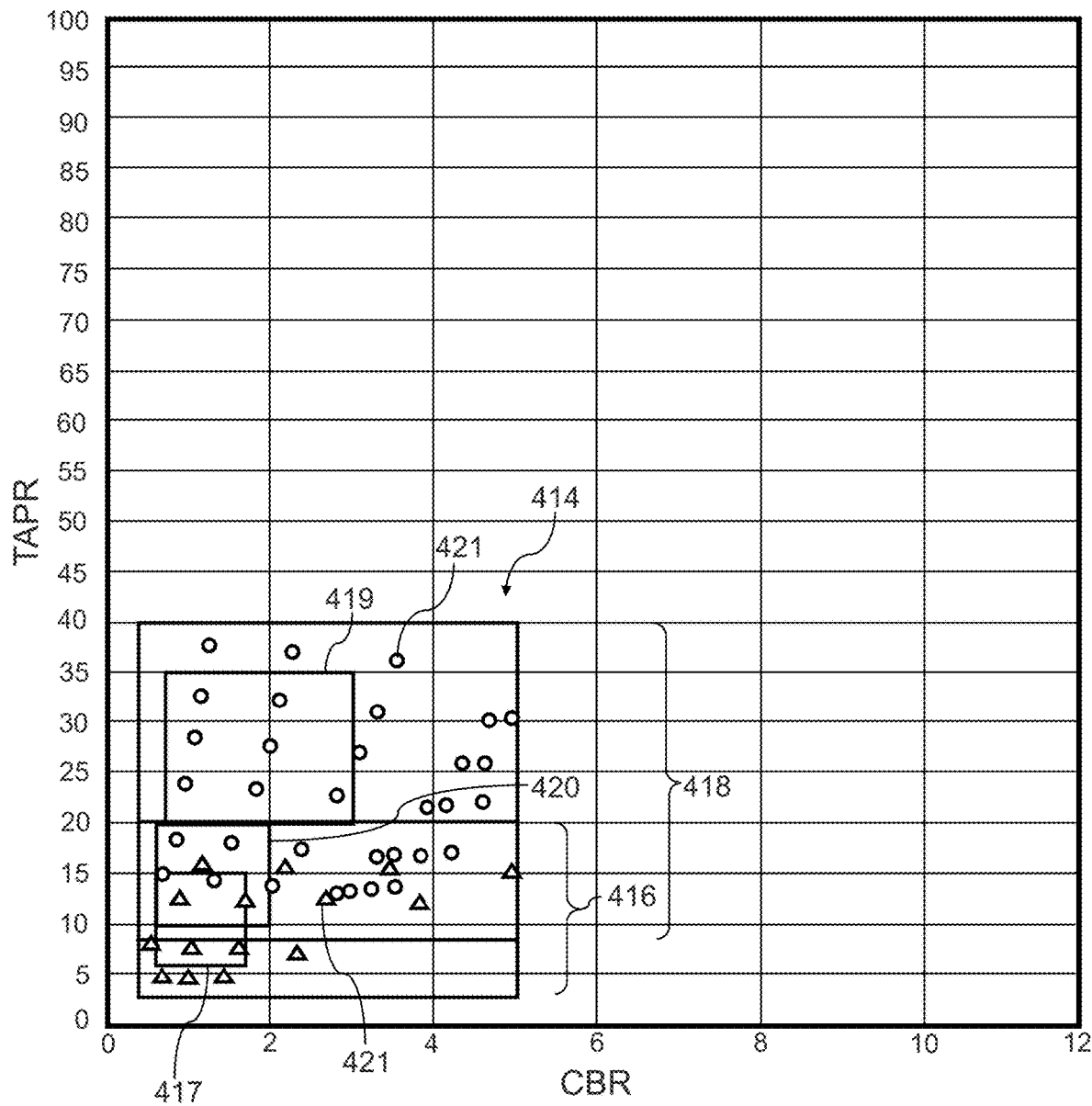

Referring particularly to FIG. 5C, a fifth range 414, a sixth range 416, a seventh range 417, an eighth range 418, a ninth range 419, and a tenth range 420 are provided, and exemplary embodiments 421 are plotted. The exemplary embodiments 421 include a variety of ducted gas turbine engines in accordance with aspects of the present disclosure. In particular, the exemplary embodiments 421 include a variety of gas turbine engines having a ducted primary fan, similar to the exemplary embodiments described herein with reference to FIGS. 7 through 9. The fifth range 414 corresponds to a TPAR between 3.5 and 40 and a CBR between 0.3 and 5. The fifth range 414 captures the benefits of the present disclosure for ducted gas turbine engines.

The sixth range 416 corresponds to a TPAR between 3.5 and 20 and a CBR between 0.2 and 5. The sixth range 416 captures the benefits of the present disclosure for ducted gas turbine engines in a direct drive configuration (see, e.g., FIG. 7). As will be appreciated, with a ducted, direct drive gas turbine engine a primary fan may be smaller, limiting a TPAR. The seventh range 417, which also corresponds to ducted gas turbine engines in a direct drive configuration, corresponds to a TPAR between 6 and 15 and a CBR between 0.3 and 1.8, and may represent a more preferrable range.

The eighth range 418 corresponds to a TPAR between 8 and 40 and a CBR between 0.2 and 5. The eighth range 418 captures the benefits of the present disclosure for ducted gas turbine engines in a geared configuration (see, e.g., FIGS. 8 and 9). As will be appreciated, with a ducted, geared gas turbine engine a primary fan may be larger as compared to a ducted, direct drive gas turbine engine, allowing for a larger TPAR. TPAR is, in turn limited by an allowable nacelle drag and fan operability.

The ninth range 419 corresponds to ducted gas turbine engines in a geared configuration having a variable pitch primary fan (see FIGS. 8 and 9) and the tenth range 420 corresponds to ducted gas turbine engines in a geared configuration having a fixed pitch primary fan. Inclusion of a variable pitch primary fan may allow for a larger fan, but may also necessitate higher heat rejection abilities for the gas turbine engine, which may, in turn increase a CBR. The ninth range 419 corresponds to a TPAR between 20 and 35 and a CBR between 0.5 and 3, and the tenth range 420 corresponds to a TPAR between 10 and 20 and a CBR between 0.3 and 2. It will be appreciated that in other exemplary aspects, a gas turbine engine of the present disclosure in a ducted, geared, variable pitch configuration may have TPAR between 15 and 40 and a CBR between 0.3 and 5, and a gas turbine engine in a ducted, geared, fixed pitch configuration may have TPAR between 8 and 25 and a CBR between 0.3 and 5.

As will be appreciated, the ducted gas turbine engines may have, on the whole, a lower TPAR than the unducted gas turbine engines as a result of an outer nacelle surrounding a primary fan (the outer nacelle becoming prohibitively heavy with higher diameter primary fans). Further, it will be appreciated that the TPAR values for geared engines may be higher than the TPAR values for direct drive engines, as inclusion of the gearbox allows the primary fan to rotate more slowly than the driving turbine, enabling a comparatively larger primary fan without overloading the primary fan or generating shock losses at a tip of the primary fan. The range of CBR values may generally be relatively high given the relatively low TPAR values (since a relatively high amount of airflow is provided to a secondary fan through an engine inlet when the TPAR values are low), as a necessary amount of airflow to a core of the ducted gas turbine engine may still be provided with a relatively high CBR without exceeding temperature thresholds or requiring a reduction in a size of the primary fan.

The inventors of the present disclosure have found that the TPAR values and CBR values in the fifth, sixth, seventh, eighth, ninth, and tenth ranges 414, 416, 417, 418, 419, 420 shown may provide a desirable propulsive benefit, while still enabling operation of the core in a reasonable manner, and balancing installation and thermal load considerations.

Figure 5D:
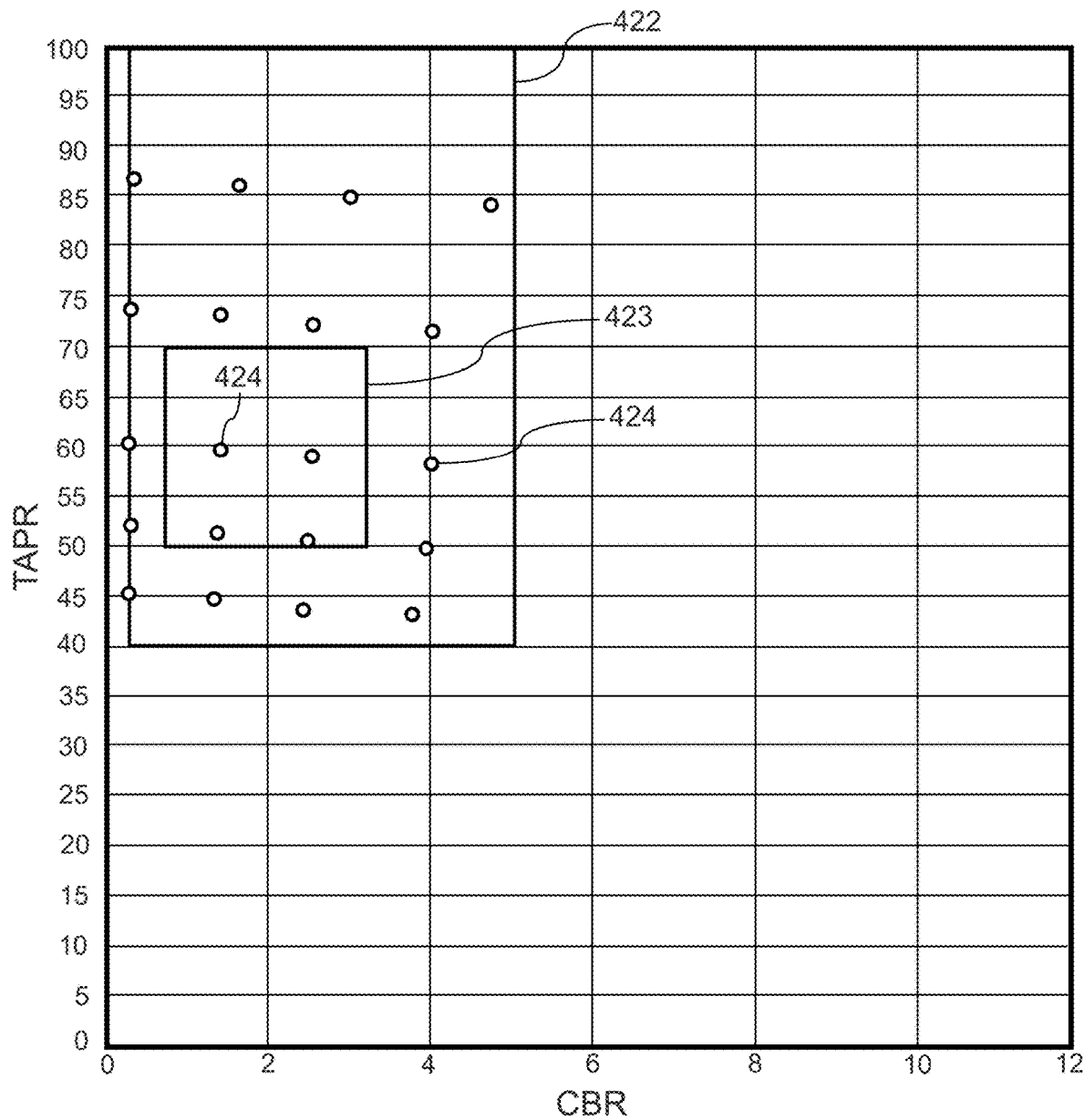

Referring particularly to FIG. 5D, an eleventh range 422 and a twelfth range 423 are provided, and exemplary embodiments 424 are plotted. The exemplary embodiments 424 include a variety of turboprop gas turbine engines in accordance with aspects of the present disclosure. In particular, the exemplary embodiments 424 include a variety of turboprop gas turbine engine similar to the exemplary embodiment described herein with reference to FIG. 6. The eleventh range 422 corresponds to a TPAR between 40 and 100 and a CBR between 0.3 and 5. The eleventh range 422 captures the benefits of the present disclosure for turboprop gas turbine engines. The twelfth range 423 corresponds to a TPAR between 50 and 70 and a CBR between 0.5 and 3, and may represent a more preferrable range.

As will be appreciated, the turboprop gas turbine engines may have, on the whole, higher TPAR values than turbofan engines, enabled by the lack of an outer nacelle or other casing surrounding a primary fan and a relatively slow operational speed of the primary fan and aircraft incorporating the turboprop gas turbine engine. The range of CBR values in the eleventh range 422 and the twelfth range 423 may be relatively small, as less air may be provided through a third stream with such a high TPAR without compromising operation of a core of the gas turbine engine.

The inventors of the present disclosure have found that the TPAR values and CBR values in the eleventh range 422 and twelfth range 423 shown may provide a desirable propulsive benefit, while still enabling operation of the core in a reasonable manner, and balancing installation and thermal load considerations.

TABLE 2, below provides a summary of TPAR values and CBR values for various gas turbine engines in accordance with one or more exemplary aspects of the present disclosure.

TABLE 2

| Engine Type | TPAR Value | CBR Value |
| --- | --- | --- |
| All Aeronautical Gas Turbine Engines ("GTE") | 3.5 to 100 | 0.1 to 10 |
| All Aeronautical GTE | 4 to 75 | 0.3 to 5 |
| Open Rotor GTE | 30 to 60 | 0.3 to 5 |
| Open Rotor GTE | 35 to 50 | 0.5 to 3 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |
| Ducted, Direct Drive GTE | 3.5 to 20 | 0.2 to 5 |
| Ducted, Direct Drive GTE (lower flight speed) | 6 to 20 | 0.2 to 5 |
| Ducted, Direct Drive GTE (lower flight speed) | 8 to 15 | 0.3 to 1.8 |

TABLE 2-continued

| Engine Type | TPAR Value | CBR Value |
| --- | --- | --- |
| Ducted, Direct Drive GTE (higher flight speed) | 3.5 to 10 | 0.2 to 2 |
| Ducted, Direct Drive GTE (higher flight speed) | 3.5 to 6 | 0.3 to 1.5 |
| Turboprop GTE | 40 to 100 | 0.3 to 5 |
| Turboprop GTE | 50 to 70 | 0.5 to 3 |

Figure 6:
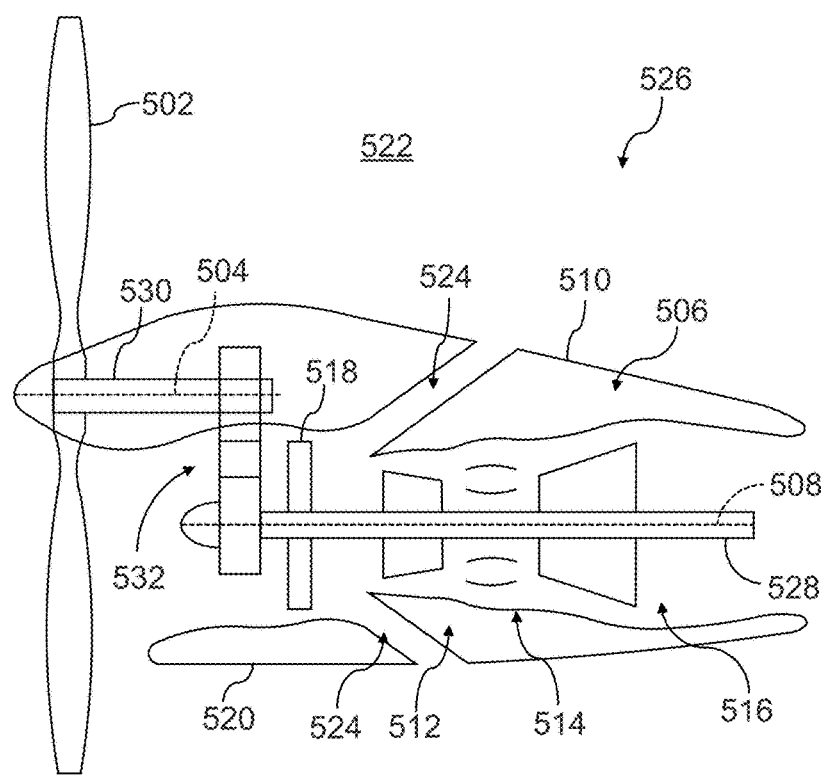
FIG. 6 is a schematic view of a turboprop engine in accordance with an exemplary aspect of the present disclosure.
Figure 7:
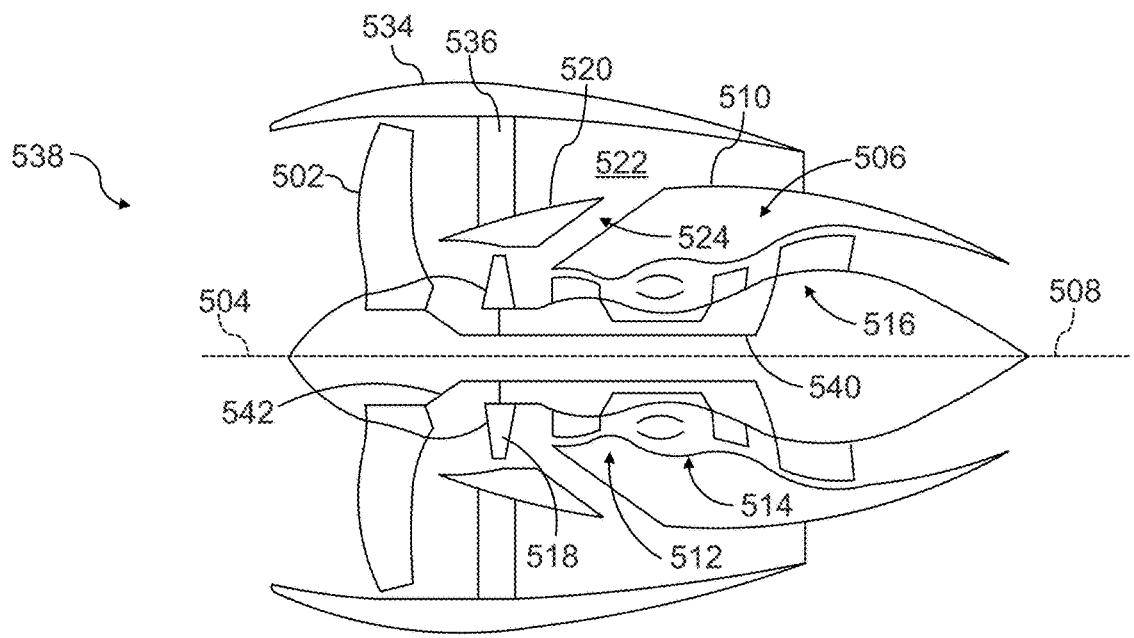
FIG. 7 is a schematic view of a direct drive, ducted, turbofan engine in accordance with an exemplary aspect of the present disclosure.
Figure 8:
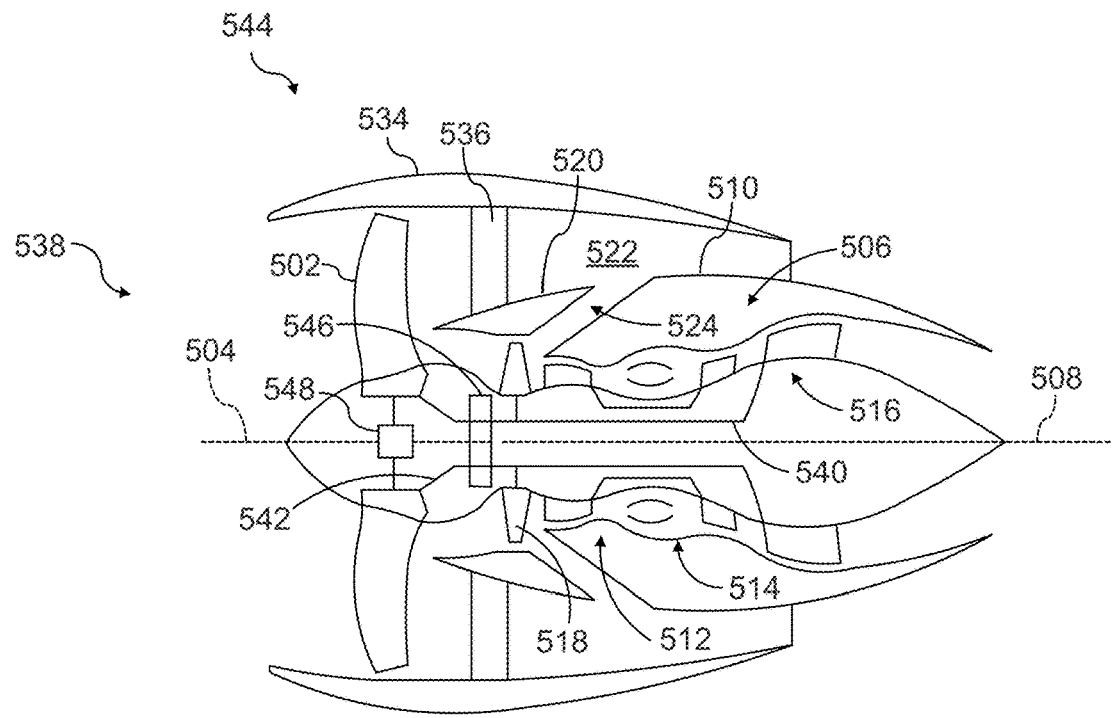
FIG. 8 is a schematic view of a geared, ducted, turbofan engine in accordance with an exemplary aspect of the present disclosure.
Figure 9:
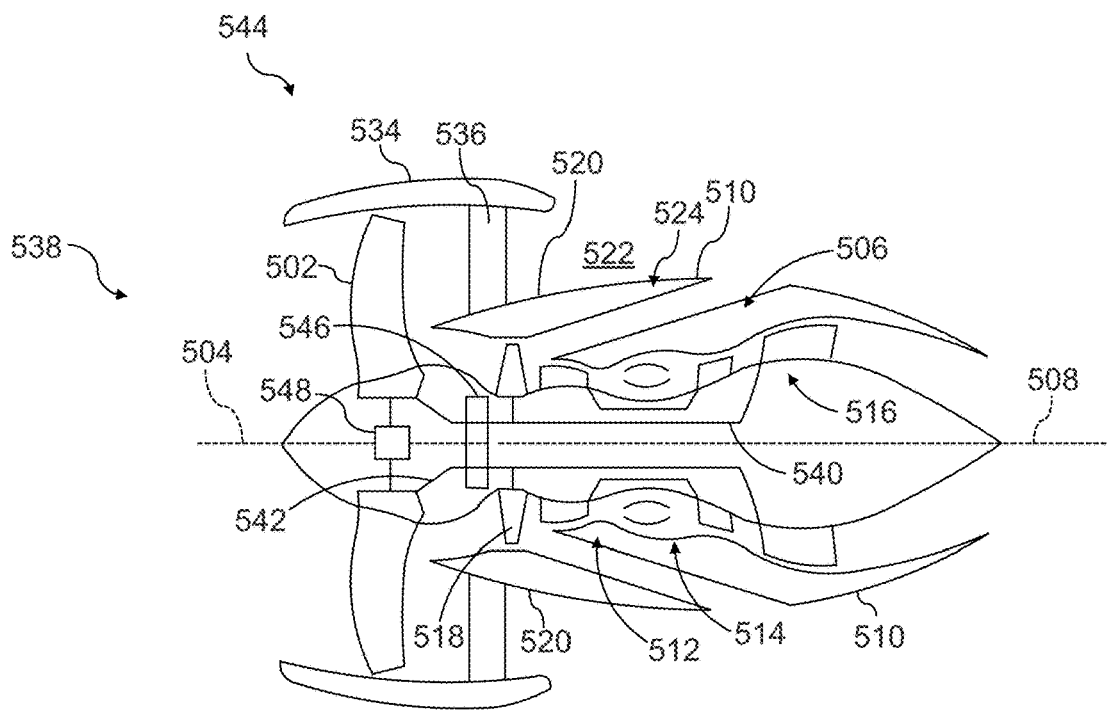
FIG. 9 is a schematic view of a geared, ducted, turbofan engine in accordance with another exemplary aspect of the present disclosure.

For the purposes of Table 2, the term "Ducted" refers to inclusion of an outer nacelle around a primary fan (see, e.g., FIGS. 7 to 9); "Open Rotor" refers to inclusion of an unducted primary fan (see, e.g., FIGS. 1, 10); "Geared" refers to inclusion of a reduction gearbox between the primary fan and a driving turbine (see, e.g., FIGS. 8 to 10); "Direct Drive" refers to exclusion of a reduction gearbox between the primary fan and a driving turbine (see, e.g., FIG. 7); "Variable Pitch" refers to inclusion of a pitch change mechanism for changing a pitch of fan blades on a primary fan (see, e.g., FIGS. 1, 8, 9); "Fixed Pitch" refers to exclusion of a pitch change mechanism for changing a pitch of fan blades on a primary fan (see, e.g., FIGS. 6 to 7); "lower flight speed" refers to an engine designed to operate at a flight speed less than 0.85 Mach; and "higher flight speed" refers to an engine designed to operate at a flight speed higher than 0.85 Mach.

It will be appreciated that although the discussion above is generally relating to the open rotor engine 100 described above with reference to FIGS. 1 and 2, in various embodiments of the present disclosure, the relationships outlined above with respect to, e.g., Expressions (1) and (2) may be applied to any other suitable engine architecture. For example, reference will now be made to FIGS. 6 through 10, each depicting schematically an engine architecture associated with the present disclosure.

Each of the gas turbine engines of FIGS. 6 through 9 generally include a rotor 502 rotatable about a rotor axis 504 and a turbomachine 506 rotatable about a longitudinal axis 508. The rotor 502 corresponds to the "primary fan" described herein. The turbomachine 506 is surrounded at least in part by a core cowl 510 and includes a compressor section 512, a combustion section 514, and a turbine section 516 in serial flow order. In addition to the rotor 502, the gas turbine engines of FIGS. 7 through 9 each also include a ducted mid-fan or secondary fan 518. The gas turbine engines each include a fan cowl 520 surrounding the secondary fan 518.

Referring still to the gas turbine engines of FIGS. 6 through 9, the gas turbine engines each also define a bypass passage 522 downstream of the respective rotor 502 and over the respective fan cowl 520 and core cowl 510, and further define a third stream 524 extending from a location downstream of the respective secondary fan 518 to the respective bypass passage 522 (at least in the embodiments depicted; in other embodiments, the third stream 524 may instead extend to a location downstream of the bypass passage 522).

Referring particularly to FIG. 6, the exemplary gas turbine engine depicted is configured as a turboprop engine 526. In such a manner, the rotor 502 (or primary fan) is configured as a propeller, defining a relatively large diameter. Further, the turboprop engine 526 includes an engine shaft 528 driven by the turbomachine 506, a fan shaft 530 rotatable with the rotor 502, and a gearbox 532 mechanically coupling the engine shaft 528 with the fan shaft 530. The gearbox 532 is an offset gearbox such that the rotor axis 504 is radially offset from the longitudinal axis 508 of the turboprop engine 526.

Notably, in other embodiments of the present disclosure, a turboprop engine may be provided with a reverse flow combustor.

Referring to FIGS. 7 through 9, the gas turbine engines are each configured as turbofan engines, and more specifically as ducted turbofan engines. In such a manner, the gas turbine engines each include an outer nacelle 534 surrounding the rotor 502, and the rotor 502 (or primary fan) of each is therefore configured as a ducted fan. Further, each of the gas turbine engines includes outlet guide vanes 536 extending through the bypass passage 522 to the outer nacelle 534 from the fan cowl 520, the core cowl 510, or both.

More specifically, still, the gas turbine engine of FIG. 7 is configured as a direct drive, ducted, turbofan engine 538. In particular, the direct drive, ducted, turbofan engine 538 includes an engine shaft 540 driven by the turbine section 516 and a fan shaft 542 rotatable with the rotor 502. The fan shaft 542 is configured to rotate directly with (i.e., at the same speed as) the engine shaft 540.

By contrast, the gas turbine engine of FIG. 8 is configured as a geared, ducted, turbofan engine 544. In particular, the geared, ducted, turbofan engine 544 includes the engine shaft 540 driven by the turbine section 516 and the fan shaft 542 rotatable with the rotor 502. However, the exemplary geared, ducted, turbofan engine 544 further includes a gearbox 546 mechanically coupling the engine shaft 540 to the fan shaft 542. The gearbox 546 allows the rotor 502 to rotate at a slower speed than the engine shaft 540, and thus at a slower speed than the secondary fan 518.

Notably, the exemplary geared, ducted, turbofan engine 544 of FIG. 8 further includes a pitch change mechanism 548 operable with the rotor 502 to change a pitch of the rotor blades of the rotor 502. Such may allow for an increased efficiency of the gas turbine engine.

Further, the exemplary gas turbine engine of FIG. 9 is again configured as a direct drive, ducted, turbofan engine 538. However, by contrast to the embodiment of FIG. 8 where a fan duct outlet defined by the fan duct is upstream of a bypass passage outlet defined by the bypass passage, in the embodiment of FIG. 9, the fan duct outlet defined by the fan duct is downstream of the bypass passage outlet defined by the bypass passage.

Moreover, in other exemplary embodiments, other suitable gas turbine engines may be provided. For example, referring now to FIG. 10, a gas turbine engine in accordance with yet another exemplary embodiment of the present disclosure is provided. The exemplary gas turbine engine of FIG. 10 may be configured in a similar manner as the exemplary gas turbine engines described above with reference to FIGS. 7 and 8.

Figure 10:
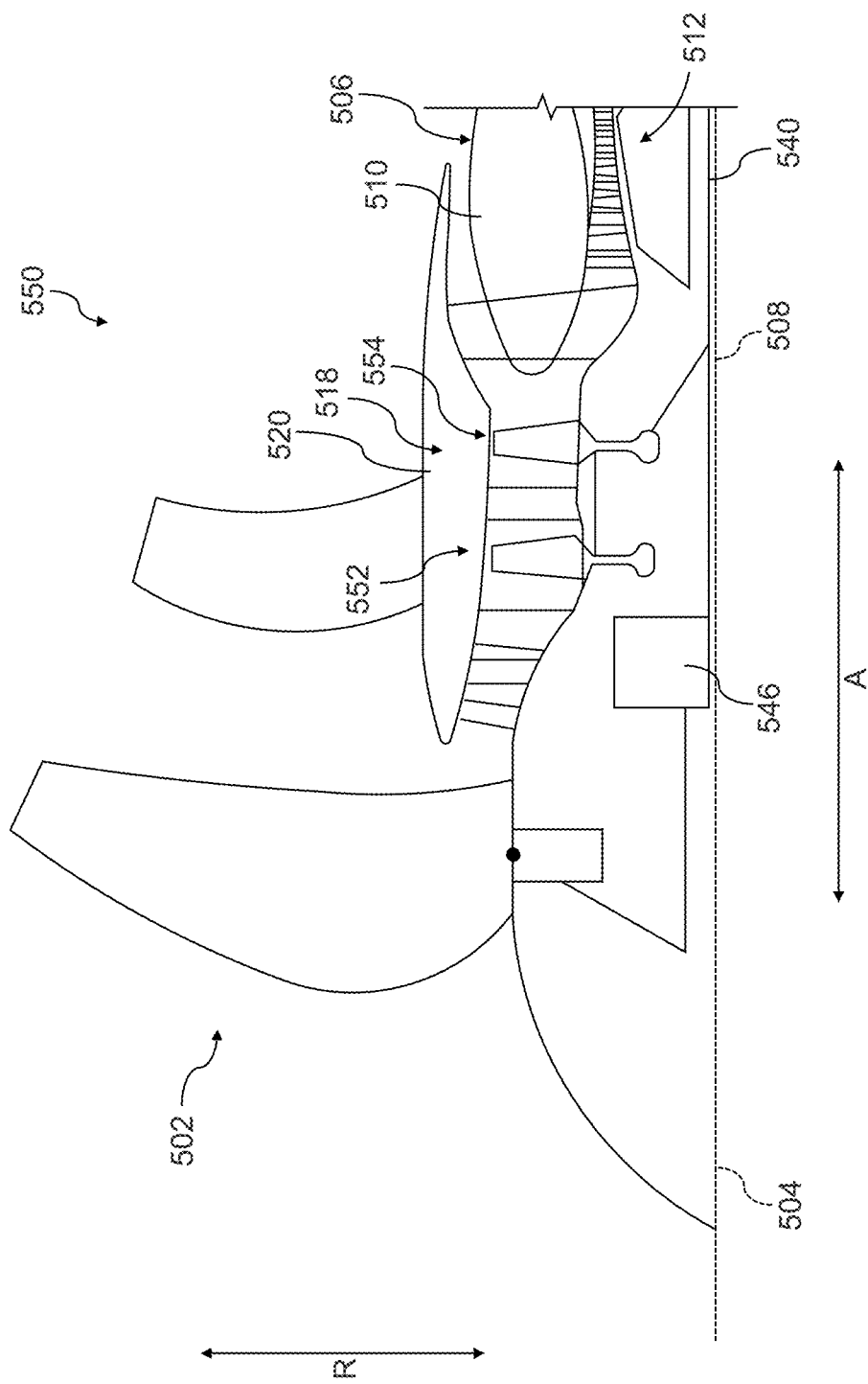
FIG. 10 is a schematic view of a unducted turbofan engine in accordance with another exemplary aspect of the present disclosure.

For example, the exemplary gas turbine engine of FIG. 10 includes a rotor 502 rotatable about a rotor axis 504 and a turbomachine 506 rotatable about a longitudinal axis 508. The rotor axis 504 and the longitudinal axis 508 are aligned in the embodiment of FIG. 10. The rotor 502 corresponds to the "primary fan" described herein. The turbomachine 506 is surrounded at least in part by a core cowl 510 and includes a compressor section 512 (and, not shown, a combustion section and a turbine section in serial flow order with the compressor section 512). In addition to the rotor 502, the gas turbine engine also includes a ducted mid-fan or secondary fan 518 and a fan cowl 520 surrounding the secondary fan 518.

However, for the embodiment of FIG. 10, the gas turbine engine is configured as an unducted turbofan engine 550 (see, e.g., FIG. 1), and the secondary fan 518 is not configured as a single stage fan (see fan 184 of FIG. 1). Instead, for the embodiment of FIG. 10, the secondary fan 518 is configured as a multi-stage secondary fan, and more specifically still as a two-stage secondary fan having a total of two stages of rotating compressor rotor blades, and more specifically having a first stage 552 of secondary fan rotor blades and a second stage 554 of secondary fan rotor blades. Notably, with such a configuration, the turbomachine 506 does not include a separate low pressure compressor.

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 10. The method includes operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5. For the exemplary method, the thrust to power airflow ratio is a ratio of an airflow through a bypass passage over a turbomachine of the gas turbine engine plus an airflow through a fan duct to an airflow through a core duct, and the core bypass ratio is a ratio of the airflow through the fan duct to the airflow through the core duct.

As will be appreciated from the description herein, various embodiments of a gas turbine engine are provided. Certain of these embodiments may be an unducted, single rotor gas turbine engine (see FIGS. 1 and 2), a turboprop engine (see FIG. 6), or a ducted turbofan engine (see FIGS. 7 through 9). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures and methods provided herein generate power loading between 80 hp/ft$^2$ and 160 hp/ft$^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

In addition to the above subject matter, the present disclosure further provides for a three-stream gas turbine engine having an advanced control system. The control system utilizes one or more processors to dynamically adjust airflow through a fan duct of the engine based on a variety of operational demands and constraints. These adjustments can be made via effectors, such as inlet guide vanes or variable nozzles, to provide a desired thrust output for the engine and thermal management capabilities under varying operational conditions.

The inventors of the present disclosure found, unexpectedly, that inclusion of the advanced control system in a gas turbine engine defining a thrust to power airflow ratio (TPAR) and a core bypass ratio (CBR) in accordance with the present disclosure can provide a synergistic improvement in overall performance and efficiency of the gas turbine engine, as well as improved thermal management capabilities of the gas turbine engine.

For example, the control system described herein can allow for real-time adjustments to the airflow characteristics of the engine based on immediate operational needs and constraints. When this real-time control is paired with the airflow ratios (TPAR and CBR) of the present disclosure, the control system can allow for the engine to operate with desired operability parameters consistently through all or a portion of a flight envelope of the gas turbine engine, despite changing conditions. For example, an engine needs to deliver electrical power, thrust, and bleed air to the aircraft. Each of these needs may have a different demand peak. The advanced control system of the present disclosure can control mass flow through the respective streams to respond to these demands. If the engine operates within the wrong range in response to these demands, the engine may stall a compressor.

Additionally, by way of example and as briefly noted above, the control system described herein can control the fan duct for thermal management purposes. In such a manner, the control system described herein can dynamically adjust airflow through the fan duct based on one or more operational conditions to maintain desired thermal conditions within the engine, thus reducing a risk of excess wear and tear on the engine and enhancing a longevity of the engine components. When the airflow ratios (TPAR and CBR) of the present disclosure are paired with these capabilities of the advanced control system, the engine can be designed to fall at a specific desired airflow ratio during a particular operating condition (e.g., takeoff), and still dynamically accommodate changing thermal needs of the gas turbine engine throughout a flight envelope.

Moreover, by leveraging the detailed control schemes of the control system described herein within the framework of the airflow ratios (TPAR and CBR) of the present disclosure, the gas turbine engine can achieve more precise thrust control. In particular, such a pairing of technologies can allow for the engine to meet the thrust demands, despite varying flight conditions such as ambient conditions, altitude, speed, and the like. Such a benefit can ensure that the engine not only operates efficiently but also meets the specific thrust requirements at each phase of operation without compromising on performance.

In such a manner, it will be appreciated that, unexpectedly, inclusion of an advanced control system in accordance with the present disclosure in a gas turbine engine defining a thrust to power airflow ratio (TPAR) and a core bypass ratio (CBR) in accordance with the present disclosure can result in a gas turbine engine that represents a significant advancement in engine design and operation, providing improvements in efficiency, adaptability, and reliability, while also contributing to a more sustainable and cost-effective operation.

Figure 11:
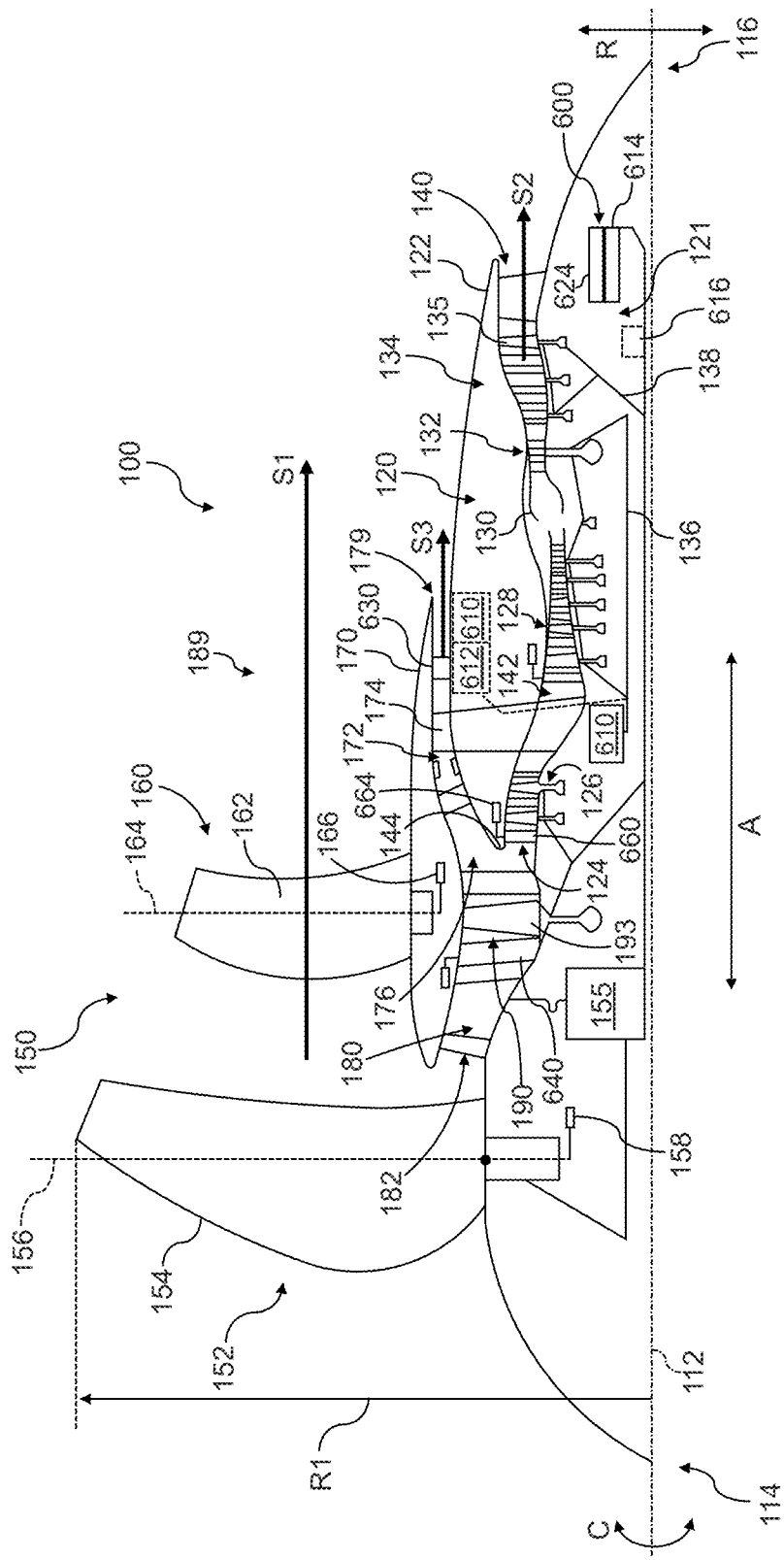
FIG. 11 provides a schematic cross-sectional view of a three-stream gas turbine engine according to various embodiments of the present disclosure.

Turning now to the drawings, FIG. 11 provides a schematic cross-sectional view of a gas turbine engine according to one example embodiment of the present disclosure. Particularly, FIG. 11 provides an aviation three-stream gas turbine engine herein referred to as "three-stream engine 100". The three-stream engine 100 of FIG. 11 can be mounted to an aerial vehicle, such as a fixed-wing aircraft, and can produce thrust for propulsion of the aerial vehicle. The three-stream engine 100 is a "three-stream engine" in that its architecture provides three distinct streams of thrust-producing airflow during operation.

As will be appreciated, the exemplary three-stream engine 100 of FIG. 11 may be configured in substantially the same manner as the exemplary gas turbine engine 100 of FIGS. 1 and 2, and the same or similar numbers may refer to the same or similar parts. For example, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees) (360° around the longitudinal axis 112.

The three-stream engine 100 includes a turbomachine 120 and a fan section 150 positioned upstream thereof. Generally, the turbomachine 120 includes, in serial flow order, a compressor section, a combustion section, a turbine section, and an exhaust section. Particularly, as shown in FIG. 11, the turbomachine 120 includes an engine core 121 and a core cowl 122 that annularly surrounds at least a portion of the engine core 121. The engine core 121 and core cowl 122 define an annular core inlet 124.

Additionally, high energy combustion products flow from the combustor 130 downstream to a high pressure turbine 132. The HP turbine 132 drives an HP compressor 128 through a first shaft or high pressure shaft 136. The high energy combustion products then flow to a low pressure turbine 134. The LP turbine 134 drives an LP compressor 126, components of the fan section 150, and optionally, an electric machine 600 through a second shaft or low pressure shaft 138. In this regard, the LP turbine 134 is drivingly coupled with the LP compressor 126, components of the fan section 150, and the electric machine 600. The LP shaft 138 is coaxial with the HP shaft 136 in this example embodiment. After driving each of the turbines 132, 134, the combustion products exit the turbomachine 120 through a core exhaust nozzle 140 to produce propulsive thrust. Accordingly, the turbomachine 120 defines a core duct 142 that extends between the core inlet 124 and the core exhaust nozzle 140. The core duct 142 is an annular flowpath positioned generally inward of the core cowl 122 along the radial direction R.

The fan section 150 includes a primary fan 152. For the depicted embodiment of FIG. 11, the primary fan 152 is an open rotor or unducted primary fan. However, in other embodiments, the primary fan 152 may be a ducted fan. For instance, in FIG. 13A, the primary fan 152 is shown ducted by a fan casing 157 or nacelle circumferentially surrounding the primary fan 152. Returning to FIG. 11, the primary fan 152 includes an array of fan blades 154 (only one shown in FIG. 11). The fan blades 154 are rotatable, e.g., about the longitudinal axis 112. As noted above, the primary fan 152 is drivingly coupled with the LP turbine 134 via the LP shaft 138. In some embodiments, the primary fan 152 can be directly coupled with the LP shaft 138, e.g., in a direct-drive configuration. In other embodiments, as shown in FIG. 1, the primary fan 152 can be mechanically coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this embodiment, each blade 154 of the primary fan 152 is rotatable about their respective central blade axes 156, e.g., in unison with one another. One or more actuators 158 can be controlled to pitch the fan blades 154 about their respective central blade axes 156. As will be explained further herein, the fan blades 154 can be pitched or rotated about their respective central blade axes 156 to effect or control the airflow through the fan duct 172. In this way, the fan blades 154 can be modulated to optimize or otherwise improve the thrust contribution of the fan duct 172 or to optimize or otherwise improve the thermal management contribution provided by the fan duct 172, or stated another way, its interaction with a thermal management system.

The fan section 150 further includes a fan guide vane array 160 that includes fan guide vanes 162 (only one shown in FIG. 11) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or may be shrouded, e.g., by an annular shroud spaced outward from the tips of the fan guide vanes 162 along the radial direction R. Each fan guide vane 162 defines a central blade axis 164. For this embodiment, each fan guide vane 162 of the fan guide vane array 160 is rotatable about their respective central blades axes 164, e.g., in unison with one another. One or more actuators 166 can be controlled to pitch the fan guide vane 162 about their respective central blades axes 164. However, in other embodiments, each fan guide vane 162 may be fixed or unable to be pitched. The fan guide vanes 162 are mounted to an fan cowl 170.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan duct 172. Incoming air may enter through the fan duct 172 through a secondary bypass inlet 176 and may exit through a secondary bypass outlet 179 to produce propulsive thrust. The fan duct 172 is an annular flowpath generally defined outward of the core duct 142 along the radial direction R. The fan cowl 170 and the core cowl 122 are connected together and supported by a plurality of substantially radially-extending, circumferentially-spaced struts 174 (only one shown in FIG. 1). The struts 174 may each be aerodynamically contoured to direct air flowing thereby. Other struts in addition to struts 174 may be used to connect and support the fan cowl 170 and/or core cowl 122.

Figure 12:
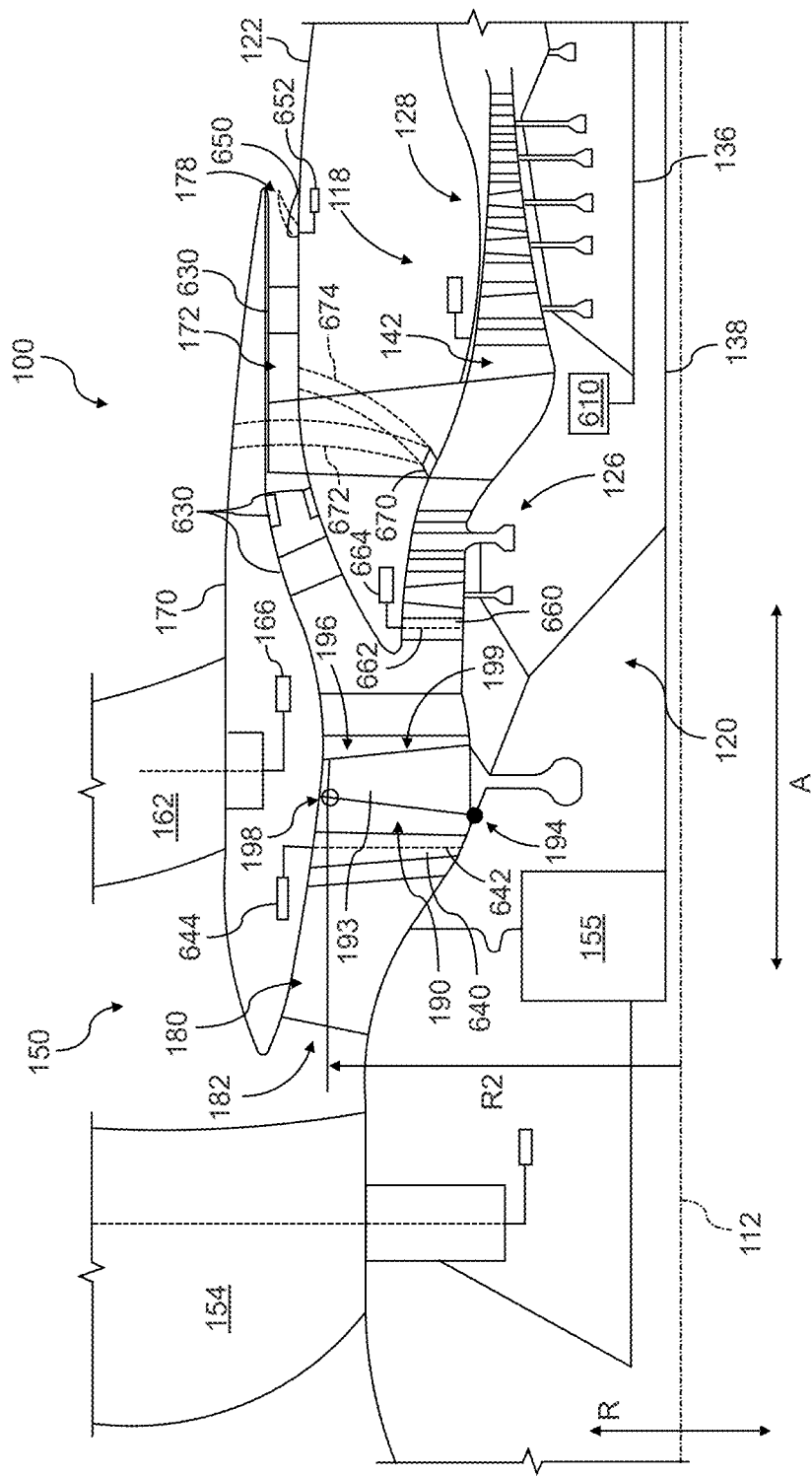
FIG. 12 provides a close-up, schematic cross-sectional view of a forward portion of the three-stream engine of FIG. 11.

Referring now to FIGS. 11 and 12, FIG. 12 provides a close-up, schematic cross-sectional view of a forward portion of the three-stream engine 100. As depicted, one or more heat exchangers 630 can be incorporated into or within the fan duct 172. The one or more heat exchangers 630 may be configured to remove or accept heat from various fluids used in engine operation (such as an air-cooled oil cooler (ACOC), cooled cooling air (CCA), etc.). The heat exchangers 630 may take advantage of the integration into the fan duct 172 with reduced performance penalties (such as fuel efficiency and thrust) compared with traditional engine architectures due to not impacting the primary source of thrust which is, in this case, the unducted fan stream labeled as S1 in FIG. 1. The heat exchangers 630 may cool fluids such as gearbox oil, engine sump oil, thermal transport fluids, such as supercritical fluids or commercially available single-phase or two-phase fluids (supercritical CO2, EGV, Syltherm 800, liquid metals, etc.), engine bleed air, etc. The heat exchangers 630 may also be made up of different segments or passages that cool different working fluids, such as an ACOC paired with a fuel cooler. One or more of the heat exchangers 630 can have an associated temperature sensor operable to sense the temperature at the heat exchanger 630. Various third stream effectors can be controlled based on such temperature readings.

The heat exchangers 630 may be incorporated into a thermal management system that provides for thermal transport via a heat exchange fluid flowing through a network or thermal bus to remove heat from a source and transport it to a heat exchanger, such as one or more of heat exchangers 630. One such system is described in commonly-assigned, issued U.S. Pat. No. 10,660,419, which is incorporated herein by reference.

The three-stream engine 100 also defines an inlet flowpath 180. The inlet flowpath 180 extends between an engine inlet 182 and the core inlet 124/secondary bypass inlet 176. The engine inlet 182 is defined generally at the forward end of the fan cowl 170 and is positioned between the primary fan 152 and the array of fan guide vanes 160 along the axial direction A. The inlet flowpath 180 is an annular flowpath that is defined inward of the fan cowl 170 along the radial direction R. Air flowing downstream along the inlet flowpath 180 is split, not necessarily evenly, into the core duct 142 and the fan duct 172 by a nose of a splitter 144 of the core cowl 122. The inlet flowpath 180 is wider than the core duct 142 along the radial direction R. The inlet flowpath 180 is also wider than the fan duct 172 along the radial direction R.

As depicted, the fan section 150 also includes a secondary fan 195 (which, as noted above, is also referred to herein as a "secondary fan 195"). The secondary fan 195 includes an array of secondary fan blades 193 (only one shown in FIG. 11). The secondary fan blades 193 are rotatable, e.g., about the longitudinal axis 112. The secondary fan 195 is drivingly coupled with the LP turbine 134 via the LP shaft 138. The secondary fan blades 193 can be arranged in equal circumferential spacing around the longitudinal axis 112. As shown in FIG. 12, each secondary fan blade 193 has a root 194 and a tip 196 and a span defined therebetween. Moreover, each secondary fan blade 193 has a leading edge 198 and a trailing edge 199. The secondary fan blades 193 are annularly surrounded or ducted by the fan cowl 170. In this regard, the secondary fan 195 is positioned inward of the fan cowl 170 along the radial direction R. Moreover, for this example embodiment, the secondary fan 195 is positioned within the inlet flowpath 180 upstream of both the core duct 142 and the fan duct 172.

Air flowing through the inlet flowpath 180 flows across the secondary fan blades 193 and is accelerated downstream thereof, particularly at the tips 196 of the secondary fan blades 193. At least a portion of the air accelerated by the secondary fan blades 193 flows into the fan duct 172 and is ultimately exhausted through the secondary bypass outlet 179 to produce propulsive thrust. Also, at least a portion of the air accelerated by the secondary fan blades 193 flows into the core duct 142 and is ultimately exhausted through the core exhaust nozzle 140 to produce propulsive thrust. Generally, the secondary fan 195 is a compression device positioned downstream of the engine inlet 182. The secondary fan 195 is operable to accelerate air into the fan duct 172 or secondary bypass passage.

As further shown in FIGS. 11 and 12, an array of variable inlet guide vanes 640 is positioned upstream of the secondary fan 195. Particularly, the variable inlet guide vanes 640 are positioned immediately upstream of the secondary fan 195 and downstream of the engine inlet 182. Moreover, the variable inlet guide vanes 640 can be arranged in equal spacing around the longitudinal axis 112. Each variable inlet guide vane 640 defines a central vane axis 642. For this embodiment, the variable inlet guide vanes 640 are rotatable about their respective central vane axes 642, e.g., in unison with one another. One or more actuators 644 can be controlled to pitch the variable inlet guide vanes 640 about their respective central vane axes 642. As will be explained further herein, the variable inlet guide vanes 640 can be pitched or rotated about their respective central vane axes 642 to effect or control the airflow through the fan duct 172. In this way, the variable inlet guide vanes 640 can be modulated to optimize or otherwise improve the thrust contribution of the fan duct 172 or to optimize or otherwise improve the thermal management contribution provided by the fan duct 172, or rather, interaction between the fan duct 172 and a thermal management system.

In some embodiments, optionally, the three-stream engine 100 can include a variable nozzle 650 (see FIG. 12) incorporated into or positioned along the fan duct 172. For this embodiment, the variable nozzle 650 is positioned at or immediately upstream of the secondary bypass outlet 179. The variable nozzle 650 can be a slidable, moveable, and/or translatable plug. For instance, the variable nozzle 650 can be moved between a first or open position and a second or closed position. In FIG. 12, the variable nozzle 650 is shown in the open position via solid lines and in the closed position via the phantom lines. In some embodiments, the variable nozzle 650 can be moved to a position between the open and closed positions, i.e., to an intermediate position. The variable nozzle 650 can be moved by an actuator 652 to vary the exit area through the secondary bypass outlet 179. The variable nozzle 650 can be an annular, symmetrical device that can be controlled to regulate the airflow through the fan duct 172. Other suitable nozzle designs may be employed as well, including those incorporating thrust reversing functionality. As will be explained further herein, the variable nozzle 650 can be moved to effect or control the airflow through the fan duct 172. In this way, the variable nozzle 650 can be modulated to optimize or otherwise improve the thrust contribution of the fan duct 172 or to optimize or otherwise improve the thermal management contribution provided by the fan duct 172, or stated differently, its interaction with a thermal management system.

The three-stream engine 100 can include other variable geometries as well. For instance, the booster or LP compressor 126 can include one or more stages of compressors rotor blades and compressor stator vanes, wherein at least one stage of compressor stator vanes are variable stator vanes. For instance, as shown in FIGS. 11 and 12, the LP compressor 126 includes at least one stage of compressor stator vanes, which are booster inlet guide vanes 660 in this example. The booster inlet guide vanes 660 are positioned downstream of the secondary fan 195 and are positioned within the core duct 142. The booster inlet guide vanes 660 can be arranged in equal spacing around the longitudinal axis 112. Each booster inlet guide vane 660 defines a central vane axis 662. For this embodiment, each booster inlet guide vane 660 is rotatable about their respective central vane axes 662, e.g., in unison with one another. One or more actuators 264 can be controlled to pitch the booster inlet guide vanes 660 about their respective central vane axes 662. As will be explained further herein, the booster inlet guide vanes 660 can be pitched or rotated about their respective central vane axes 662 to assist with controlling one or more properties of the airflow through the fan duct 172.

In addition, as shown in FIG. 12, the three-stream engine 100 can include a variable bleed valve 670 positioned downstream of the LP compressor 126 and upstream of the HP compressor 128. By modulating the variable bleed valve 670, air may be bled from the core duct 142. Air can be bled from the core duct 142 so that debris can be extracted or expelled from the core duct 142, and to change the operating line of the compressor systems relative to their respective stall lines, among other reasons. The three-stream engine 100 defines at least one of an offboard bleed duct 672 and a secondary bleed duct 674. The offboard bleed duct 672 provides fluid communication between the core duct 142 and offboard the three-stream engine 100. In this regard, air bled from the core duct 142 via the offboard bleed duct 672 is expelled offboard the three-stream engine 100, e.g., into a primary propulsion stream or first thrust stream S1 (FIG. 11). The secondary bleed duct 674 provides fluid communication between the core duct 142 and the fan duct 172. In this way, air bled from the core duct 142 via the secondary bleed duct 674 is expelled into the fan duct 172. As will be explained further herein, the variable bleed valve 670 can be modulated to assist with controlling one or more properties of the airflow through the fan duct 172.

Embodiments of the three-stream engine 100 provided herein can be arranged to define a primary fan radius to secondary fan radius ratio. The primary fan radius to secondary fan radius ratio is defined as:

Primary Fan Radius/Mid-Fan Radius. The Primary Fan Radius is measured as a radial length or radius spanning along the radial direction R between the longitudinal axis 112 and a leading edge tip of one of the fan blades 154 of the primary fan 152. Particularly, as shown best in FIG. 11, the Primary Fan Radius is measured as Radius R1, which spans along the radial direction R between the longitudinal axis 112 and a leading edge tip of one of the primary fan blades 154. The Mid-Fan Radius is measured as a radial length or radius spanning along the radial direction R between the longitudinal axis 112 and a leading edge tip of one of the secondary fan blades 193 of the secondary fan 195. Particularly, as shown in FIG. 12, the Mid-Fan Radius is measured as Radius R2, which spans along the radial direction R between the longitudinal axis 112 and a leading edge tip of one of the secondary fan blades 193.

In some embodiments, the three-stream engine 100 defines the primary fan radius to secondary fan radius ratio as being equal to or greater than 2.0 and less than or equal to 6.5. Particularly, in some embodiments, the three-stream engine 100 defines the primary fan radius to secondary fan radius ratio as being at least about 2.0. In other embodiments, the three-stream engine 100 defines the primary fan radius to secondary fan radius ratio as being at least about 2.5. In yet other embodiments, the three-stream engine 100 defines the primary fan radius to secondary fan radius ratio as being at least about 3.0. For instance, in FIG. 11, the primary fan radius to secondary fan radius ratio is slightly greater than 3.0. In some further embodiments, the three-stream engine 100 defines the primary fan radius to secondary fan radius ratio as being at least about 4.0. In yet other embodiments, the three-stream engine 100 defines the primary fan radius to secondary fan radius ratio as being at least about 6.0. In some other embodiments, the three-stream engine 100 defines the primary fan radius to secondary fan radius ratio as being about 6.5. For the embodiments having the stated lower bounds of the primary fan radius to secondary fan radius ratio mentioned in this paragraph, unless stated otherwise, the upper bound of these noted ratios may be up to 6.5. The inventors of the present disclosure have recognized that three-stream engines having a primary fan and secondary fan arranged according to the noted ranges/ratios advantageously balance aerodynamic performance and engine efficiency with mechanical constraints of the primary fan 152 and secondary fan 195.

With reference to FIG. 11, operation of the three-stream engine 100 may be summarized in the following exemplary manner. During operation, an initial or incoming airflow passes through the fan blades 154 of the primary fan 152 and splits into a first airflow and a second airflow. The first airflow bypasses the engine inlet 182 and flows generally along the axial direction A outward of the fan cowl 170 along the radial direction R. The first airflow accelerated by the primary fan blades 154 passes through the fan guide vanes 162 and continues along a primary bypass flowpath 189 defined by the three-stream engine downstream to produce a primary propulsion stream or first thrust stream S1. The vast majority of the net thrust produced by the three-stream engine 100 is produced by the first thrust stream S1. The second airflow enters the inlet flowpath 180 through annular engine inlet 182.

The second airflow flowing downstream through the inlet flowpath 180 flows through the secondary fan blades 193 of the secondary fan 195 and is consequently compressed. The second airflow flowing downstream of the secondary fan 195 is split by the splitter 144 located at the forward end of the core cowl 122. Particularly, a portion of the second airflow flowing downstream of the secondary fan 195 flows into the core duct 142 through the core inlet 124. The portion of the second airflow that flows into the core duct 142 is progressively compressed by the LP compressor 126 and HP compressor 128 and is ultimately discharged into the combustion section. The discharged pressurized air stream flows downstream to the combustor 130 where fuel is introduced to generate combustion gases or products.

More particularly, the combustor 130 defines an annular combustion chamber that is generally coaxial with the longitudinal centerline axis 112. The combustor 130 receives an annular stream of pressurized air from the HP compressor 128 via a pressure compressor discharge outlet. A portion of this compressor discharge air flows into a mixer (not shown). Fuel is injected by a fuel nozzle to mix with the air thereby forming a fuel-air mixture that is provided to the combustion chamber for combustion. Ignition of the fuel-air mixture is accomplished by one or more suitable igniters, and the resulting combustion gases flow along the axial direction A toward and into an annular, first stage turbine nozzle of the HP turbine 132. The first stage nozzle is defined by an annular flow channel that includes a plurality of radially-extending, circumferentially-spaced nozzle vanes that turn the gases so that they flow angularly and impinge upon the first stage turbine blades of the HP turbine 132. The combustion products exit the HP turbine 132 and flow through the LP turbine 134 and exit the core duct 142 through the core exhaust nozzle 140 to produce a core air stream or second thrust stream S2. For this embodiment, as noted above, the HP turbine 132 drives the HP compressor 128 via the HP shaft 136 and the LP turbine 134 drives the LP compressor 126, the primary fan 152, the secondary fan 195, and the electric machine 600 via the LP shaft 138.

The other portion of the second airflow flowing downstream of the secondary fan 195 is split by the splitter 144 into the fan duct 172. The air enters the fan duct 172 through the secondary bypass inlet 176. The air flows generally along the axial direction A through the fan duct 172 and is ultimately exhausted from the fan duct 172 through the secondary bypass outlet 179 to produce a third thrust stream S3.

A "third stream" or third thrust stream S3 as used herein means a secondary air stream capable of increasing fluid energy to produce a minority of total propulsion system thrust. In some embodiments, a pressure ratio of the third stream is higher than that of the primary propulsion stream (e.g., a bypass or propeller driven propulsion stream). The thrust may be produced through a dedicated nozzle or through mixing of the secondary air stream with the primary propulsion stream or a core air stream, e.g., into a common nozzle. In certain exemplary embodiments, an operating temperature of the secondary air stream is less than a maximum compressor discharge temperature for the engine. In certain exemplary embodiments, these operating temperatures may facilitate heat transfer to or from the third stream and a separate fluid stream. Further, in certain exemplary embodiments, the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions. Furthermore in certain exemplary embodiments, aspects of the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize or otherwise improve overall system performance across a broad range of potential operating conditions.

Figure 13A:
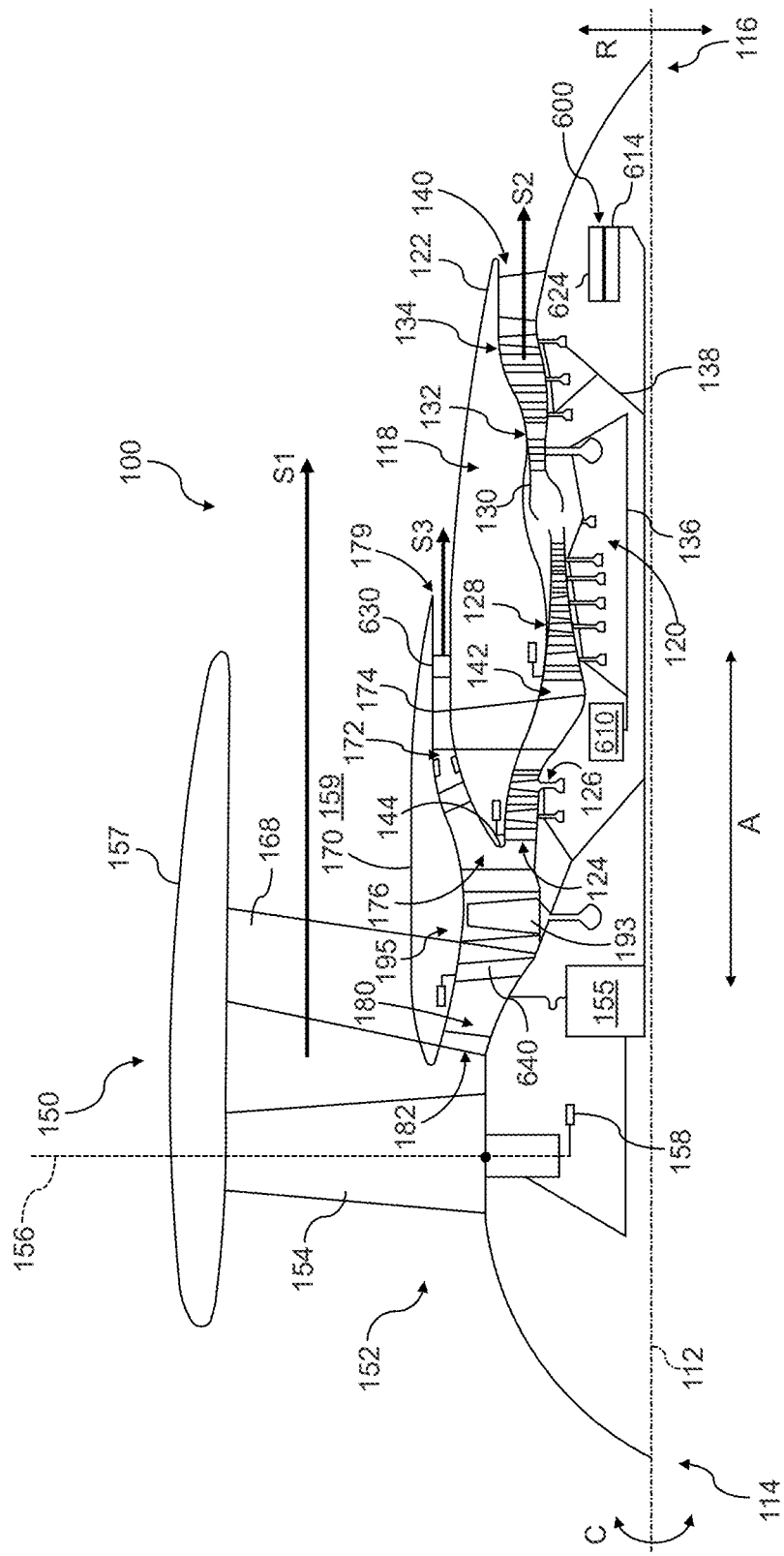
FIGS. 13A, 13B, and 13C provide schematic cross-sectional views of various alternative embodiments of three-stream gas turbine engines according to yet other various embodiments of the present disclosure.

Although three-stream engine 100 has been described and illustrated in FIG. 11 as representing an example three-stream gas turbine engine operable to produce first thrust stream S1, second thrust stream S2, and third thrust stream S3, it will be appreciated that the inventive aspects of the present disclosure may apply to three-stream gas turbine engines having other configurations. For instance, in some embodiments, the three-stream engine 100 may have a centrifugal HP compressor, may not include a booster, may include an electrically-driven booster or LP compressor, etc. Further, in other example embodiments, the primary fan 152 can be ducted by fan casing 157 or outer nacelle, e.g., as shown in FIG. 13A. As shown in FIG. 13A, a bypass passage 159 may be defined between the fan casing 157 and the fan cowl 170. The first thrust stream S1 may flow through the bypass passage 159. One or more circumferentially-spaced outlet guide vanes 168 (only one shown in FIG. 13A) can extend between and connect the fan casing 157, the fan cowl 170, and the engine core 121 to provide structural support for these components. In such embodiments, the speed reduction gearbox 155 and/or the one or more actuators 158 can be optional. In this regard, the primary fan 152 can be directly coupled with the LP shaft 138, e.g., in a direct-drive configuration, and/or the primary fan 152 can be a fixed-pitch fan.

Figure 13B:
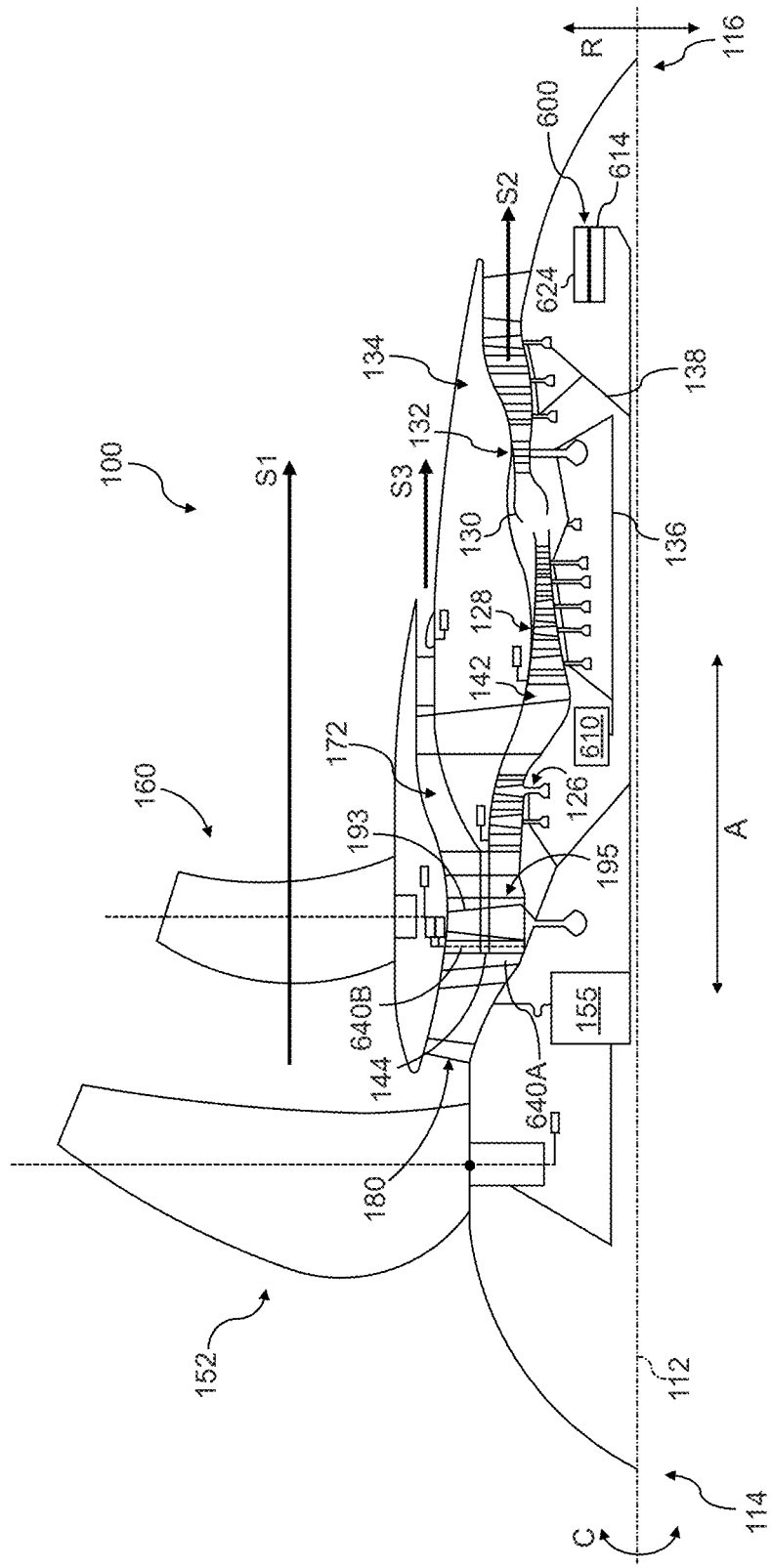
Figure 13C:
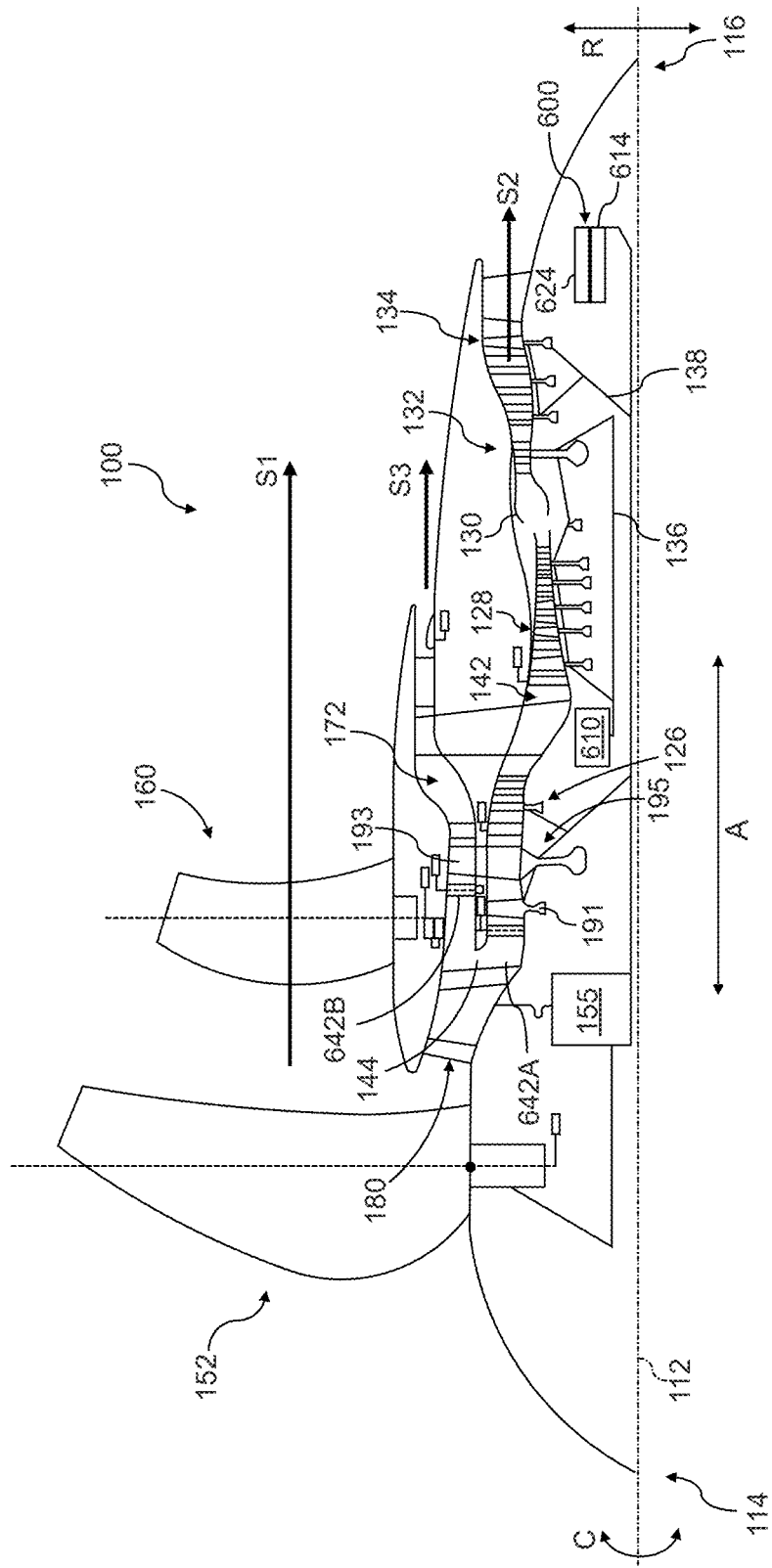

In yet other embodiments, the three-stream engine 100 can have other secondary fan and/or splitter configurations. For instance, as shown in FIGS. 13B and 13C, the nose of the splitter 144 is positioned upstream of the secondary fan 195. In such embodiments, the secondary fan blades 193 may include an integral splitter which effectively divides the air stream into radially inner and radially outer streams (or second and third streams S2, S3) in proximity to the secondary fan 195 itself. Such a configuration may be termed a blade-on-blade configuration where radially inner and radially outer blades are effectively superimposed upon one another and may be unitarily formed or otherwise fabricated to achieve the split between streams. FIGS. 13B and 13C illustrate embodiments with such a blade-on-blade configuration. Such configurations are described in greater detail in commonly-assigned, issued U.S. Pat. No. 4,043,121, which is incorporated herein by reference.

Further, as shown in FIGS. 13B and 13C, the three-stream engine 100 includes a core array of inlet guide vanes 640A having a plurality of inlet guide canes rotatable about their respective central vane axes. The core array of inlet guide vanes 640A are positioned within the core duct 142 upstream of the secondary fan 195. The pitch of the inlet guide vanes of the core array of inlet guide vanes 640A can be moved by one or more actuators. Moreover, the three-stream engine 100 also includes a secondary array of inlet guide vanes 640B having a plurality of inlet guide canes rotatable about their respective central vane axes. The secondary array of inlet guide vanes 640B are positioned within the fan duct 172 upstream of the secondary fan 195. The pitch of the inlet guide vanes of the secondary array of inlet guide vanes 640B can be moved by one or more actuators. The pitch of the inlet guide vanes of the core array of inlet guide vanes 640A and the pitch of the inlet guide vanes of the secondary array of inlet guide vanes 640B can be controlled independently by their respective actuators, e.g., to the same or different pitch angles, or in alternative embodiments, they can be controlled to be pitched in unison.

The core array of inlet guide vanes 640A can be stacked (i.e., aligned axially) with the secondary array of inlet guide vanes 640B as shown in FIG. 13B or can be offset from one another along the axial direction A as shown in FIG. 13C. Moreover, in some embodiments as depicted in FIG. 13C, the three-stream engine 100 can include a secondary fan booster 191 that includes a plurality of circumferentially-spaced secondary fan booster blades mechanically coupled with the LP shaft 138. The secondary fan booster 191 is positioned within the core duct 142 upstream of the secondary fan 195 and downstream of the core inlet guide vanes 642A. The secondary fan booster 191 boosts the core airflow before reaching the secondary fan 195.

As further shown in FIG. 11 (as well as the embodiments of FIGS. 13A, 13B, 13C), the three-stream engine 100 includes the electric machine 600 mechanically coupled with a rotating component thereof. In this regard, the three-stream engine 100 is an aeronautical hybrid-electric propulsion machine. Particularly, as shown in FIG. 11, the three-stream engine 100 includes the electric machine 600 mechanically coupled with the LP shaft 138. The electric machine 600 can be directly mechanically connected to the LP shaft 138, or alternatively, the electric machine 600 can be mechanically coupled with the LP shaft 138 indirectly, e.g., by way of a gearbox 616. As shown, the electric machine 600 is embedded within the three-stream engine 100 proximate its aft end 116. Particularly, the electric machine 600 is positioned aft of the secondary fan 195 and at least partially overlapping with or aft of the LP turbine 134 along the axial direction A. Moreover, for this embodiment, the electric machine 600 is positioned inward of the core duct 142 along the radial direction R. Although the electric machine 600 is operatively coupled with the LP shaft 138 at an aft end of the LP shaft 138, the electric machine 600 can be coupled with the LP shaft 138 at any suitable location or can be coupled to other rotating components of the three-stream engine 100, such as the HP shaft 136. For instance, in some embodiments, the electric machine 600 can be coupled with the LP shaft 138 and positioned forward of the secondary fan 195 along the axial direction A.

In some embodiments, the electric machine 600 can be an electric motor operable to drive or motor the LP shaft 138, e.g., when additional thrust is needed. In other embodiments, the electric machine 600 can be an electric generator operable to convert mechanical energy into electrical energy. In this way, electrical power generated by the electric machine 600 can be directed to various engine and/or aircraft systems. In some embodiments, the electric machine 600 can be a motor/generator with dual functionality.

The electric machine 600 includes a rotor 614 and a stator 624. The rotor 614 is mechanically coupled with the LP shaft 138 and is rotatable with the LP shaft 138. The stator 624 can be fixed to a structural support member, such as an aft frame member. The electric machine 600 defines a centerline, which is aligned with or coaxial with the longitudinal axis 112 of the three-stream engine 100 in this example embodiment. The rotor 614 and the stator 624 together define an air gap therebetween. Moreover, the rotor 614 can include a plurality of magnets, such as a plurality of permanent magnets, and the stator 624 can include a plurality of windings or coils. As such, the electric machine 600 may be referred to as a permanent magnet electric machine. However, in other exemplary embodiments, the electric machine 600 may be configured in any suitable manner. For example, the electric machine 600 may be configured as an electromagnetic electric machine, including a plurality of electromagnets and active circuitry, as an induction type electric machine, a switched reluctance type electric machine, a synchronous AC electric machine, an asynchronous electric machine, or as any other suitable electric generator/motor.

The electric machine 600 can be electrically connected to an electric power bus. The electric power bus can be electrically connected to the electric machine 600 at a location inward of the core duct 142 along the radial direction R. The electric power bus may extend through the core duct 142 (e.g., through an aft frame strut) and electrically connect the electric machine 600 to one or more electrical loads (accessory systems, electric/hybrid-electric propulsion devices, etc.), electrical sources (other electric machines, electric energy storage units, etc.), or both. Electrical power can be provided to the electric machine 600 via the electric power bus, e.g., when the electric machine 600 is operating in a drive mode, and electrical power generated by the electric machine 600 can be carried or transmitted to electrical systems via the electric power bus, e.g., when the electric machine 600 is operating in a generator mode.

Although the electric machine 600 has been described and illustrated in FIG. 11 as having a particular configuration, it will be appreciated that the inventive aspects of the present disclosure may apply to electric machines having alternative configurations. For instance, the stator 624 and/or rotor 614 may have different configurations or may be arranged in a different manner than illustrated in FIG. 11. As one example, in some embodiments, the electric machine 600 may have a tapered configuration in which the rotor 614 and the stator 624 may extend lengthwise along the axial direction A at an angle with respect to the longitudinal axis 112, e.g., so that they are not oriented parallel with the longitudinal axis 112.

As will be explained further herein, the electric machine 600 can be controlled to effect or control the airflow through the fan duct 172. In this way, the electric machine 600 can be controlled to optimize or otherwise improve the thrust contribution of the fan duct 172 or to optimize or otherwise improve the thermal management contribution provided by the fan duct 172, or rather, its interaction with a thermal management system.

As further shown in FIG. 11, optionally, the three-stream engine 100 can include an electric machine 610 mechanically coupled with the HP shaft 136. The electric machine 610 can be a motor, a generator, or a combination motor-generator. Like the electric machine 600, the electric machine 610 can be controlled to effect or control the airflow through the fan duct 172. In this way, the electric machine 610 can be controlled to optimize or otherwise improve the thrust contribution of the fan duct 172 or to optimize the thermal management contribution provided by the fan duct 172.

The electric machine 610 can be directly mechanically connected to the HP shaft 136 (as depicted via the solid lines), or alternatively, the electric machine 610 can be mechanically coupled with the HP shaft 138 indirectly, e.g., by way of a gearbox 612 (as shown by the phantom lines). The directly-coupled electric machine 610 can be embedded within the three-stream engine 100 aft of the LP compressor 126 and forward of the HP compressor 128 along the axial direction A. The directly-coupled electric machine 610 can be positioned inward of the core duct 142 along the radial direction R. The indirectly-coupled electric machine 610 and its associated gearbox 612 can be positioned within the core cowl 122 and located outward of the core duct 142 along the radial direction R.

Figure 14:
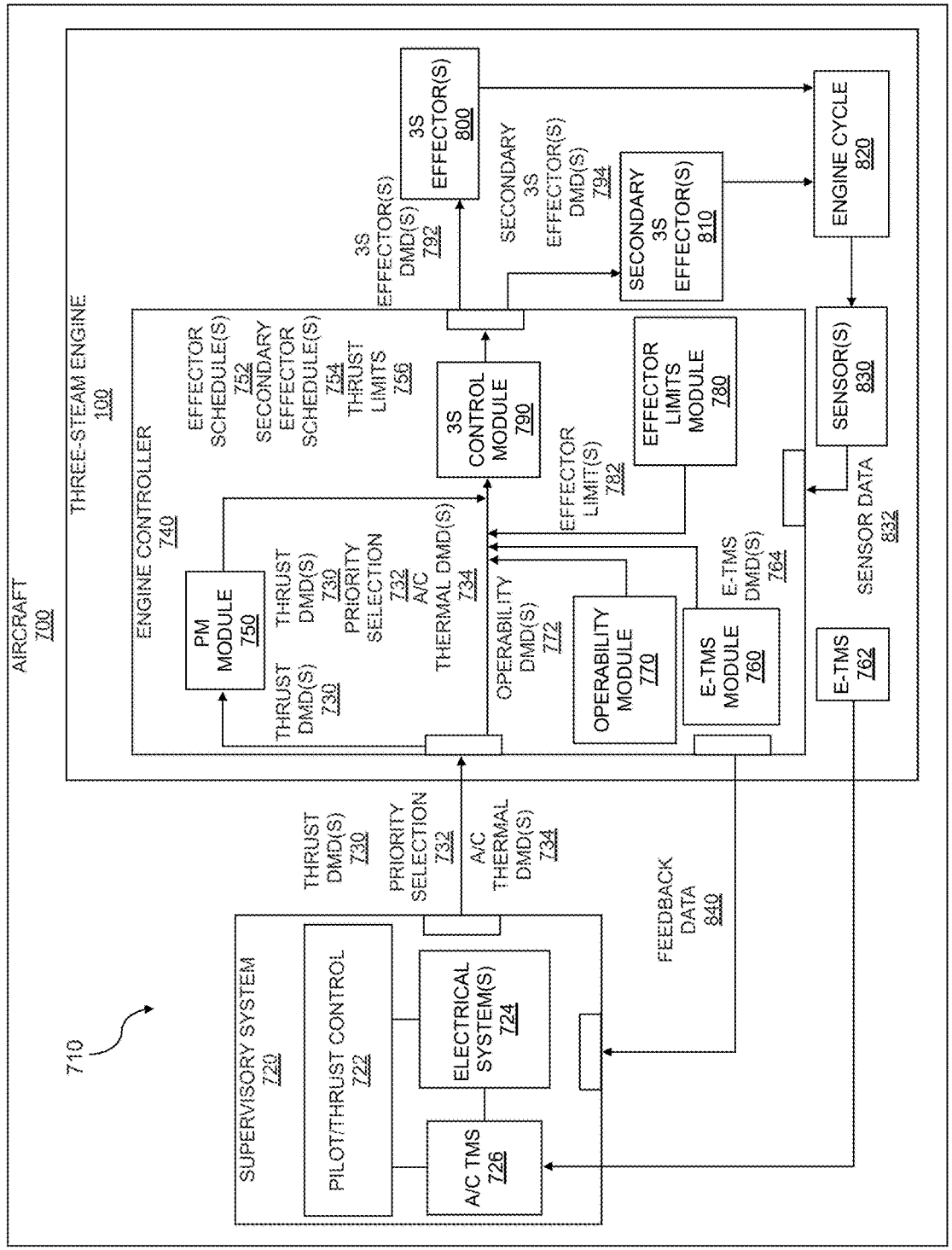
FIG. 14 provides a system diagram of a control system for an aircraft according to various embodiments of the present disclosure.

FIG. 14 provides a system diagram of a control system 710 for an aircraft 700 according to various embodiments of the present disclosure. The control system 710 can be used to control one or more components of the three-stream engine 100 mounted to the aircraft 700. While the control system 710 will be described below as being associated with or configured to implement control schemes with respect to the three-stream engine 100 of FIGS. 11 and 12, it will be appreciated that the example control system 710 of FIG. 14 can be associated with or implement control schemes with respect to other three-stream gas turbine engines as well.

The control system 710 includes, among other things, a supervisory system 720 and an engine controller 740 communicatively coupled thereto. The engine controller 740 can be mounted to the three-stream engine 100 while the supervisory system 720 can be located within a fuselage of the aircraft 700, for example. The engine controller 740 is communicatively coupled with one or more third stream effectors 800. Such systems and components can be communicatively coupled in any suitable manner, e.g., via one or more wired or wireless connection links. As will be explained more fully below, the engine controller 740 can control or cause the effector 800 to adjust an airflow through the fan duct 172. In adjusting the airflow through the fan duct 172, one or more properties of the airflow can be adjusted, such as the mass flow, temperature, and/or the pressure. By causing the effector 800 to adjust the airflow through the fan duct 172, the thrust contribution and the thermal management contribution provided by the fan duct 172 can be controlled.

The supervisory system 720 can include one or more processors and one or more memory devices. The one or more processors can perform operations, such as those noted herein. The supervisory system 720 can be configured in a same or similar manner as the computing system 1000 provided in FIG. 25. The supervisory system 720 can be communicatively coupled with various systems of the aircraft 700, such as a thrust control 722, one or more electrical systems 724, and an aircraft thermal management system 726, denoted as A/C TMS 726 in FIG. 14. The thrust control 722 can include one or more power or thrust levers positioned within the cockpit or an automated thrust control system, for example. Upon manipulation of the thrust control 722, a desired amount of thrust may be demanded. The supervisory system 720 can receive signals indicating the demanded thrust in response to manipulation of the thrust control 722.

The one or more electrical systems 724 can include any aircraft electrical system that draws or generates electrical power. Example electrical systems 724 include, without limitation, air conditioning systems, cockpit displays, cabin accessories, pumps, etc. The aircraft thermal management system 726 can be in thermal communication with one or more of the electrical systems 724. For instance, the aircraft thermal management system 726 can include one or more heat exchangers, heat sinks, pumps, fluid supply lines, etc. that collectively act to cool one or more components of the electrical systems 724 and potentially other components onboard the aircraft 700. The supervisory system 720 can receive signals indicated the cooling capacity of the aircraft thermal management system 726 and/or signals indicating electrical power demands from the electrical systems 724.

As noted, the supervisory system 720 can receive inputs from the thrust control 722, the electrical systems 724, and/or the aircraft thermal management system 726, among other aircraft systems. Based on these inputs, the supervisory system 720 can generate various outputs, such as a thrust demand 730, denoted as "Thrust DMD(s) 730" in FIG. 14, a priority selection 732 indicating a priority of one or more objectives, and an aircraft thermal demand 734, denoted as "A/C Thermal DMD(s) 734" in FIG. 14. These generated outputs can be routed to the engine controller 740 as shown in FIG. 14.

The engine controller 740 can include one or more processors and one or more memory devices. The one or more processors can perform operations, such as those noted herein. The engine controller 740 can be configured in a same or similar manner as the computing system 1000 provided in FIG. 25. As depicted, the engine controller 740 can include various control modules, including a Power Management module 750, denoted as "PM module 750" in FIG. 4. Upon executing the power management module 750, the one or more processors can output schedule demands, such as an effector schedule 752 and optionally a secondary effector schedule 754, based at least in part on the thrust demand 730, which may be received from the supervisory system 720. The effector schedules 752, 754 can be selected or determined so as to optimize or otherwise improve performance of the three-stream engine 100, for example. In other embodiments, the thrust demand 730 may not be routed through a supervisory system.

Moreover, upon executing the power management module 750, the one or more processors can output one or more thrust limits 756. The one or more thrust limits 756 can indicate a minimum thrust limit, e.g., a minimum thrust required to maintain aircraft controllability. The one or more thrust limits 756 can also indicate a maximum thrust limit, e.g., to prevent the three-stream engine 100 from exceeding its redline speed. The effector schedule 752, 754 and/or the thrust limits 756 can be based on one or more operating parameters in addition to the thrust demand 730. For instance, the effector schedule 752 and/or the thrust limit 756 can be output based on the thrust demand 730 and a temperature at a station of the three-stream engine 100, e.g., a temperature at engine station T2 or at the inlet 176 of the fan duct 172.

The engine controller 740 can also include an engine thermal management system module 760 associated with an engine thermal management system 762, denoted in FIG. 14 as E-TMS module 760 and E-TMS 762, respectively. The engine thermal management system 762 can include one or more heat sinks, heat exchangers, fluid supply lines, pumps, etc. For instance, the engine thermal management system 762 can include the heat exchangers 630 depicted in FIG. 12. In some embodiments, the engine thermal management system 762 is coupled to or integrated with the aircraft thermal management system 726, e.g., as shown in FIG. 14. In other embodiments, the engine thermal management system 762 and the aircraft thermal management system 726 are separate systems. Upon executing the engine thermal management system module 760, the one or more processors can output engine thermal demands 764, denoted as "E-TMS DMD(s) 764" in FIG. 14. The engine thermal demands 764 can indicate that more or less cooling capability is needed, for example.

Further, the engine controller 740 can include an operability module 770. Upon executing the operability module 770, the one or more processors can output one or more operability demands 772, denoted as "OPERABILITY DMD(s) 772" in FIG. 14. The operability module 770 can include various models, tables, etc. relating to operability of the three-stream engine 100 for various operating conditions. Generally, the operability demands 772 can indicate various operating margins limits or lines (e.g., stall margin, surge lines, rotating stall lines) that the three-stream engine 100 must meet in order to maintain operability. The operability demands 772 can be specifically associated with operability of a particular component. In some instances, for example, the operability demands 772 can include an operability demand associated with operability of the secondary fan 195, an operability demand associated with operability of the LP compressor 126, and an operability demand associated with operability of the HP compressor 128.

The engine controller 740 can also include an effector limits module 780. Upon executing the effector limits module 780, the one or more processors can output effector limits 782. The effector limits 782 can indicate the hardware limitations or constraints of the effector 800. For instance, in one example embodiment, the effector 800 can include an array of vanes and an actuator for modulating the position of the vanes. The actuator can define a stroke ranging between a fully retracted position and a fully extended position. The effector limits can indicate these positions as constraints so that the actuator is not physically moved past its designed limits.

As shown in FIG. 14, the engine controller 740 includes a third stream control module 790, denoted as "3S CONTROL MODULE 790" in FIG. 14. The demands 730, 734, 764, 772, schedules 752, 754, limits 756, 782, and priority selection 732 can be input into the third stream control module 790. Particularly, the effector and secondary effector schedules 752, 754 and thrust limits 756 output from the power management module 750, the engine thermal demand 764 output from the engine thermal management system module 760, the operability demands 772 output from the operability module 770, effector limits 782 output from the effector limits module 780, and the priority selection 732 and aircraft thermal demands 734 received from the supervisory system 720 can be input into the third stream control module 790. In executing the third stream control module 790, the one or more processors can output third stream effector demands 792, denoted as "3S EFFECTOR DMD(s) 792" in FIG. 14, based at least in part on one or more of the demands 730, 734, 764, 772, schedules 752, 754, limits 756, 782, and priority selection 732.

The effector demands 792 can be routed to the effector 800, and in response to the third stream effector demands 792, the effector 800 can cause adjustment of the airflow through the fan duct 172. As noted, adjusting the airflow through the fan duct 172 can be an adjustment of one or more properties of the airflow, such as the mass flow, temperature, and/or the pressure. In some embodiments, the secondary effector demands 794 can be routed to the secondary effector 810, and in response to the secondary effector demands 794, the secondary effector 810 can assist with adjustment of the airflow through the fan duct 172 to achieve a desired thrust or thermal contribution. Upon causing the effector 800, and in some instances the secondary effector 810, to adjust the airflow through the fan duct 172, one or more engine cycles can be performed, denoted at block 820 in FIG. 14.

One or more sensors 830 of the three-stream engine 100 and/or aircraft 700 can capture one or more operating parameters associated with the three-stream engine 100 and/or aircraft 700, a current position of the effector 800 and/or secondary effector 810, and various constraints during the one or more engine cycles performed at block 820. Sensor data 832 including such captured data can be fed back to the engine controller 740 as shown in FIG. 4. Such sensor data 832 can be utilized by the one or more modules 750, 760, 770, 780, 790 of the engine controller 740. For instance, the compressor discharge pressure or pressure at the inlet of the HP compressor 128 can be captured and fed back to the operability module 770 so that, when executed, the operability module 770 can output an operability demand 772 that reflects the actual operating conditions within the three-stream engine 100. Moreover, the temperature of the airflow flowing through the fan duct 172 can be captured and fed to the engine thermal management system module 760 so that, when executed, the engine thermal management system module 760 can output an engine thermal demand 764 that reflects the actual operating conditions within the fan duct 172, and accordingly, can demand more or less cooling to achieve a desired thermal target. The sensor data 832 can also include other feedback, such as the rotational speed of one or more of the shafts 136, 138 (potentially corrected by an engine temperature at a particular engine station), an electrical characteristic associated with the electric machine 600 (e.g., a voltage or electric current associated with the electric machine 600), etc., as well as other sensor inputs that may facilitate deriving certain parameters, such as an engine pressure ratio and/or an exhaust gas temperature.

As further shown in FIG. 14, the engine controller 740 can provide feedback data 840 to the supervisory system 720. Specifically, thrust feedback, thermal feedback, and electric feedback, among other possible feedback, can be provided to the supervisory system 720 by the engine controller 740. The thrust feedback can indicate a predicted thrust output of the three-stream engine 100. In some instances, the thrust feedback can also specifically indicate the thrust output from the fan duct 172. The thermal feedback can indicate a cooling capacity of one or more heat sinks associated with the engine thermal management system 762, for example. The electric feedback can indicate one or more characteristics associated with the electrical systems or components of the three-stream engine 100. For instance, the voltage or electric current associated with the electric machine 600 can be fed back to the supervisory system 720. The supervisory system 720 can utilize the feedback data 840 in generating demands, e.g., for a subsequent timestep of the control system 710.

With the control system 710 described generally, an example manner in which the one or more processors of the engine controller 740 can cause the effector 800 to adjust the airflow through the fan duct 172 will now be provided. For this example embodiment, the effector 800 is the array of inlet guide vanes 640 positioned upstream of the secondary fan 195. In causing the array of inlet guide vanes 640 to adjust the airflow through the fan duct 172, the one or more processors of the engine controller 740 are configured to cause adjustment of a pitch of the inlet guide vanes 640 about their respective central vane axes 642. For instance, based on the third-stream effector demands 792 output from the engine controller 740, the actuator 644 can collectively pitch the inlet guide vanes 640 about their respective central vane axes 642. Consequently, the airflow through the fan duct 172 is adjusted. That is, at least one of the mass flow, temperature, and pressure of the airflow through the fan duct 172 is adjusted by moving the position of the inlet guide vanes 640.

Figure 15:
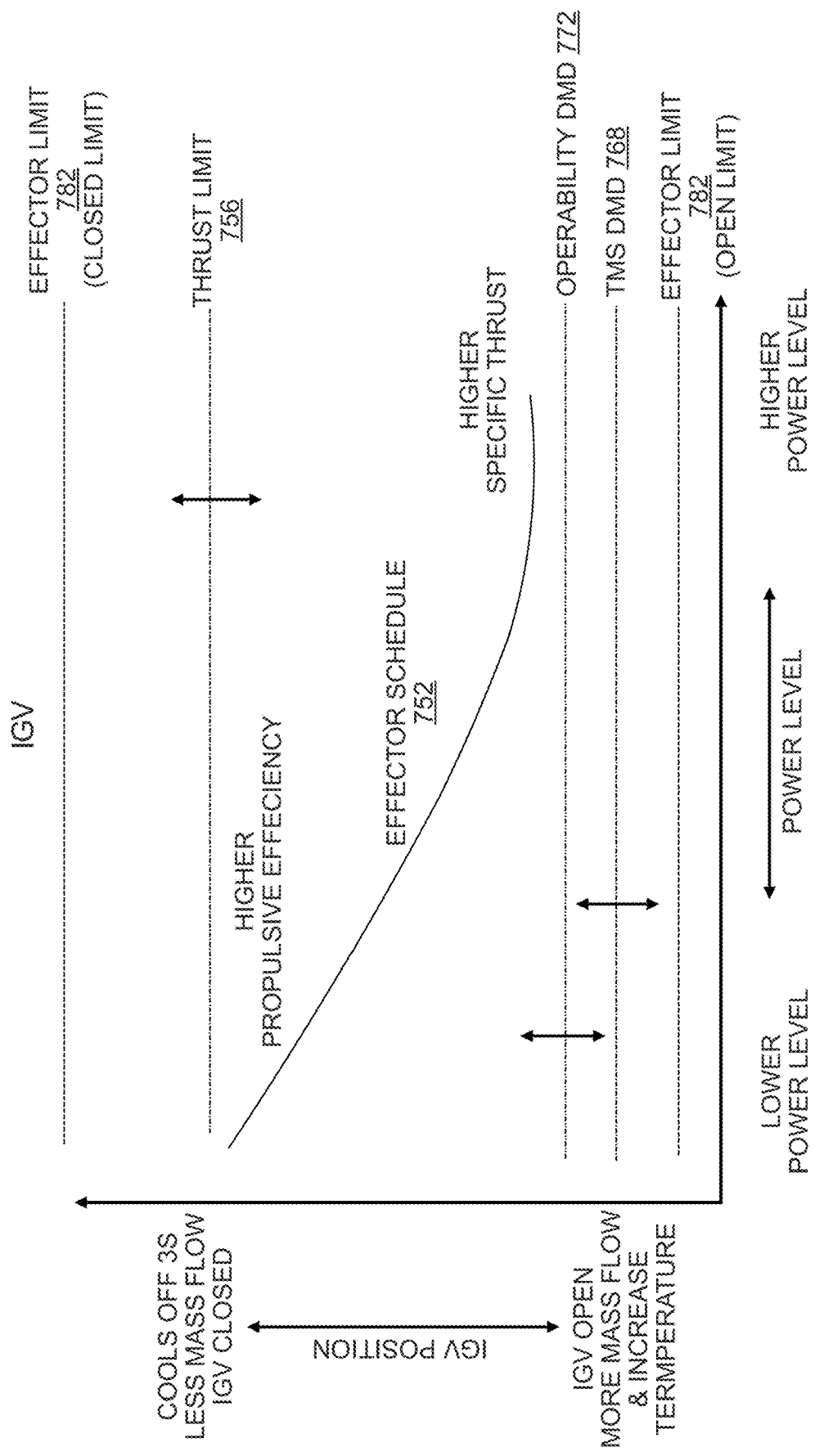
FIG. 15 provides a graph depicting inlet guide vane position scheduled as a function of a power level of the three-stream engine of FIGS. 11 and 12.

With reference now to FIGS. 11, 12, 14, and 15, the one or more processors of the engine controller 740 can cause the array of inlet guide vanes 640 to adjust the airflow through the fan duct 172 in accordance with the demands 730, 734, 764, 772, schedules 752, 754, limits 756, 782, and priority selection 732 provided to the third stream control module 790. Particularly, FIG. 15 graphically depicts inlet guide vane position scheduled as a function of a power level of the three-stream engine 100. An effector schedule 752 associated with the inlet guide vane position is depicted as a function of power level. The effector schedule 752 can be generated and output by execution of the power management module 750 as depicted in FIG. 14. For this embodiment, the effector schedule 752 has a negative exponential shape as depicted in FIG. 15. The effector schedule 752 is a default or base schedule that the effector demands 792 are generated in accordance with unless the effector schedule 752 is constrained by another demand or limit.

In accordance with the effector schedule 752, the lower the power level of the three-stream engine 100, the more closed the inlet guide vanes 640 are moved. Moving the inlet guide vanes 640 more closed decreases the mass flow of the airflow through the fan duct 172 and also cools the temperature of the airflow therethrough. Lower power levels are associated with higher propulsive efficiency of the three-stream engine 100 as indicated in FIG. 15. In contrast, in accordance with the effector schedule 752, the higher the power level of the three-stream engine 100, the more open the inlet guide vanes 640 are moved. Moving the inlet guide vanes 640 to a more open position increases the mass flow of the airflow through the fan duct 172 and also increases the temperature of the airflow therethrough. Higher power levels are associated with higher specific thrust of the three-stream engine 100 as also indicated in FIG. 15.

As further shown in FIG. 15, in addition to the effector schedule 752, various demands and limits are depicted. Particularly, the operability demand 772, a thermal demand 768, the thrust limit 756, and the effector limits 782 are depicted. The thermal demand 768, operability demand 772, and thrust limit 756 are movable along the y-axis of the graph as represented by the double-sided arrows positioned adjacent the operability demand 772, the thermal demand 768, and the thrust limit 756. Specifically, the thermal demand 768 is movable along the y-axis of the graph based on inputs from the aircraft thermal management system 726 and/or the engine thermal management system 762. The thermal demand 768 can be a summation of the engine thermal demand 764 and the aircraft thermal demand 734, for example. If additional cooling is demanded, for instance, the thermal demand 768 can be moved upward along the y-axis. This may, for example, increase the cooling capacity of the heat exchangers 630 positioned in the fan duct 172. In contrast, if less cooling is demanded, the thermal demand 768 can be moved downward along the y-axis of the graph.

The operability demand 772 is movable along the y-axis of the graph based on the sensor data 832 indicating one or more operating parameters associated with the three-stream engine 100, such as the rate of change of the compressor discharge pressure or pressure at the inlet of the HP compressor 128. The thrust limit 756 is movable along the y-axis of the graph based on the sensor data 832 indicating one or more operating parameters associated with the three-stream engine 100, such as the temperature or pressure at a station of the engine. The effector limits 782 are fixed constraints in this example embodiment. The effector limits 782 include an open limit and a closed limit in this example.

In some embodiments, the position of the inlet guide vanes 640 is selected in accordance with the effector schedule 752 unless other demands and/or limits intersect with or are selected as being of higher priority, which may cause the position of the inlet guide vanes 640 to deviate from the effector schedule 752. The priority of the demands and/or limits may be preselected, e.g., by the supervisory system 720 and/or the engine controller 740. Examples are provided below.

EXAMPLE 1: As a first example, with reference to FIG. 16 in addition to FIGS. 11, 12, 14, and 15, FIG. 16 provides a graph depicting inlet guide vane position as a function of time. In this example, the power level of the three-stream engine 100 remains constant, and thus, the effector schedule 752 is shown as a constant function. Further, for this example, the supervisory system 720 and/or engine controller 740 seeks to prioritize the cooling of various components of the aircraft 700. Accordingly, at time t1, the thermal demand 768 begins to increase, which represents a demand for increased cooling capacity. Also, before and at time t1, the position of the inlet guide vanes 640 is set in accordance with the effector schedule 752, as represented by the effector demand 792 tracing over the effector schedule 752 prior to and at time t1. The effector demand 792 is shown in dashed lines in FIG. 16.

At time t2, the thermal demand 768 intersects with the effector schedule 752 and continues to increase thereafter. The intersection of the thermal demand 768 with the effector schedule 752 indicates that the thermal demand 768 is of higher priority than the effector schedule 752. Notably, at time t2, the effector demand 792 begins to trace along the thermal demand 768 rather than the effector schedule 752. In accordance with the effector demands 792, the inlet guide vanes 640 are moved or pitched about their respective central vanes axes 642. In this instance, to meet the increase in thermal demand, the inlet guide vanes 640 are pitched to a more closed position, which reduces the temperature and mass flow of the airflow through the fan duct 172. Advantageously, this may increase the rate of thermal exchange between the heat exchangers 630 and the airflow through the fan duct 172. The inlet guide vanes 640 are gradually pitched more closed from time t2 to time t3.

At time t3, the thermal demand 768 and effector demand 792 tracing along the thermal demand 768 intersect with the thrust limit 756. To avoid passing the thrust limit 756, at t3, the effector demand 792 begins to trace along the thrust limit 756 even though the thermal demand 358 continues to increase after time t3. As shown, the effector demand 792 and consequently the position of the inlet guide vanes 640 is held for a time at the thrust limit 756 (until time t5) to provide the coolest possible airflow through fan duct 172 whilst not affecting the ability of the three-stream engine 100 to maintain aircraft controllability. While the thrust contribution from the fan duct 172 is sacrificed somewhat when the inlet guide vanes 640 are moved more closed, the thermal contribution that the fan duct 172 provides to one or more thermal management systems can be increased.

Figure 16:
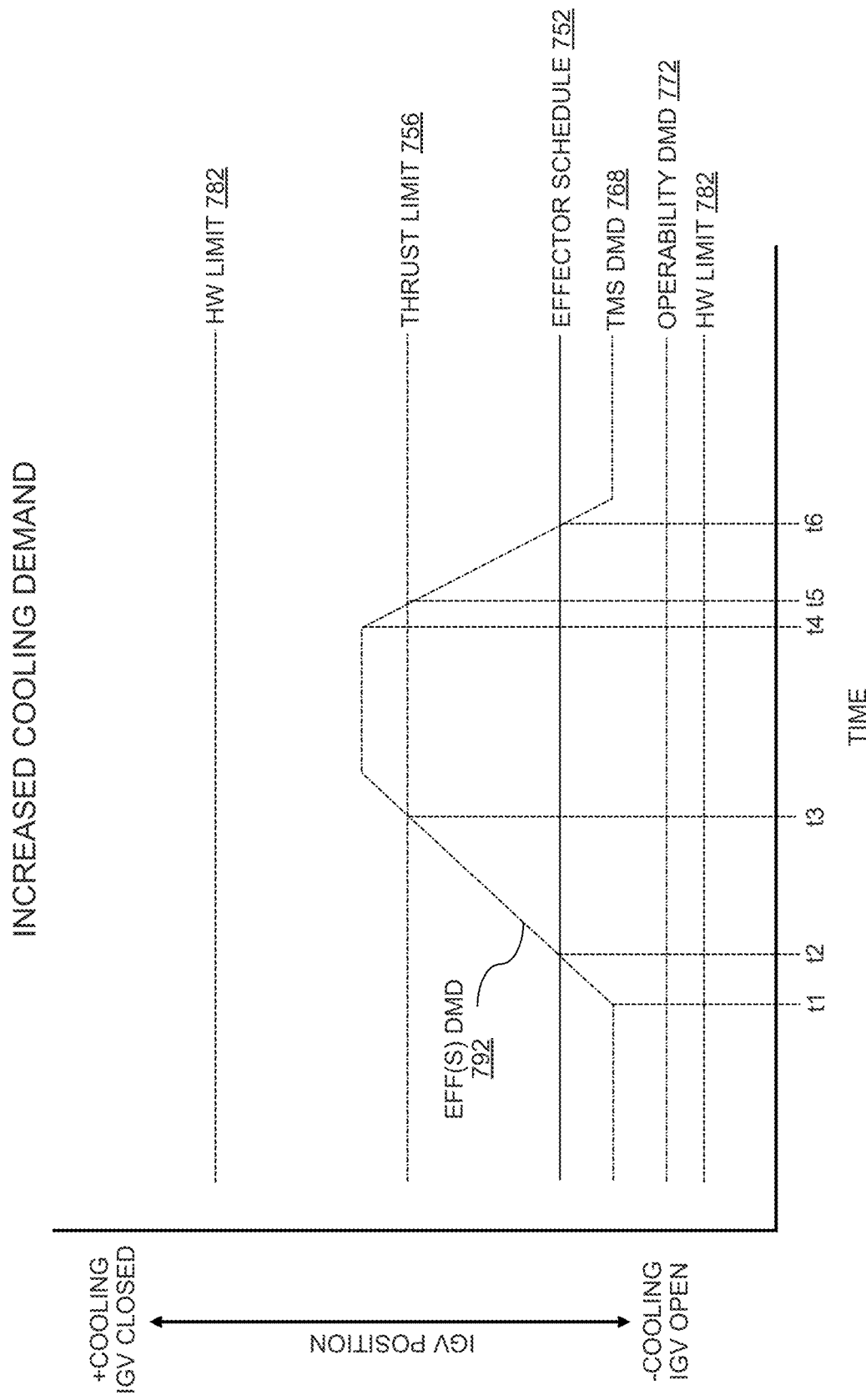
FIG. 16 provides a graph depicting inlet guide vane position as a function of time in response to an increased thermal demand according to one example embodiment of the present disclosure.

At time t4, the increased thermal demand for one or more of the thermal management systems of the aircraft 700 is no longer needed. Thus, at t4, the thermal demand 768 starts to decrease. The thermal demand 768 can be decreased linearly as shown in FIG. 16. At time t5, the thermal demand 768 intersects with the thrust limit 756 and the effector demand 792 tracing along the thrust limit 756. As less cooling is needed, at time t5, the effector demand 792 begins to trace along the thermal demand 768 rather than the thrust limit 756. In accordance with the effector demands 792, the inlet guide vanes 640 are moved or pitched about their respective axes 642. In this instance, to meet the decrease in thermal demand 768 and to increase the thrust contribution provided by the fan duct 172, the inlet guide vanes 640 are pitched to a more open position, which increases the temperature and mass flow of the airflow through the fan duct 172. The inlet guide vanes 640 are gradually pitched more open from time t5 to time t6.

At time t6, the thermal demand 768 intersects once again with the effector schedule 752. Thus, the effector demand 792 begins to trace along the effector schedule 752 rather than the thermal demand 768 at time t6. This allows for optimization or improvement of the thrust contribution provided by the fan duct 172 whilst still providing a nominal thermal contribution. In accordance with the effector demands 792, the inlet guide vanes 640 are no longer moved more open but rather are held in position at time t6.

Figure 17:
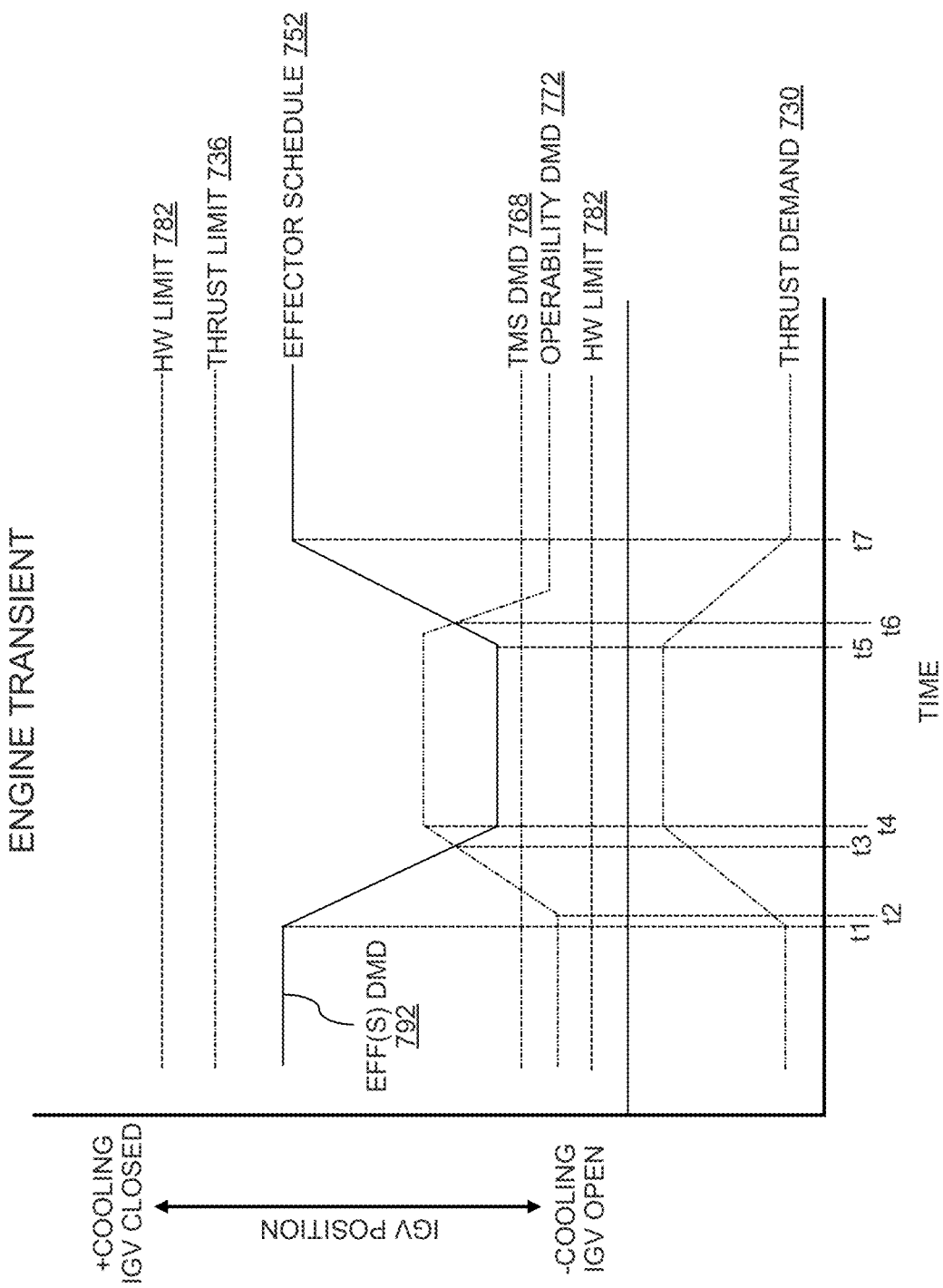
FIG. 17 provides a graph depicting inlet guide vane position as a function of time in response to an increased thrust demand according to one example embodiment of the present disclosure.

EXAMPLE 2: As a second example, with reference to FIG. 17 in addition to FIGS. 11, 12, 14, and 15, FIG. 17 provides a graph depicting inlet guide vane position as a function of time as well as a thrust demand 730 as a function of time. In this example, the power level of the three-stream engine 100 does not remain constant. Rather, the three-stream engine 100 is subjected to an engine transient. Particularly, as depicted in FIG. 17, the thrust demand 730 increases at time t1. This causes the effector schedule 752 to decrease along the y-axis at time t1. As the effector demand 792 traces along the effector schedule 752, at time t1, the inlet guide vanes 640 are moved more open to increase the mass flow and temperature of the air flowing through the fan duct 172, thereby increasing the thrust contribution provided by the fan duct 172 to the net propulsive thrust. As a result of the increase thrust demanded at time t1, at time t2, the operability demand 772 begins to increase along the y-axis, e.g., as the compressor operating line moves closer to the surge line or stall line. The thrust demand 730 increases to time t4.

At time t3, the operability demand 772 intersects with the effector schedule 752. To prevent inoperability of the three-stream engine 100, the effector demand 792 is determined as being of higher priority and begins to trace along the operability demand 772 instead of the effector schedule 752. Consequently, at time t3, in accordance with the effector demand 792, the inlet guide vanes 640 cease moving to a more open position and move more closed to decrease the mass flow of the air flowing through the fan duct 172. This may ensure operability of the three-stream engine 100.

At time t4, the thrust demand 730 is no longer increasing. Thus, the operability demand 772 ceases to increase along the y-axis of the graph. The thrust demand 730 is held constant from time t4 to time t5. At time t5, a decrease in thrust is demanded as represented by the decreasing thrust demand 730. When the thrust demand 730 decreases at time t5, the operability demand 772 begins to decrease along the y-axis of the graph, e.g., as the compressor operating line moves away from the surge line or stall line.

At time t6, the operability demand 772 intersects with the effector schedule 752 once again. Thus, at time t6, the effector demand 792 begins to trace along the effector schedule 752 rather than the operability demand 772. As less thrust is demanded, at time t6, in accordance with the effector demand 792, the inlet guide vanes 640 are moved to a more closed position, which decreases the mass flow and temperature of the air flowing through the fan duct 172. At time t7, the effector schedule 752 ceases increasing along the y-axis as the thrust demand 730 ceases decreasing.

Figure 18:
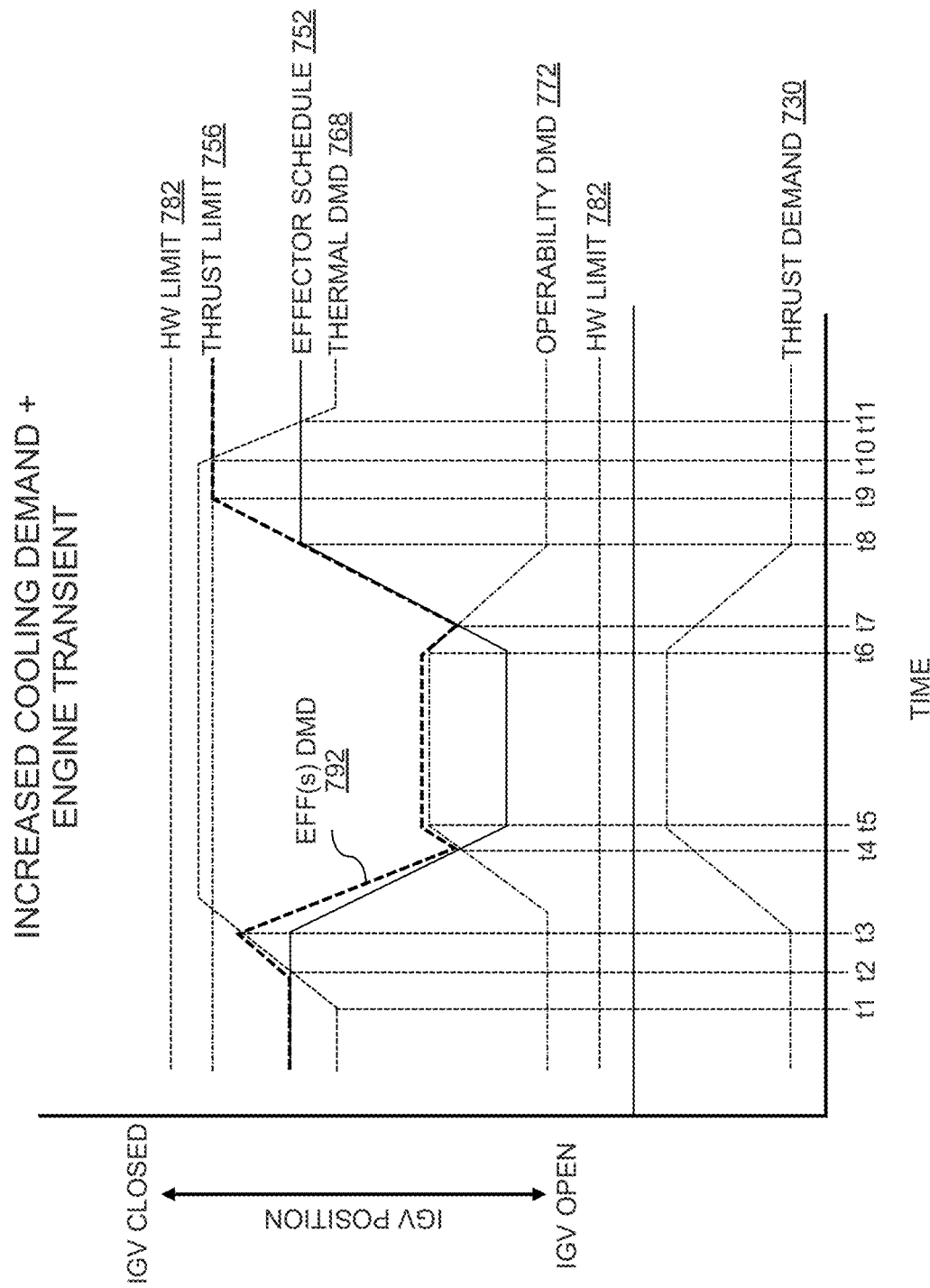
FIG. 18 provides a graph depicting inlet guide vane position as a function of time in response to an increased thermal demand and an increased thrust demand according to one example embodiment of the present disclosure.

EXAMPLE 3: As a third example, with reference to FIG. 18 in addition to FIGS. 11, 12, 14, and 15, FIG. 18 provides a graph depicting inlet guide vane position as a function of time as well as a thrust demand 730 as a function of time. In this example, increased cooling is demanded and the power level of the three-stream engine 100 is subjected to an engine transient. As depicted in FIG. 18, at time t1, an increased amount of cooling is demanded as reflected by the thermal demand 768 increasing along the y-axis of the graph. Prior to and at time t1, the effector demand 792 traces along the effector schedule 752. At time t2, the increasing thermal demand 768 intersects with the effector schedule 752. Accordingly, the effector demand 792 begins to trace along the thermal demand 768 rather than the effector schedule 752 at time t2. In accordance with the effector demand 792, the inlet guide vanes 640 are moved to a more closed position, which cools down the air flowing through the fan duct 172 thereby increasing the cooling capacity of the heat exchangers 630.

At time t3, the thrust demand 730 increases, e.g., in response to a pilot manipulating the thrust control 722. This causes the effector schedule 752 to decrease along the y-axis at time t3. In this example, the supervisory system 720 has made a priority selection 732 indicating that meeting the thrust demand 730 during this transient operation is of higher priority than meeting the thermal demand 768. Accordingly, the effector demand 792 aborts tracing along the thermal demand 768 and returns to follow the effector schedule 752 as safely and quickly as possible. In accordance with the effector demand 792, from time t3 to time t4 the inlet guide vanes 640 are moved to a more open position, which increases the mass flow and temperature of the air flowing through the fan duct 172, which increases the thrust contribution provided by the fan duct 172. As a result of the increase thrust demanded at time t3, the operability demand 772 begins to increase along the y-axis, e.g., as the compressor operating line moves closer to the surge line or stall line. The thrust demand 730 increases to time t5.

At time t4, as the effector demand 792 traces along the effector schedule 752, the operability demand 772 intersects with the effector schedule 752. To prevent inoperability of the three-stream engine 100, the effector demand 792 begins to trace along the operability demand 772 instead of the effector schedule 752. Consequently, at time t4, in accordance with the effector demand 792, the inlet guide vanes 640 cease moving to a more open position and move more closed to decrease the mass flow of the air flowing through the fan duct 172.

At time t5, the thrust demand 730 is no longer increasing. Thus, the operability demand 772 ceases to increase along the y-axis of the graph. The thrust demand 730 is held constant from time t5 to time t6. At time t6, a decrease in thrust is demanded as represented by the decreasing thrust demand 730. When the thrust demand 730 decreases at time t6, the operability demand 772 begins to decrease along the y-axis of the graph, e.g., as the compressor operating line moves away from the surge line or stall line.

At time t7, the operability demand 772 intersects with the effector schedule 752 once again. Thus, at time t7, the effector demand 792 begins to trace along the effector schedule 752 rather than the operability demand 772. As less thrust is demanded, at time t7, in accordance with the effector demand 792, the inlet guide vanes 640 are moved to a more closed position, which decreases the mass flow and temperature of the air flowing through the fan duct 172.

At time t8, the thrust demand 730 ceases to decrease and levels off. The effector schedule 752 correspondingly ceases to increase along the y-axis of the graph and levels off. As the engine transient operation has completed at time t8 (as reflected by the thrust demand 730) and the thermal demand 768 has still not crossed or re-intersected with the effector schedule 752, the engine controller 740 seeks to meet the thermal demand 768. Thus, the effector demand 792 devi-ates from the effector schedule 752 and increases along the y-axis to meet the thermal demand 768 at time t8. At time t9, the effector demand 792 reaches the thrust limit 756 before reaching the thermal demand 768. Accordingly, the effector demand 792 traces along the thrust limit 756 instead of the thermal demand 768 so as not to negatively affect the controllability of the aircraft 700.

After time t9 and before time t10, less thermal demand 768 is requested, and thus the thermal demand 768 begins to decrease along the y-axis of the graph. At time t10, the thermal demand 768 intersects with the thrust limit 756. Accordingly, the effector demand 792 begins to trace along the thermal demand 768 at time t10. The thermal demand 768 continues to decrease after time t10. In accordance with the effector demand 792, this causes the inlet guide vanes 640 to move to a more open position. At time t11, the thermal demand 768 intersects with the effector schedule 752. As a result, the effector demand 792 begins to trace along the effector schedule 752.

EXAMPLE 1, EXAMPLE 2, and EXAMPLE 3 provide example manners in which the engine controller 740 can control the effector 800, or array of inlet guide vanes 640 in these example embodiments, to cause adjustment of the airflow through the fan duct 172. Particularly, the one or more processors of the engine controller 740 are configured to: determine an effector demand 792 based at least in part on an interaction between: i) the effector schedule 752 determined based at least in part on the thrust demand 730, the thrust demand 730 being associated with thrust to be produced by the three-stream engine 100; ii) the thermal demand 768 associated with a thermal management system coupled to or integrated with the three-stream engine 100; iii) the operability demand 772 associated with operability of the three-stream engine 100; and iv) the thrust limit 756 associated with controllability of the aircraft 700. Accordingly, in such embodiments, the one or more processors are configured to cause the effector 800 to adjust an airflow through the fan duct 172 based at least in part on the effector demand 792. The effector demand 792 can be determined in accordance with the effector schedule 752 unless one of the demands or limits is selected or determined as being of higher priority, for example.

Stated another way, the one or more processors of the engine controller 740 are configured to: determine an effector demand 792 based at least in part on an effector schedule 752 and one or more constraints, the effector schedule 752 being determined based at least in part on the thrust demand 730 associated with thrust to be produced by the three-stream engine 100, the one or more constraints including at least one of: i) the thermal demand 768 associated with a thermal management system coupled to or integrated with the three-stream engine 100; ii) an operability demand 772 associated with operability of the three-stream engine 100; and iii) the thrust limit 756 associated with controllability of the aircraft 700. The one or more processors of the engine controller 740 are configured to cause the effector 800 to adjust an airflow through the fan duct 172 based at least in part on the effector demand 792.

In accordance with the inventive aspects of the present disclosure, the effector 800 can be or can include other components in addition or alternatively to the inlet guide vanes 640. For instance, in some embodiments, the effector 800 can be the variable nozzle 650 positioned along the fan duct 172. In such embodiments, in causing the variable nozzle 650 to adjust the airflow through the fan duct 172, the one or more processors of the engine controller 740 are configured to cause the variable nozzle 650 to change position. For instance, on one hand, when more cooling is needed, the one or more processors of the engine controller 740 can be configured to cause the variable nozzle 650 to move to a more open position. On the other hand, when additional thrust is needed, the one or more processors of the engine controller 740 can be configured to cause the variable nozzle 650 to move to a more closed position. As noted, in FIG. 12, the variable nozzle 650 is shown in the fully open position via solid lines and in the fully closed position via the phantom lines. The variable nozzle 650 can be moved by the actuator 652 to vary the exit area through the secondary bypass outlet 179 in accordance with the effector demand 792 output by the engine controller 740.

FIG. 199 provides a graph depicting variable nozzle position scheduled as a function of a power level of the three-stream engine of FIGS. 11 and 12. As depicted, the shape of the effector schedule 752 associated with the variable nozzle position is similar to the shape of the effector schedule 752 associated with the inlet guide vanes depicted in FIG. 15. However, on the y-axis of the graph of FIG. 19, the fully closed position is the minimum position while the fully open position is the maximum position. In contrast, for the inlet guide vane position depicted in FIG. 15, the fully open position is the minimum position while the fully closed position is the maximum position. In this regard, the open and closed positions of the inlet guide vanes and the variable nozzle as they relate to the maximum and minimums are reversed.

Figure 19:
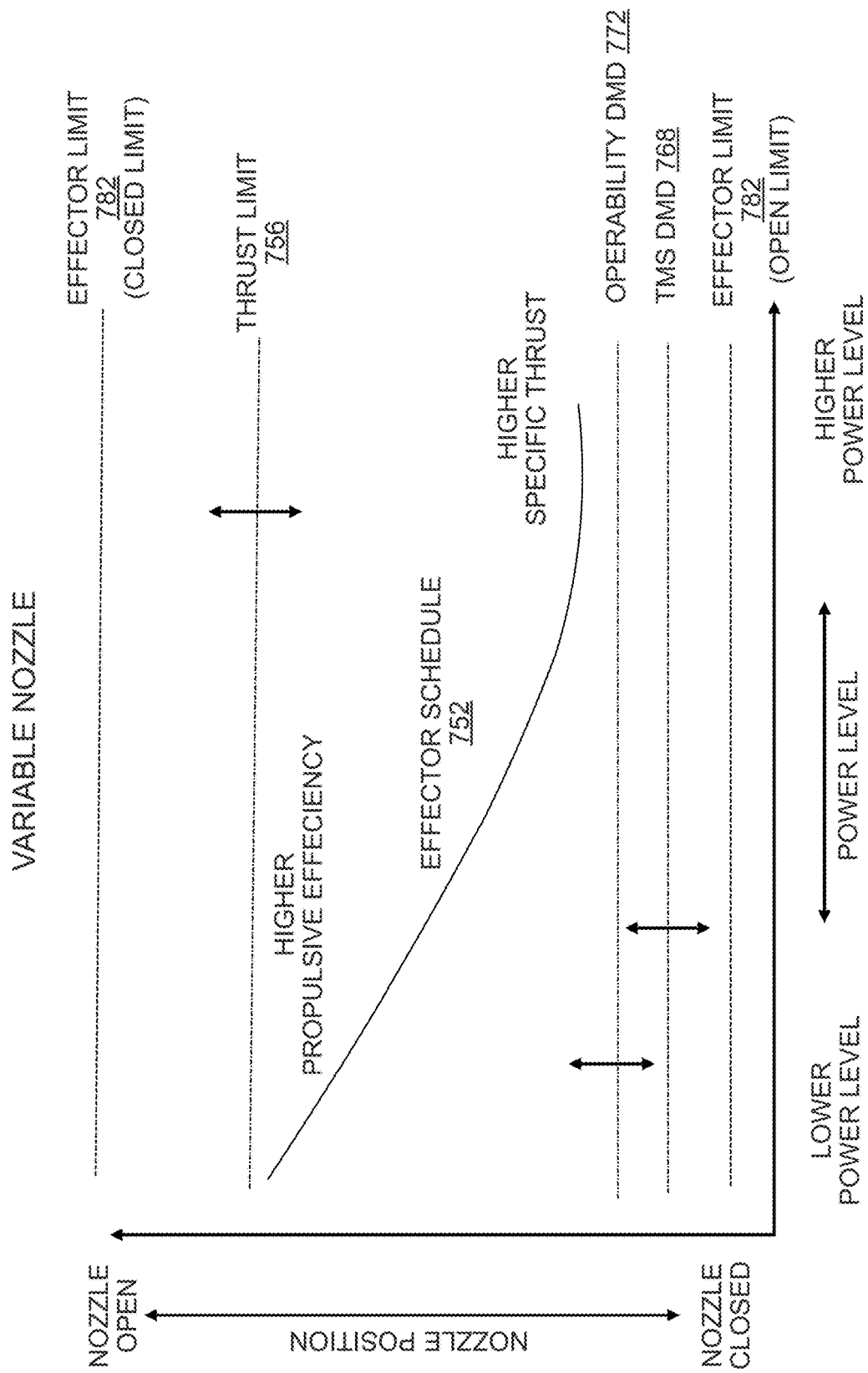
FIG. 19 provides a graph depicting variable nozzle position scheduled as a function of a power level of the three-stream engine of FIGS. 11 and 12.

As further shown in FIG. 19, the effector limits 782, thrust limit 756, operability demand 772, and thermal demand 768 are graphically represented. In view of the teachings provided herein and the noted differences between how the variable nozzle 650 is to be controlled to provide increased cooling capability or an increased thrust contribution compared to how the inlet guide vanes 640 are controlled to achieve the same, it will be appreciated that the effector demand 792 for the variable nozzle 650 can be generated by the engine controller 740 and the variable nozzle 650 can be controlled in accordance with the effector demand 792 in a same or similar manner described above with respect to control of the inlet guide vanes 640.

In some further embodiments, the effector 800 can include the array of inlet guide vanes 640 positioned upstream of the secondary fan 195 and the variable nozzle 650 positioned along the fan duct 172. In this regard, the engine controller 740 can output effector demands 792 for controlling the inlet guide vanes 640 and effector demands 792 for controlling the variable nozzle 650.

In yet other embodiments, in addition or alternatively to the effector 800 being or including the inlet guide vanes 640, and/or the variable nozzle 650, the effector 800 is or can include the primary fan 152. In such embodiments, in causing the effector 800, or the primary fan 152 in this example, to adjust the airflow through the fan duct 172, the one or more processors of the engine controller 740 are configured to cause at least one of: i) adjustment of a pitch of fan blades 154 of the primary fan 152; and ii) adjustment of a rotational speed of the primary fan 152. In some embodiments, both the pitch of fan blades 154 of the primary fan 152 and the speed of the rotational speed of the primary fan 152 can be adjusted to effect a change in thrust or thermal contribution provided by the fan duct 172.

The one or more processors of the engine controller 740 can cause the one or more actuators 158 to pitch the fan blades 154 about their respective central blade axes 156 to a more open or closed position to effect a change in thrust or thermal contribution provided by the fan duct 172. Moreover, the one or more processors of the engine controller 740 can cause more or less fuel to be provided to the combustor 130, which effectively changes the rotational speed of the LP shaft 138 and consequently the primary fan 152 mechanically coupled thereto.

Figure 20:
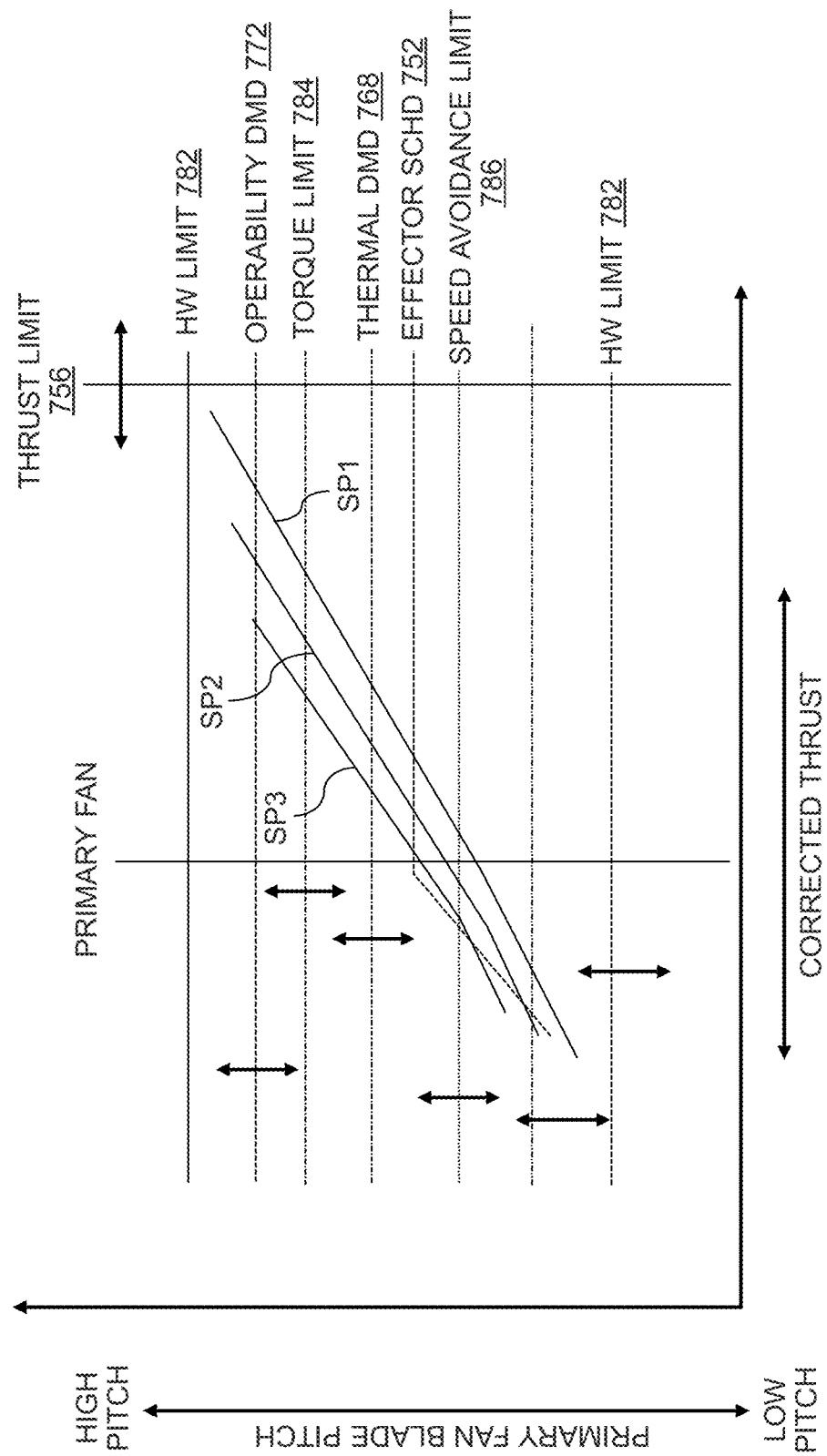
FIG. 20 provides a graph depicting various speed lines scheduled by pitch as a function of a corrected thrust of the three-stream engine of FIGS. 11 and 12.

FIG. 20 provides a contour graph depicting various fan speed lines arranged by pitch as a function of a corrected thrust of the three-stream engine of FIGS. 11 and 12. The pitch of the primary fan blades 154 is represented on the y-axis of the graph of FIG. 20 while the corrected thrust is represented on the x-axis of the graph. There are three example speed contour lines shown, including a first speed line SP1, a second speed line SP2, and a third speed line SP3. The first speed line SP1 represents a higher speed than the second speed line SP2, and the second speed line SP2 represents a higher speed than the third speed line SP3. More or less than three speed lines are contemplated. The speed lines SP1, SP2, SP3 effectively depict various speed/pitch combinations that may achieve a given corrected thrust. It will be appreciated that the contour graph of FIG. 20 may alternatively be presented as various pitch lines arranged by fan speed as a function of a corrected thrust of the three-stream engine of FIGS. 11 and 12.

As further shown in FIG. 20, the effector limits 782, thrust limit 756, operability demand 772, and thermal demand 768 are graphically represented. The thrust limit 756 is movable along the x-axis of the graph of FIG. 20. In addition, for this embodiment, a torque limit 784 and a speed avoidance limit 786 are graphically represented as well. The torque limit 784 and the speed avoidance limit 786 can be output by the effector limits module 780, for example. The torque limit 784 can indicate a maximum torque at which the primary fan 152 may operate before exceeding its designed limit. The speed avoidance limit 786 can indicate a speed at which the primary fan 152 negatively affects the dynamic response of the LP system and/or HP system of the three stream engine 100. For instance, the speed avoidance limit 786 can indicate a speed at which rub events are predicted to occur (a rub event may include the rubbing of a turbine blade on a shroud, for example), a speed at which vibration damage associated with the LP shaft 138 and/or HP shaft 136 are predicted to occur, and/or a speed at which mechanical and/or thermal fatigue is unacceptable. The torque limit 784 and the speed avoidance limit 786 are movable along the y-axis of the graph of FIG. 20 as denoted by the double-sided arrows positioned adjacent thereto.

In view of the teachings provided herein, it will be appreciated that the primary fan 152 can be controlled to provide increased cooling capability or an increased thrust contribution based at least in part on the effector demand 792 (FIG. 14). Particularly, the primary fan 152 can be controlled in accordance with the effector demand 792, e.g., in a same or similar manner described above with respect to control of the inlet guide vanes 640.

In other embodiments, in addition or alternatively to the effector 800 being or including the inlet guide vanes 640, and/or the variable nozzle 650, and/or the primary fan 152, the effector 800 is or can include the electric machine 600 mechanically coupled with the LP shaft 138 and/or the electric machine 610 mechanically coupled with the HP shaft 136. In such example embodiments, in causing the effector 800, or the electric machine 600 and/or electric machine 610 in this example, to adjust the airflow through the fan duct 172, the one or more processors of the engine controller 740 are configured to cause the electric machine 600 to adjust a torque applied to the LP shaft 138 and/or the electric machine 610 to adjust a torque applied to the HP shaft 136. Adjusting the torque applied by the electric machine 600 on the LP shaft 138 affects the rotational speed of the secondary fan 195, which is also mechanically coupled with the LP shaft 138. Adjusting the torque applied by the electric machine 610 on the HP shaft 136 affects the rotational speed of the HP shaft 136.

In some instances, when the electric machine 600 acts as a motor, the one or more processors of the engine controller 740 can cause a drive associated with the electric machine 600 to drive the LP shaft 138 with more or less torque. When more thrust is demanded, for example, the one or more processors can command the drive to cause the electric machine 600 to increase the torque applied on the LP shaft 138. This effectively causes the rotational speed of the secondary fan 195 to increase, causing the properties of the airflow through the fan duct 172 to change, and consequently, the thrust contribution provided by the fan duct 172 to increase. When less thrust is demanded, the one or more processors can command the drive to cause the electric machine 600 to decrease the torque applied on the LP shaft 138. This causes the rotational speed of the secondary fan 195 to decrease, causing the properties of the airflow through the fan duct 172 to change, and as a result, the thrust contribution provided by the fan duct 172 decreases. The thermal contribution provided by the fan duct 172 can be modulated as well by changing the torque applied by the electric machine 600 on the LP shaft 138.

In other instances, such as during cruise operation, the electric machine 600 may act as a generator. In such instances, the one or more processors can cause the electric machine 600 to operate more or less efficiently. This, in effect, causes the electric machine 600 to adjust a torque applied to the LP shaft 138, and consequently, the thrust and/or thermal contribution provided by the fan duct 172.

In some instances, the one or more processors of the engine controller 740 can cause one or both of the electric machine 600 and the electric machine 610 to apply more or less torque on or to their respective shafts 138, 186, which ultimately affects a Power Ratio defined as LP Power/Total Power, wherein the LP Power is the electrical power output by the electric machine 600 and the Total Power is the total electrical power output by the electric machine 600 and the electric machine 610.

Figure 21:
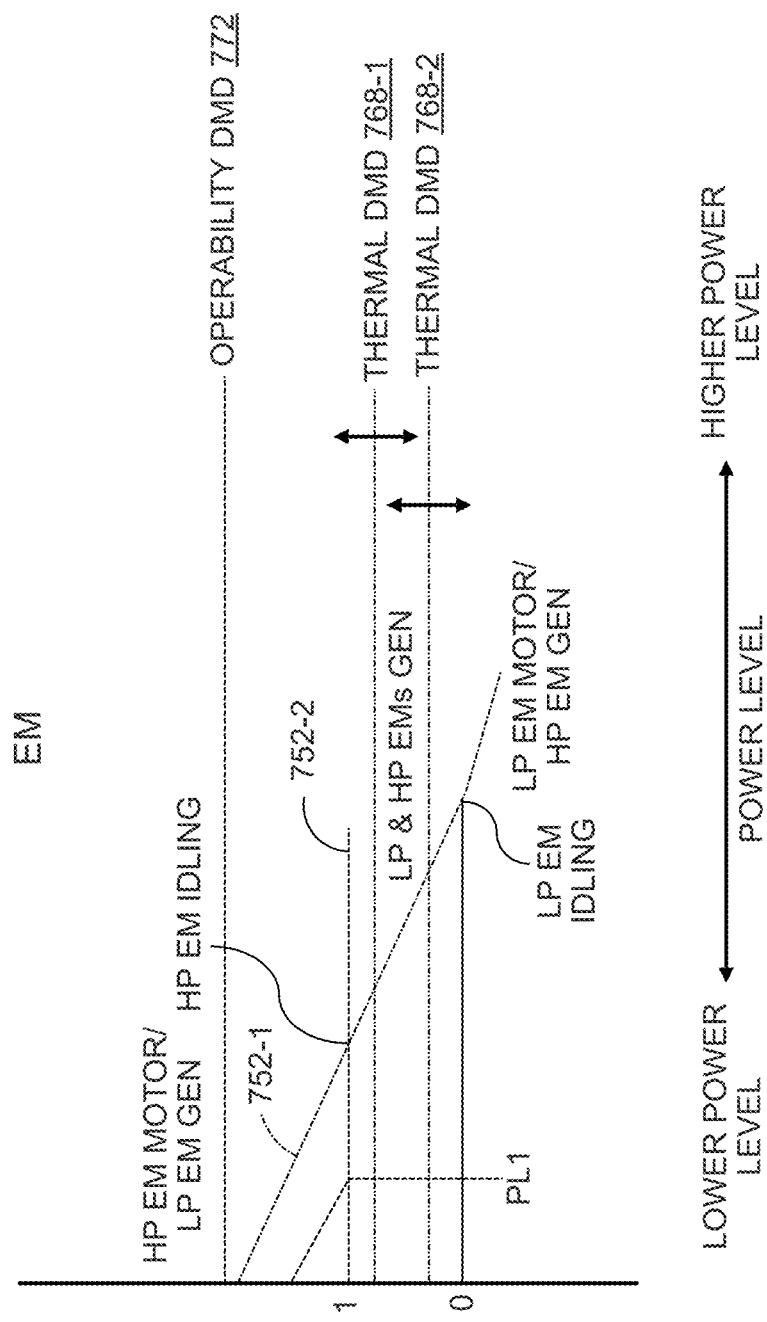
FIG. 21 provides a graph depicting a power ratio scheduled as a function of a power level of the three-stream engine of FIGS. 11 and 12.

FIG. 21 provides a graph depicting various effector schedules provided as a power ratio as a function of a power level of the three-stream engine of FIGS. 11 and 12. Particularly, FIG. 21 provides a first effector schedule 752-1 associated with a first flight condition (e.g., a first altitude) and a second effector schedule 752-2 associated with a second flight condition (e.g., a second altitude) that is different than the first flight condition. More or less than two effector schedules are contemplated. For instance, an effector schedule can be provided for each contemplated flight condition. The effector schedule to be utilized in controlling one or both of the electric machines 600, 610 can be based on the present flight conditions. The effector schedule having a flight condition that most closely matches the present flight condition can be selected, for example.

For the first effector schedule 752-1, for power ratios over 1.0, the electric machine 600 is controlled to generate electrical power and the electric machine 610 is controlled to motor or drive the HP shaft 136. At a power ration of 1.0, the electric machine 600 is controlled to continue generating electrical power and the electric machine 610 is controlled to idle. For power ratios below 1.0 and above 0.0, both electric machines 600, 610 are controlled to generate electrical power. At a power ratio of 0.0, the electric machine 610 is controlled to continue generating electrical power and the electric machine 600 is controlled to idle. For power ratios below 0.0, the electric machine 610 is controlled to generate electrical power and the electric machine 600 is controlled to motor or drive the LP shaft 138.

For the second effector schedule 752-2, for power ratios over 1.0, the electric machine 600 is controlled to generate electrical power and the electric machine 610 is controlled to motor or drive the HP shaft 136. However, at power level PL1 and higher, the slope of the second effector schedule 752-2 flattens out or has a slope of zero, which causes the electric machine 610 to idle, while the electric machine 600 is controlled to continue generating electrical power.

As further shown in FIG. 21, the operability demand 772 and thermal demands are graphically represented. For this embodiment, two thermal demands are depicted, including a first thermal demand 768-1 and a second thermal demand 768-2. The first thermal demand 768-1 and the second thermal demand 768-2 are movable along the y-axis of the graph of FIG. 21 as denoted by the double-sided arrows positioned adjacent thereto. The first thermal demand 768-1 indicates a thermal demand associated with adjusting a power split between the electric machine 600 and the electric machine 610 based on a capability of the fan duct 172 to reject heat produced by the electrical systems associated with the three-stream engine 100 (including the electric machine 600 and/or the electric machine 610) and/or the aircraft 700 (FIG. 14). Essentially, the first thermal demand 768-1 indicates a demand to adjust the power split of the electric machines 600, 610 to adjust the heat produced by the electric machines 600, 610, or rather by adjusting the "hot side". This can be accomplished by looking at the capability of the fan duct 172 (or the capability of heat exchangers therein) to reject heat and also looking at the temperature of the electric machines, their associated thermal busses, etc.

The second thermal demand 768-2 indicates a thermal demand associated with adjusting a power split between the electric machine 600 and the electric machine 610 to influence one or more properties of the airflow through the fan duct 172 to ultimately raise or lower the cooling capability of the fan duct 172. Essentially, the second thermal demand 768-2 indicates a demand to adjust the power split of the electric machines 600, 610 to influence the thermal management capabilities of the fan duct 172, or rather to influence or adjust the "cold side". This can be accomplished by looking at the temperature of the electric machines 600, 610, their associated thermal busses, etc.

In view of the teachings provided herein, it will be appreciated that the electric machine 600 and/or electric machine 610 can be controlled to provide increased cooling capability or an increased thrust contribution or a change in the heat generated thereby based at least in part on the effector demand 792 (FIG. 14). Particularly, the electric machine 600 and/or electric machine 610 can be controlled in accordance with the effector demand 792, e.g., in a same or similar manner described above with respect to control of the inlet guide vanes 640. That is, the effector schedule having a flight condition that most closely matches the present flight condition can be selected and the effector demand can be generated in accordance with the selected effector schedule unless otherwise constrained, e.g., by one of the thermal demands 768-1, 768-2, the operability demand 772, or some other constraint noted herein but not depicted in FIG. 21.

In some further embodiments, optionally, the three-stream engine 100 can include the secondary effector 810 positioned downstream of the secondary fan 195 along the core duct 142. The secondary effector 810 can be controlled to assist or facilitate adjustment of the airflow through the fan duct 172 in conjunction with one or more of the disclosed effectors 800. In such embodiments, as will be explained further below, the one or more processors of the engine controller 740 are configured to cause the secondary effector 810 to assist with adjustment of the airflow through the fan duct 172 based at least in part on the secondary effector demand 794.

For instance, in some example embodiments, the three-stream engine 100 can include a compressor having one or more stages of compressors rotor blades and compressor stator vanes, wherein at least one stage of compressor stator vanes are variable stator vanes. For instance, as shown in FIGS. 11 and 12, the LP compressor 126 includes one or more stages of compressors rotor blades and compressor stator vanes, and notably, at least one stage of the compressor stator vanes are variable compressor stator vanes. Particularly, the variable compressor stator vanes are the variable booster inlet guide vanes 660. For this embodiment, the secondary effector can be or can include the booster inlet guide vanes 660.

Figure 22:
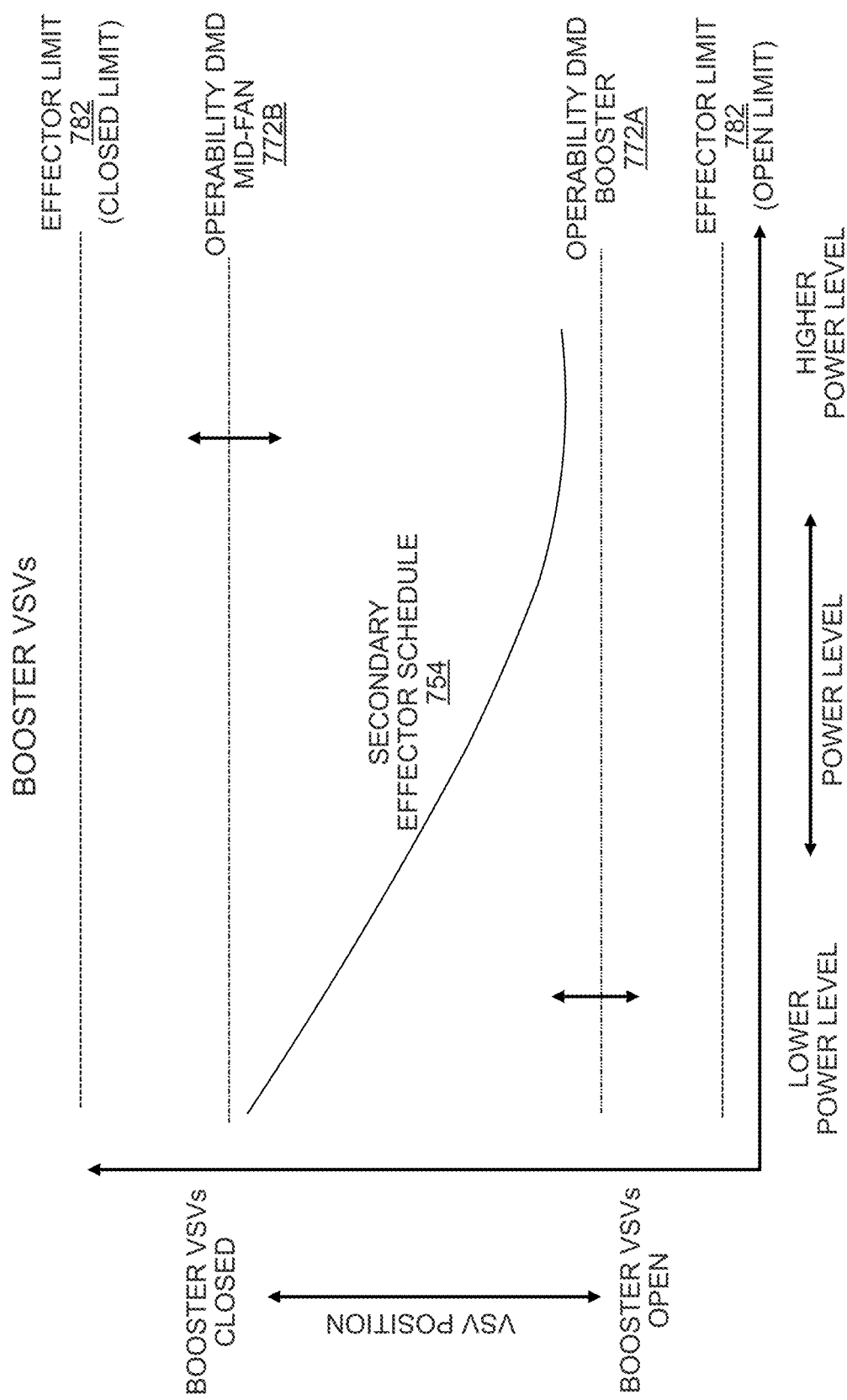
FIG. 22 provides a graph depicting booster variable stator vane position scheduled as a function of a power level of the three-stream engine of FIGS. 11 and 12.

With reference now to FIG. 22 in addition to FIGS. 11-12 and 13-14, FIG. 22 provides a graph depicting booster variable stator vane position scheduled as a function of a power level of the three-stream engine 100. As depicted, the shape of the secondary effector schedule 754 associated with the booster inlet guide vanes 660 is similar to the shape of the effector schedule 752 depicted in FIG. 15 associated with the inlet guide vanes 640.

The secondary effector schedule 754 associated with a position of the booster inlet guide vanes 660 is depicted as a function of power level. The secondary effector schedule 754 can be generated and output by execution of the power management module 750 as depicted in FIG. 14. For this embodiment, the secondary effector schedule 754 has a negative exponential shape as depicted in FIG. 22. The secondary effector schedule 754 is a default or base schedule that the secondary effector demands 794 are generated in accordance with unless the secondary effector schedule 754 is constrained by another demand or limit.

In accordance with the secondary effector schedule 754, the lower the power level of the three-stream engine 100, the more closed the booster inlet guide vanes 660 are moved. Moving the booster inlet guide vanes 660 more closed back pressures the secondary fan 195, thereby affecting the airflow through the fan duct 172. In contrast, in accordance with the secondary effector schedule 754, the higher the power level of the three-stream engine 100, the more open the booster inlet guide vanes 660 are moved. Moving the booster inlet guide vanes 660 more open increases the pumping ability of the secondary fan 195, which changes one or more properties of the airflow through the fan duct 172.

As further shown in FIG. 22, in addition to the secondary effector schedule 754, various demands and limits are depicted. Particularly, an operability demand 772A associated with operability of the secondary effector 810 (the booster inlet guide vanes 660 in this example), an operability demand 772B associated with operability of the secondary fan 195, and effector limits 782 are depicted. The operability demands 772A, 772B are movable along the y-axis of the graph. The operability demand 772A is movable along the y-axis of the graph based on the sensor data 832 indicating one or more operating parameters associated with the LP compressor 126. The operability demand 772B is movable along the y-axis of the graph based on the sensor data 832 indicating one or more operating parameters associated with the secondary fan 195.

In some embodiments, the one or more processors of the engine controller 740 are configured to determine the secondary effector demand 794 based at least in part on the interaction between: i) the secondary effector schedule 754 determined based at least in part on the thrust demand 730, ii) the operability demand 772A associated with operability of the secondary effector 810 (or in this example the booster inlet guide vanes 660); and iii) the operability demand 772B associated with operability of the secondary fan 195. As the operability demand 772B associated with operability of the secondary fan 195 is considered, the control logic of the secondary effector 810 can be said to be ganged with the control logic of the secondary fan 195.

Generally, the position of the booster inlet guide vanes 660 is selected in accordance with the secondary effector schedule 754 unless other demands and/or limits 772A, 772B, 782 intersect with or are selected as being of higher priority, which may cause the position of the booster inlet guide vanes 660 to deviate from the secondary effector schedule 754. The priority of the demands and/or limits may be preselected, e.g., by the supervisory system 720 and/or the engine controller 740. In some embodiments, the operability demand 772A associated with the booster inlet guide vanes 660 is selected as being of higher priority than the operability demand 772B associated with the secondary fan 195.

Stated another way, the one or more processors of the engine controller 740 are configured to determine the secondary effector demand 794 based at least in part on a secondary effector schedule 754 and one or more secondary constraints, the secondary effector schedule 754 being determined based at least in part on the thrust demand 730, the one or more secondary constraints including at least one of: i) an operability demand 772A associated with operability of the secondary effector 810; and ii) an operability demand associated with operability of the secondary fan 195. Further, the one or more processors of the engine controller 740 are configured to cause the secondary effector 810 to assist with adjustment of the airflow through the fan duct 172 based at least in part on the secondary effector demand 794.

In yet other embodiments, in addition or alternatively to the booster inlet guide vanes 660, the secondary effector 810 can include the variable bleed valve 670. In such embodiments, in causing the secondary effector 810, or the variable bleed valve 670 in this example, to assist with adjustment of the airflow through the fan duct 172, the one or more processors of the engine controller 740 are configured to cause adjustment of a position of the variable bleed valve 670. The one or more processors of the engine controller 740 can cause adjustment of the position of the variable bleed valve 670 so that core air from the core duct 142 is directed into one of the offboard bleed duct 672 and the secondary bleed duct 674.

Figure 23:
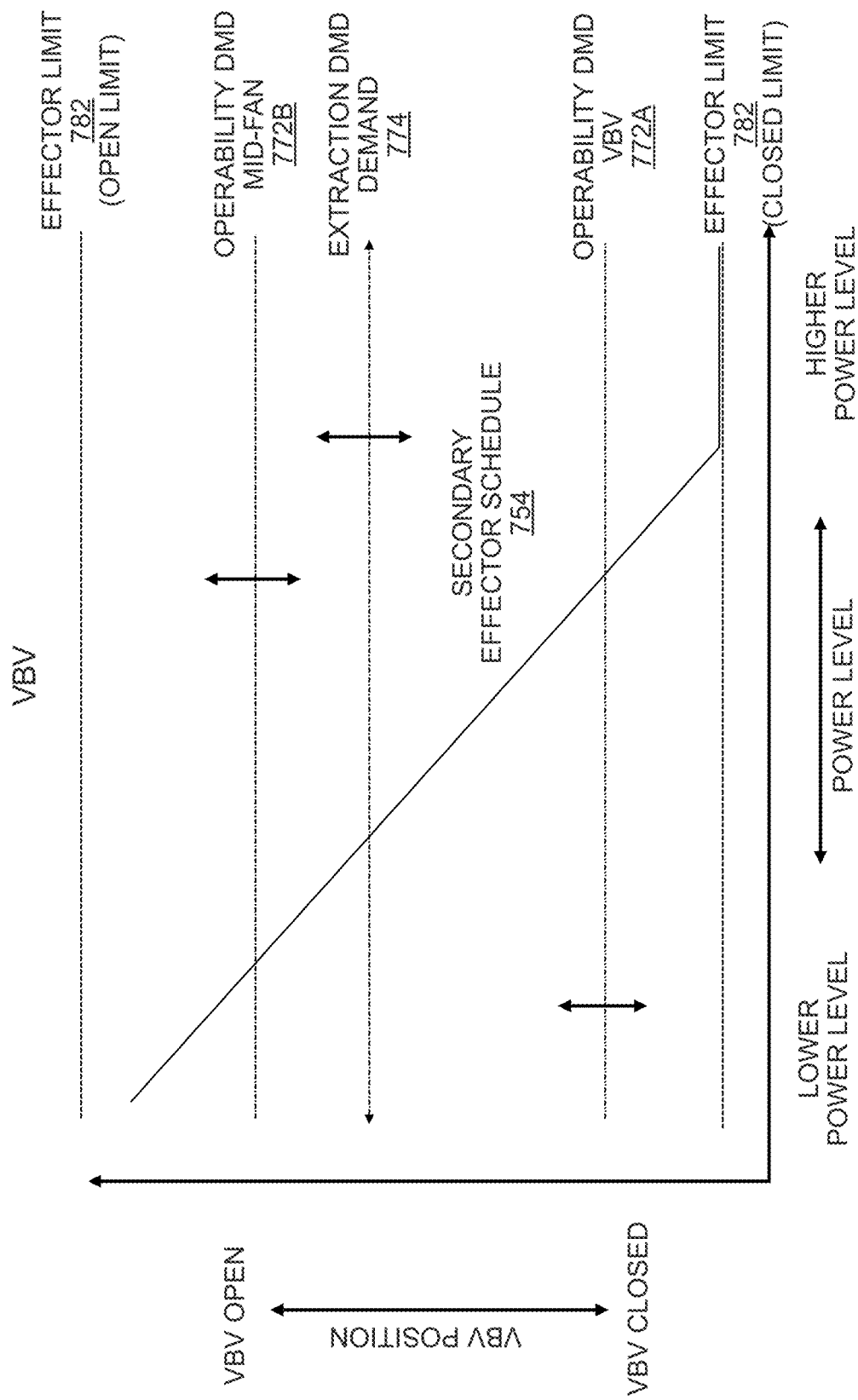
FIG. 23 provides a graph depicting variable bleed valve scheduled as a function of a power level of the three-stream engine of FIGS. 11 and 12.

With reference now to FIG. 23 in addition to FIGS. 11-12 and 13-14, FIG. 23 provides a graph depicting variable bleed valve position scheduled as a function of a power level of the three-stream engine 100. The secondary effector schedule 754 associated with a position of the variable bleed valve 670 is depicted as a function of power level. The shape of the secondary effector schedule 754 associated with the variable bleed valve 670 is generally linear having a negative slope and transitions to a constant function at higher power levels. The secondary effector schedule 754 can be generated and output by execution of the power management module 750 as depicted in FIG. 14. The secondary effector schedule 754 is a default or base schedule that the secondary effector demands 794 are generated in accordance with unless other demands or limits are of higher priority than the secondary effector schedule 754.

In accordance with the secondary effector schedule 754, the lower the power level of the three-stream engine 100, the more open the variable bleed valve 670 is moved. In contrast, in accordance with the secondary effector schedule 754, the higher the power level of the three-stream engine 100, the more closed the variable bleed valve 670 is moved.

When air is bled through the variable bleed valve 670 to the fan duct 172 via the secondary bleed duct 674, moving the variable bleed valve 670 more open back pressures the secondary fan 195, which changes one or more properties of the airflow through the fan duct 172. In addition, in such a bleed arrangement, moving the variable bleed valve 670 more closed increases the pumping ability of the secondary fan 195, which changes one or more properties of the airflow through the fan duct 172.

When air is bled through the variable bleed valve 670 offboard via the offboard bleed duct 672, moving the variable bleed valve 670 more open reduces the pressure on the secondary fan 195, which changes one or more properties of the airflow through the fan duct 172. Further, in such a bleed arrangement, moving the variable bleed valve 670 more closed increases the pressure on the secondary fan 195, which changes one or more properties of the airflow through the fan duct 172.

As further shown in FIG. 23, in addition to the secondary effector schedule 754, various demands and limits are depicted. Particularly, an operability demand 772A associated with operability of the secondary effector 810 (the variable bleed valve 670 in this example), an operability demand 772B associated with operability of the secondary fan 195, an extraction demand 774 indicating a minimum open position the variable bleed valve is to be set (e.g., to expel debris or to be opened during takeoff and climb operations), and effector limits 782 are depicted. The operability demands 772A, 772B are movable along the y-axis of the graph. The operability demand 772A is movable along the y-axis of the graph based on the sensor data 832 indicating one or more operating parameters associated with the variable bleed valve 670. The operability demand 772B is movable along the y-axis of the graph based on the sensor data 832 indicating one or more operating parameters associated with the secondary fan 195. The extraction demand 774 can be output by the operability module 770 and is also movable along the y-axis of the graph. As noted, the extraction demand 774 indicates a minimum open position the variable bleed valve 670 is to be set. For instance, during takeoff and climb operations, the variable bleed valve 670 may be set more open to prevent engine stalls. However, during cruise operations, the variable bleed valve 670 may be able to be more closed as operation is typically more steady state.

In some embodiments, the one or more processors of the engine controller 740 are configured to determine the secondary effector demand 794 for the variable bleed valve 670 based at least in part on the interaction between i) the secondary effector schedule 754 determined based at least in part on the thrust demand 730, ii) the operability demand 772A associated with operability of the secondary effector 810 (or in this example the variable bleed valve 670); iii) the operability demand 772B associated with operability of the secondary fan 195; and iv) the extraction demand 774 indicating the minimum open position the variable bleed valve 670 is to be set. As noted above, as the operability demand 772B associated with operability of the secondary fan 195 is considered, the control logic of the secondary effector 810 can be said to be ganged with the control logic of the secondary fan 195.

Generally, the position of the variable bleed valve 670 is selected in accordance with the secondary effector schedule 754 unless other demands and/or limits 772A, 772B, 774, 782 intersect with or are selected as being of higher priority, which may cause the position of the variable bleed valve 670 to deviate from the secondary effector schedule 754. The priority of the demands and/or limits may be preselected, e.g., by the supervisory system 720 and/or the engine controller 740. In some embodiments, the operability demand 772A associated with the variable bleed valve 670 is selected as being of higher priority than the operability demand 772B associated with the secondary fan 195, which is selected as being of higher priority than the extraction demand 774.

Stated differently, in some embodiments, the one or more processors of the engine controller 740 are configured to determine the secondary effector demand 794 for the variable bleed valve 670 based at least in part on the secondary effector schedule 754 and the one or more secondary constraints, the one or more secondary constraints including at least one of: i) the operability demand 772A associated with operability of the secondary effector 810; ii) the operability demand 772B associated with operability of the secondary fan 195; and iii) an extraction demand 774 indicating a minimum open position the variable bleed valve 670 is to be set. Moreover, the one or more processors of the engine controller 740 are configured to cause adjustment of the position of the variable bleed valve 670 so that core air from the core duct 142 is directed into one of the offboard bleed duct 672 and the secondary bleed duct 674.

Figure 24:
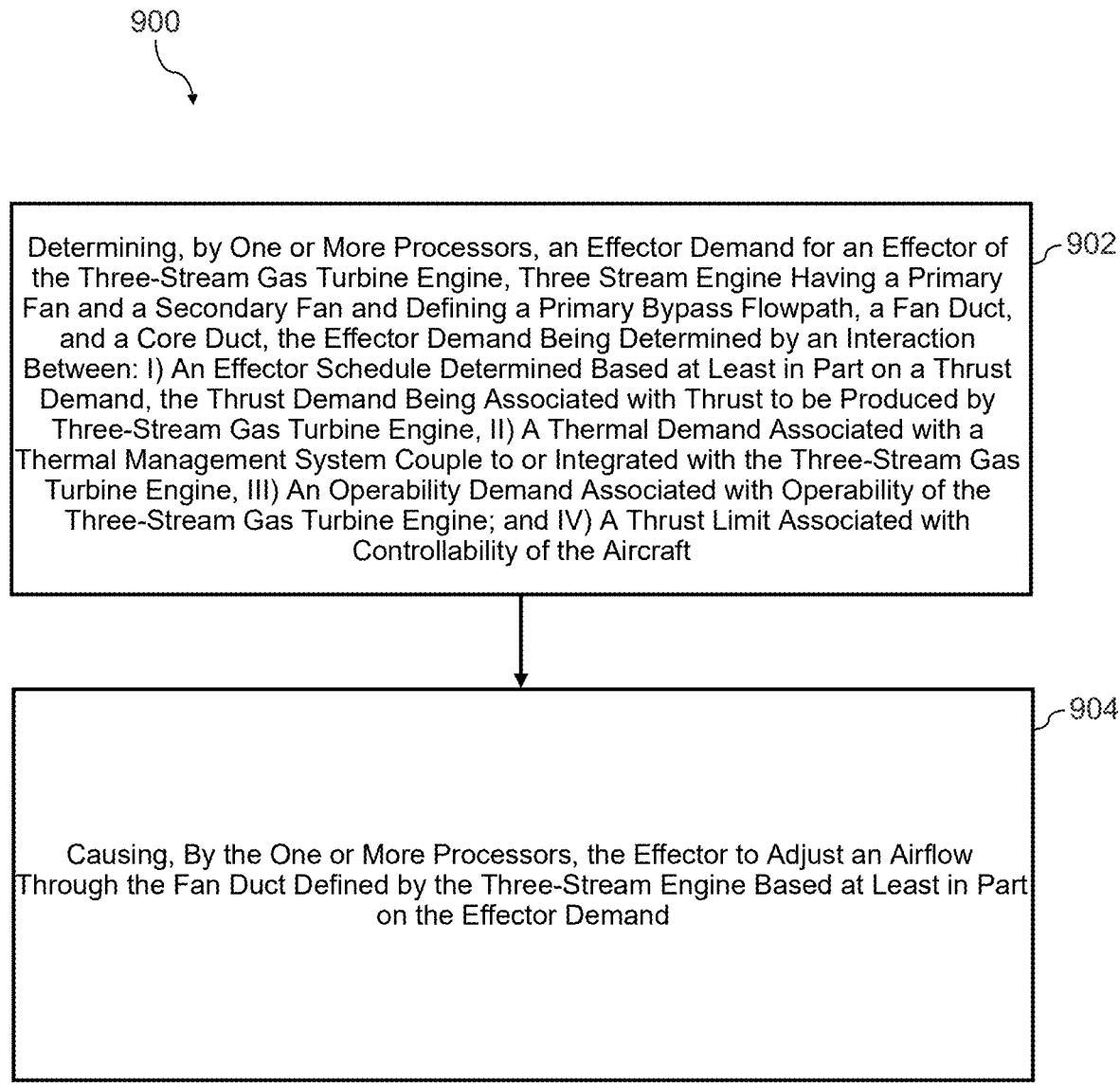
FIG. 24 provides a flow diagram for a method of operating a three-stream engine according to various embodiments of the present disclosure.

FIG. 24 provides a flow diagram for a method 900 of operating a three-stream engine for an aircraft according to one example embodiment of the present disclosure. For instance, the method 900 can be used to operate the three-stream engine 100 of FIGS. 1 and 2, FIG. 3, as well as other three-stream engines. It will be appreciated that method 900 is discussed herein to describe exemplary aspects of the present subject matter and is not intended to be limiting.

At 902, the method 900 includes determining, by one or more processors, an effector demand for an effector of the three-stream gas turbine engine, the three-stream engine having a primary fan and a secondary fan and defining a primary bypass flowpath, a fan duct, and a core duct, the effector demand being determined based at least in part on an interaction between: i) an effector schedule determined based at least in part on a thrust demand, the thrust demand being associated with thrust to be produced by the three-stream gas turbine engine; ii) a thermal demand associated with a thermal management system coupled to or integrated with the three-stream gas turbine engine; iii) an operability demand associated with operability of the three-stream gas turbine engine; and iv) a thrust limit associated with controllability of the aircraft. In some implementations, for example, the effector demand can be determined in accordance with the effector schedule. In this regard, the effector schedule can be a base schedule. However, when one of the demands or limits is selected or determined as being of a higher priority, the effector demand can be determined in accordance with that constraint, which may be a demand or limit.

In some implementations, the effector is an array of inlet guide vanes positioned upstream of a secondary fan of the three-stream engine. The secondary fan is positioned downstream of a primary fan, which may be ducted or unducted. In such implementations, in causing the effector to adjust the airflow through the fan duct, the method can include causing, by the one or more processors, adjustment of a position of the inlet guide vanes, e.g., to a more open or closed position.

In other implementations, the effector is a variable nozzle positioned along the fan duct. In such implementations, in causing the effector to adjust the airflow through the fan duct, the method can include causing, by the one or more processors, adjustment of a position of the variable nozzle, e.g., to a more open or closed position.

In yet other implementations, the effector is an electric machine mechanically coupled with the shaft to which the secondary fan is also mechanically coupled. In such implementations, in causing the effector to adjust the airflow through the fan duct, the method can include causing, by the one or more processors, the electric machine to adjust a torque applied to the shaft.

In some further implementations, the effector is a primary fan positioned upstream of the secondary fan. In such implementations, in causing the effector to adjust the airflow through the fan duct, the method can include causing, by the one or more processors, at least one of: i) adjustment of a pitch of fan blades of the primary fan; and ii) adjustment of a rotational speed of the primary fan.

In yet other implementations, the effector can include the inlet guide vanes positioned upstream of the secondary fan, the variable nozzle, the electric machine, and the primary fan, or any possible combination thereof.

In some implementations, the method 900 includes, determining, by the one or more processors, the effector schedule based at least in part on the thrust demand and data indicating one or more operating parameters associated with the three-stream gas turbine engine. The method 900 can further include outputting, by the one or more processors, the effector demand in accordance with the effector schedule, e.g., as shown up to time t1 and after time t6 in FIG. 16.

In some implementations, the method 900 includes, determining, by the one or more processors, the operability demand based at least in part on the data indicating the one or more operating parameters associated with the three-stream gas turbine engine. The method 900 can further include determining, by the one or more processors, that the operability demand is a highest priority constraint. In response to the operability demand being determined as the highest priority constraint, the effector demand is output in accordance with the operability demand, e.g., as shown at time t3 to time t6 in FIG. 17.

In some implementations, the method 900 includes, determining, by the one or more processors, the thrust limit based at least in part on the thrust demand. The method 900 can also include determining, by the one or more processors, that the thrust limit is a highest priority constraint. In response to the thrust limit being determined as the highest priority constraint, the effector demand is output in accordance with the thrust limit, e.g., as shown at time t3 to time t5 in FIG. 16.

In some implementations, the method 900 includes, receiving, by the one or more processors, the thermal demand. The thermal demand received can be associated with an aircraft thermal management system, an engine thermal management system, or a summation of the two. The method 900 can also include determining, by the one or more processors, that the thermal demand is a highest priority constraint. In response to the thermal demand being determined as the highest priority constraint, the effector demand is output in accordance with the thermal demand, e.g., as shown at time t2 to time t3 in FIG. 16 as well as time t5 to time t6 in FIG. 16.

At 904, the method 900 includes causing, by the one or more processors, the effector to adjust an airflow through a fan duct defined by the three-stream engine based at least in part on the effector demand.

In some further implementations, optionally, the method can include determining, by the one or more processors, a secondary effector demand associated with a second effector positioned downstream of the secondary fan along the core duct based at least in part on an interaction between: i) a secondary effector schedule determined based at least in part on the thrust demand; ii) an operability demand associated with operability of the secondary effector; and iii) an operability demand associated with operability of the secondary fan. Further, in such implementations, the method can include causing, by the one or more processors, the secondary effector to assist with adjustment of the airflow through the fan duct based at least in part on the secondary effector demand.

In some implementations, the three-stream gas turbine engine has a compressor having one or more stages of compressors rotor blades and compressor stator vanes, wherein at least one stage of compressor stator vanes are variable stator vanes. For instance, the variable stator vanes can be booster inlet guide vanes of a low pressure compressor or booster of the engine. In such implementations, the secondary effector can be the variable stator vanes. In causing the secondary effector to assist with adjustment of the airflow through the fan duct, the one or more processors can be configured to cause adjustment of a position of the variable stator vanes.

In yet other implementations, the three-stream gas turbine engine has a low pressure compressor positioned along the core duct downstream of the secondary fan, a high pressure compressor positioned along the core duct downstream of the low pressure compressor, and a variable bleed valve positioned downstream of the low pressure compressor and upstream of the high pressure compressor. In such implementations, the secondary effector can be the variable bleed valve. In causing the secondary effector to assist with adjustment of the airflow through the fan duct, the one or more processors can be configured to cause adjustment of a position of the variable bleed valve. Particularly, in some implementations, the method can include determining, by the one or more processors, the secondary effector demand based at least in part on an interaction between: i) the secondary effector schedule determined based at least in part on the thrust demand; ii) the operability demand associated with operability of the secondary effector; and iii) the operability demand associated with operability of the secondary fan; and iv) an extraction demand indicating a minimum open position the variable bleed valve is to be set. In such implementations, the one or more processors are configured to cause adjustment of the position of the variable bleed valve so that core air from the core duct is directed into one of the offboard bleed duct and the secondary bleed duct.

In some implementations, the three-stream gas turbine engine defines a primary fan radius to secondary fan radius ratio as being equal to or greater than 2.0 and less than or equal to 6.5, the primary fan radius to secondary fan radius ratio being defined by a radius spanning between a longitudinal axis defined by the three-stream gas turbine engine and a leading edge tip of one of the primary fan blades of the primary fan to a radius spanning between the longitudinal axis and a leading edge tip of one of the secondary fan blades of the secondary fan.

Figure 25:
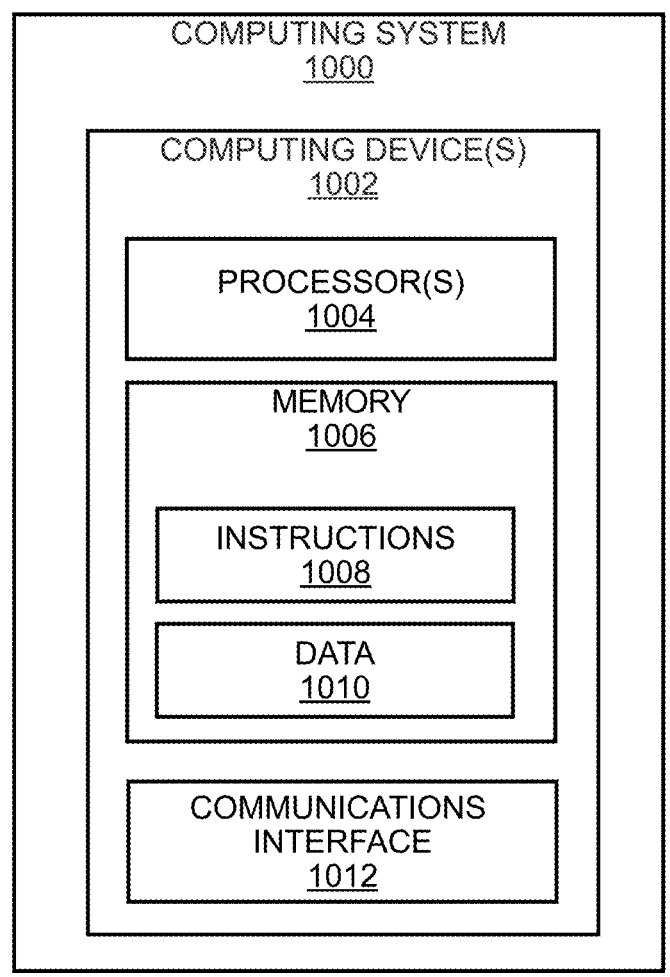
FIG. 25 provides a block diagram of a computing system for implementing one or more aspects of the present disclosure according to example embodiments of the present disclosure.

FIG. 25 provides a block diagram of an example computing system 1000. The computing system 1000 can be used to implement the aspects disclosed herein. The computing system 1000 can include one or more computing device(s) 1002. The engine controller 740 and the supervisory system 720 disclosed herein can be constructed and may operate in a same or similar manner as one of the computing devices 1002, for example.

As shown in FIG. 25, the one or more computing device(s) 1002 can each include one or more processor(s) 1004 and one or more memory device(s) 1006. The one or more processor(s) 1004 can include any suitable processing device, such as a microprocessor, microcontroller, integrated circuit, logic device, or other suitable processing device. The one or more memory device(s) 1006 can include one or more computer-readable media, including, but not limited to, non-transitory computer-readable medium or media, RAM, ROM, hard drives, flash drives, and other memory devices, such as one or more buffer devices.

The one or more memory device(s) 1006 can store information accessible by the one or more processor(s) 1004, including computer-readable or computer-executable instructions 1008 that can be executed by the one or more processor(s) 1004. The instructions 1008 can be any set of instructions or control logic that when executed by the one or more processor(s) 1004, cause the one or more processor(s) 1004 to perform operations. The instructions 1008 can be software written in any suitable programming language or can be implemented in hardware. In some embodiments, the instructions 1008 can be executed by the one or more processor(s) 1004 to cause the one or more processor(s) 1004 to perform operations.

The memory device(s) 1006 can further store data 1010 that can be accessed by the processor(s) 1004. For example, the data 1010 can include sensor data such as engine parameters, model data, logic data, etc., as described herein. The data 1010 can include one or more table(s), function(s), algorithm(s), model(s), equation(s), etc. according to example embodiments of the present disclosure.

The one or more computing device(s) 1002 can also include a communication interface 1012 used to communicate, for example, with the other components of the aircraft. The communication interface 1012 can include any suitable components for interfacing with one or more network(s), including for example, transmitters, receivers, ports, controllers, antennas, or other suitable components.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any preceding clause, wherein the thrust to power airflow ratio and the core bypass ratio are defined when the gas turbine engine is operated at a rated speed during standard day operating conditions.

The gas turbine engine of any preceding clause, wherein the thrust to power airflow ratio between 4 and 75.

The gas turbine engine of any preceding clause, wherein the primary fan is an unducted primary fan, and wherein the thrust to power airflow ratio between 30 and 60.

The gas turbine engine of any preceding clause, wherein the thrust to power airflow ratio between 35 and 50.

The gas turbine engine of any preceding clause, wherein the core bypass ratio between 0.3 and 5.

The gas turbine engine of any preceding clause, wherein the gas turbine engine is a turboprop engine, and wherein the thrust to power airflow ratio between 40 and 100.

The gas turbine engine of any preceding clause, wherein the primary fan is a ducted primary fan, and wherein the thrust to power airflow ratio is between 3.5 and 40.

The gas turbine engine of any preceding clause, wherein the gas turbine engine is a direct drive gas turbine engine, and wherein the thrust to power airflow ratio is between 3.5 and 20.

The gas turbine engine of any preceding clause, wherein the gas turbine engine is a geared gas turbine engine, and wherein the thrust to power airflow ratio is between 8 and 40.

The gas turbine engine of any preceding clause, wherein the secondary fan is a single stage secondary fan.

The gas turbine engine of any preceding clause, wherein the secondary fan is a multi-stage secondary fan.

The gas turbine engine of any preceding clause, wherein the multi-stage secondary fan is a two stage secondary fan.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct.

The method of any preceding clause, wherein The gas turbine engine of claim 1, wherein the thrust to power airflow ratio between 4 and 75.

The method of any preceding clause, wherein the primary fan is an unducted primary fan, and wherein the thrust to power airflow ratio between 30 and 60.

The method of any preceding clause, wherein the thrust to power airflow ratio between 35 and 50.

The method of any preceding clause, wherein the core bypass ratio between 0.3 and 5.

A gas turbine engine for an aircraft, comprising: a shaft; a primary fan mechanically coupled with the shaft; a secondary fan positioned downstream of the primary fan and mechanically coupled with the shaft; an engine core; a core cowl surrounding at least a portion of the engine core, a core duct being defined between the engine core and the core cowl; an fan cowl surrounding at least a portion of the core cowl, a fan duct being defined between the core cowl and the fan cowl; an effector; and one or more processors configured to: determine an effector demand based at least in part on an effector schedule and one or more constraints, the effector schedule being determined based at least in part on a thrust demand associated with thrust to be produced by the three-stream gas turbine engine, the one or more constraints including at least one of: i) a thermal demand associated with a thermal management system coupled to or integrated with the gas turbine engine; ii) an operability demand associated with operability of the gas turbine engine; and iii) a thrust limit associated with controllability of the aircraft; and cause the effector to adjust an airflow through the fan duct based at least in part on the effector demand.

The gas turbine engine of any preceding clause, wherein the effector is an array of inlet guide vanes positioned upstream of the secondary fan.

The gas turbine engine of any preceding clause, wherein the effector is a variable nozzle positioned along the fan duct.

The gas turbine engine of any preceding clause, wherein the effector includes an array of inlet guide vanes positioned upstream of the secondary fan and a variable nozzle positioned along the fan duct.

The gas turbine engine of any preceding clause, wherein the effector is an electric machine mechanically coupled with the shaft, and wherein in causing the effector to adjust the airflow through the fan duct, the one or more processors are configured to: cause the electric machine to adjust a torque applied to the shaft.

The gas turbine engine of any preceding clause, wherein the effector is the primary fan, and wherein in causing the effector to adjust the airflow through the fan duct, the one or more processors are configured to: cause at least one of: i) adjustment of a pitch of fan blades of the primary fan; and ii) adjustment of a rotational speed of the primary fan.

The gas turbine engine of any preceding clause, further comprising: a secondary effector positioned downstream of the secondary fan along the core duct, and wherein the one or more processors are configured to: determine a secondary effector demand based at least in part on a secondary effector schedule and one or more secondary constraints, the secondary effector schedule being determined based at least in part on the thrust demand, the one or more secondary constraints including at least one of: i) an operability demand associated with operability of the secondary effector; and ii) an operability demand associated with operability of the secondary fan; and cause the secondary effector to assist with adjustment of the airflow through the fan duct based at least in part on the secondary effector demand.

The gas turbine engine of any preceding clause, further comprising: a compressor having one or more stages of compressors rotor blades and compressor stator vanes, wherein at least one stage of compressor stator vanes are variable stator vanes, and wherein the secondary effector is the variable stator vanes.

The gas turbine engine of any preceding clause, further comprising: a low pressure compressor positioned along the core duct downstream of the secondary fan; a high pressure compressor positioned along the core duct downstream of the low pressure compressor; and a variable bleed valve positioned downstream of the low pressure compressor and upstream of the high pressure compressor, and wherein the secondary effector is the variable bleed valve, and wherein in causing the secondary effector to assist with adjustment of the airflow through the fan duct, the one or more processors are configured to: cause adjustment of a position of the variable bleed valve.

The gas turbine engine of any preceding clause, wherein the gas turbine engine defines at least one of an offboard bleed duct and a secondary bleed duct, the offboard bleed duct providing fluid communication between the core duct and offboard the gas turbine engine, the secondary bleed duct providing fluid communication between the core duct and the fan duct, and wherein the one or more processors are configured to: determine the secondary effector demand based at least in part on the secondary effector schedule and the one or more secondary constraints, the one or more secondary constraints including at least one of: i) the operability demand associated with operability of the secondary effector; ii) the operability demand associated with operability of the secondary fan; and iii) an extraction demand indicating a minimum open position the variable bleed valve is to be set, and wherein the one or more processors are configured to cause adjustment of the position of the variable bleed valve so that core air from the core duct is directed into one of the offboard bleed duct and the secondary bleed duct.

The gas turbine engine of any preceding clause, wherein the one or more processors are configured to: determine the effector schedule based at least in part on the thrust demand and data indicating one or more operating parameters associated with the gas turbine engine; and output the effector demand in accordance with the effector schedule.

The gas turbine engine of any preceding clause, wherein the one or more processors are configured to: determine the operability demand based at least in part on data indicating one or more operating parameters associated with the gas turbine engine; and determine that the operability demand is a highest priority constraint, and wherein, in response to the operability demand being the highest priority constraint, the effector demand is output in accordance with the operability demand.

The gas turbine engine of any preceding clause, wherein the one or more processors are configured to: determine the thrust limit based at least in part on the thrust demand; and determine that the thrust limit is a highest priority constraint, and wherein, in response to the thrust limit being the highest priority constraint, the effector demand is output in accordance with the thrust limit.

The gas turbine engine of any preceding clause, wherein the one or more processors are configured to: receive the thermal demand, and determine that the thermal demand is a highest priority constraint, and wherein, in response to the thermal demand being the highest priority constraint, the effector demand is output in accordance with the thermal demand.

The gas turbine engine of any preceding clause, wherein the gas turbine engine defines a primary fan radius to secondary fan radius ratio as being equal to or greater than 2.0 and less than or equal to 6.5, the primary fan radius to secondary fan radius ratio being defined by a radius spanning between a longitudinal axis defined by the gas turbine engine and a leading edge tip of one primary fan blade of the primary fan to a radius spanning between the longitudinal axis and a leading edge tip of one secondary fan blade of the secondary fan.

A non-transitory computer readable medium comprising computer-executable instructions, which, when executed by one or more processors associated with a gas turbine engine having a primary fan and a secondary fan and defining a core duct, a primary bypass flowpath, and a fan duct, cause the one or more processors to: determine an effector demand associated with an effector of the gas turbine engine, the effector demand being determined based at least in part on an interaction between: i) an effector schedule determined based at least in part on a thrust demand, the thrust demand being associated with thrust to be produced by the gas turbine engine; ii) a thermal demand associated with a thermal management system coupled to or integrated with the gas turbine engine; iii) an operability demand associated with operability of the gas turbine engine; and iv) a thrust limit associated with controllability provided by the gas turbine engine; and cause the effector to adjust an airflow through the fan duct based at least in part on the effector demand.

The non-transitory computer readable medium of any preceding clause, wherein the effector includes at least one of an array of inlet guide vanes positioned upstream of the secondary fan, a variable nozzle positioned along the fan duct.

The non-transitory computer readable medium of any preceding clause, wherein the effector includes at least one of electric machine mechanically coupled with a shaft to which the secondary fan is mechanically coupled and the primary fan.

The non-transitory computer readable medium of any preceding clause, wherein, when the computer-executable instructions are executed, the one or more processors are configured to: determine a secondary effector demand associated with a secondary effector positioned downstream of the secondary fan along the core duct, the one or more processors determine the secondary effector demand by considering: i) a secondary effector schedule determined based at least in part on the thrust demand; ii) an operability demand associated with operability of the secondary effector; and iii) an operability demand associated with operability of the secondary fan; and cause the secondary effector to assist with adjustment of the airflow through the fan duct based at least in part on the secondary effector demand.

An aircraft, comprising: a thermal management system; a gas turbine engine defining a core duct, a primary bypass flowpath, and a fan duct, the thermal management system being coupled to or integrated with the gas turbine engine, the gas turbine engine comprising: a shaft; a primary fan mechanically coupled with the shaft; a secondary fan positioned downstream of the primary fan and mechanically coupled with the shaft; an effector; and one or more processors configured to: determine an effector demand based at least in part on a thrust demand being associated with thrust to be produced by the gas turbine engine and a thermal demand associated with the thermal management system; and cause the effector to adjust an airflow through the fan duct based at least in part on the effector demand.

A method of operating a gas turbine engine for an aircraft, the method comprising: determining, by one or more processors, an effector demand for an effector of the gas turbine engine, the engine having a primary fan and a secondary fan and defining a primary bypass flowpath, a fan duct, and a core duct, the effector demand being determined based at least in part on an interaction between i) an effector schedule determined based at least in part on a thrust demand, the thrust demand being associated with thrust to be produced by the gas turbine engine; ii) a thermal demand associated with a thermal management system coupled to or integrated with the gas turbine engine; iii) an operability demand associated with operability of the gas turbine engine; and iv) a thrust limit associated with controllability of the aircraft; and causing, by the one or more processors, the effector to adjust an airflow through a fan duct defined by the engine based at least in part on the effector demand.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; an effector; and one or more processors configured to: determine an effector demand based at least in part on an effector schedule and one or more constraints, and cause the effector to adjust an airflow through the fan duct based at least in part on the effector demand.

The gas turbine engine of any preceding clause, wherein the one or more constraints include at least one of: i) a thermal demand associated with a thermal management system coupled to or integrated with the gas turbine engine; ii) an operability demand associated with operability of the gas turbine engine; and iii) a thrust limit associated with controllability of an aircraft incorporating the gas turbine engine.

The gas turbine engine of any preceding clause, wherein the effector is an array of inlet guide vanes positioned upstream of the secondary fan.

The gas turbine engine of any preceding clause, wherein the effector is a variable nozzle positioned along the fan duct.

The gas turbine engine of any preceding clause, wherein the effector includes an array of inlet guide vanes positioned upstream of the secondary fan and a variable nozzle positioned along the fan duct.

The gas turbine engine of any preceding clause, wherein the effector is an electric machine mechanically coupled with a shaft of the turbomachine, and wherein in causing the effector to adjust the airflow through the fan duct, the one or more processors are configured to: cause the electric machine to adjust a torque applied to the shaft.

The gas turbine engine of any preceding clause, wherein the effector is the primary fan, and wherein in causing the effector to adjust the airflow through the fan duct, the one or more processors are configured to: cause at least one of: i) adjustment of a pitch of fan blades of the primary fan; and ii) adjustment of a rotational speed of the primary fan.

The gas turbine engine of any preceding clause, wherein the effector schedule is determined based at least in part on a thrust demand associated with thrust to be produced by the gas turbine engine.

The gas turbine engine of any preceding clause, further comprising: a secondary effector positioned downstream of the secondary fan along the core duct, and wherein the one or more processors are configured to: determine a secondary effector demand based at least in part on a secondary effector schedule and one or more secondary constraints, the secondary effector schedule being determined based at least in part on the thrust demand, the one or more secondary constraints including at least one of: i) an operability demand associated with operability of the secondary effector; and ii) an operability demand associated with operability of the secondary fan; and cause the secondary effector to assist with adjustment of the airflow through the fan duct based at least in part on the secondary effector demand.

The gas turbine engine of any preceding clause, wherein the thrust to power airflow ratio and the core bypass ratio are defined when the gas turbine engine is operated at a rated speed during standard day operating conditions.

The gas turbine engine of any preceding clause, wherein the thrust to power airflow ratio is between 4 and 75.

The gas turbine engine of any preceding clause, wherein the primary fan is an unducted primary fan, and wherein the thrust to power airflow ratio is between 30 and 60.

The gas turbine engine of any preceding clause, wherein the thrust to power airflow ratio is between 35 and 50.

The gas turbine engine of any preceding clause, wherein the core bypass ratio is between 0.3 and 5.

The gas turbine engine of any preceding clause, wherein the gas turbine engine is a turboprop engine, and wherein the thrust to power airflow ratio is between 40 and 100.

The gas turbine engine of any preceding clause, wherein the primary fan is a ducted primary fan, and wherein the thrust to power airflow ratio is between 3.5 and 40.

The gas turbine engine of any preceding clause, wherein the gas turbine engine is a direct drive gas turbine engine, and wherein the thrust to power airflow ratio is between 3.5 and 20.

The gas turbine engine of any preceding clause, wherein the secondary fan is a single stage secondary fan.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine of any preceding clause, wherein the effector comprises an electric machine mechanically coupled with the shaft, and in causing the effector to adjust the airflow through the fan duct, the one or more processors are configured to: cause the electric machine to adjust a torque applied to the shaft.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct; determining an effector demand based at least in part on an effector schedule and one or more constraints, and causing an effector to adjust an airflow through the fan duct based at least in part on the effector demand.

We claim:

1. A gas turbine engine comprising:
   a turbomachine comprising a compressor section, a combustion section, and a turbine section arranged in serial flow order, the turbomachine defining an engine inlet to an inlet duct, a fan duct inlet to a fan duct, and a core inlet to a core duct;
   a primary fan driven by the turbomachine; and
   a secondary fan located downstream of the primary fan within the inlet duct,
   the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct;
   an effector; and
   one or more processors configured to:
      determine an effector demand based at least in part on an effector schedule and one or more constraints, and
      cause the effector to adjust an airflow through the fan duct based at least in part on the effector demand.

2. The gas turbine engine of claim 1, wherein the one or more constraints include at least one of:
   i) a thermal demand associated with a thermal management system coupled to or integrated with the gas turbine engine;
   ii) an operability demand associated with operability of the gas turbine engine; and
   iii) a thrust limit associated with controllability of an aircraft incorporating the gas turbine engine.

3. The gas turbine engine of claim 1, wherein the effector is an array of inlet guide vanes positioned upstream of the secondary fan.

4. The gas turbine engine of claim 1, wherein the effector is a variable nozzle positioned along the fan duct.

5. The gas turbine engine of claim 1, wherein the effector includes an array of inlet guide vanes positioned upstream of the secondary fan and a variable nozzle positioned along the fan duct.

6. The gas turbine engine of claim 1, wherein the effector is an electric machine mechanically coupled with a shaft of the turbomachine, and wherein in causing the effector to adjust the airflow through the fan duct, the one or more processors are configured to:
   cause the electric machine to adjust a torque applied to the shaft.

7. The gas turbine engine of claim 1, wherein the effector is the primary fan, and wherein in causing the effector to adjust the airflow through the fan duct, the one or more processors are configured to:
cause at least one of:
i) adjustment of a pitch of fan blades of the primary fan; and
ii) adjustment of a rotational speed of the primary fan.

8. The gas turbine engine of claim 1, wherein the effector schedule is determined based at least in part on a thrust demand associated with thrust to be produced by the gas turbine engine.

9. The gas turbine engine of claim 8, further comprising:
a secondary effector positioned downstream of the secondary fan along the core duct, and
wherein the one or more processors are configured to:
determine a secondary effector demand based at least in part on a secondary effector schedule and one or more secondary constraints, the secondary effector schedule being determined based at least in part on the thrust demand, the one or more secondary constraints including at least one of:
i) an operability demand associated with operability of the secondary effector; and
ii) an operability demand associated with operability of the secondary fan; and
cause the secondary effector to assist with adjustment of the airflow through the fan duct based at least in part on the secondary effector demand.

10. The gas turbine engine of claim 1, wherein the thrust to power airflow ratio and the core bypass ratio are defined when the gas turbine engine is operated at a rated speed during standard day operating conditions.

11. The gas turbine engine of claim 1, wherein the thrust to power airflow ratio is between 4 and 75.

12. The gas turbine engine of claim 1, wherein the primary fan is an unducted primary fan, and wherein the thrust to power airflow ratio is between 30 and 60.

13. The gas turbine engine of claim 12, wherein the thrust to power airflow ratio is between 35 and 50.

14. The gas turbine engine of claim 1, wherein the core bypass ratio is between 0.3 and 5.

15. The gas turbine engine of claim 1, wherein the gas turbine engine is a turboprop engine, and wherein the thrust to power airflow ratio is between 40 and 100.

16. The gas turbine engine of claim 1, wherein the primary fan is a ducted primary fan, and wherein the thrust to power airflow ratio is between 3.5 and 40.

17. The gas turbine engine of claim 16, wherein the gas turbine engine is a direct drive gas turbine engine, and wherein the thrust to power airflow ratio is between 3.5 and 20.

18. The gas turbine engine of claim 1, wherein the secondary fan is a single stage secondary fan.

19. A method of operating a gas turbine engine, comprising:
operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct;
determining an effector demand based at least in part on an effector schedule and one or more constraints, and
causing an effector to adjust an airflow through the fan duct based at least in part on the effector demand.

* * * * *